US009323396B2

(12) United States Patent
Han et al.

(10) Patent No.: US 9,323,396 B2
(45) Date of Patent: Apr. 26, 2016

(54) TOUCH SENSING

(75) Inventors: Jefferson Y. Han, Holliswood, NY (US); Joel S. Kollin, Seattle, WA (US)

(73) Assignee: PERCEPTIVE PIXEL, INC., Redmond, WA (US)

( * ) Notice: Subject to any disclaimer, the term of this patent is extended or adjusted under 35 U.S.C. 154(b) by 1070 days.

(21) Appl. No.: 12/791,663

(22) Filed: Jun. 1, 2010

(65) Prior Publication Data

US 2010/0302196 A1    Dec. 2, 2010

Related U.S. Application Data

(60) Provisional application No. 61/219,742, filed on Jun. 23, 2009, provisional application No. 61/182,992, filed on Jun. 1, 2009, provisional application No. 61/182,984, filed on Jun. 1, 2009.

(51) Int. Cl.
*G06F 3/041* (2006.01)
*G06F 3/042* (2006.01)
(Continued)

(52) U.S. Cl.
CPC ............ *G06F 3/0425* (2013.01); *G02B 6/0016* (2013.01); *G02B 6/34* (2013.01); *G02B 6/4204* (2013.01); *G06F 2203/04109* (2013.01)

(58) Field of Classification Search
USPC .......................................................... 345/173
See application file for complete search history.

(56) References Cited

U.S. PATENT DOCUMENTS 3,200,701 A    8/1965 Wyman
3,673,327 A    6/1972 Johnson et al.
(Continued)

FOREIGN PATENT DOCUMENTS

JP    62-107325    5/1987
JP    8-50526    2/1996
(Continued)

OTHER PUBLICATIONS

Anonymous: "Anti-reflective coating", Wikipedia, Feb. 6, 2009, retrieved from the Internet: http://replay.waybackmachine.org/20090206235736//http://en.widipedia.org/wiki/Anti-reflective_coating (retrieved on Mar. 30, 2011), 6 pages.
(Continued)

*Primary Examiner* — Amr Awad
*Assistant Examiner* — Andre Matthews
(74) *Attorney, Agent, or Firm* — Brandon Roper; Judy Yee; Micky Minhas

(57) ABSTRACT

A touch-screen device includes an imaging waveguide, in which the imaging waveguide has a radiation receiving surface and an imaging surface different than the radiation receiving surface. The imaging waveguide is configured to receive, at the radiation receiving surface, radiation emitted by a contact receiving structure, and transmit the received radiation from a position on the radiation receiving surface to a position and/or angle of incidence on the imaging surface as a function of the position on the radiation receiving surface at which the transmitted radiation was received. An imaging sensor coupled to the imaging surface of the imaging optical waveguide is configured to detect radiation incident upon the imaging surface of the imaging optical waveguide. A processing device coupled to the imaging sensor is configured to determine contact points on the exposed contact surface of a contact receiving structure based on radiation detected by the imaging sensor.

37 Claims, 29 Drawing Sheets

(51) Int. Cl.
 F21V 8/00 (2006.01)
 G02B 6/34 (2006.01)
 G02B 6/42 (2006.01)

(56) References Cited

U.S. PATENT DOCUMENTS

| | | | |
|---|---|---|---|
| 3,846,826 | A | 11/1974 | Mueller |
| 4,134,063 | A | 1/1979 | Nicol et al. |
| 4,346,376 | A | 8/1982 | Mallos |
| 4,484,179 | A * | 11/1984 | Kasday ............ 345/176 |
| 4,668,861 | A | 5/1987 | White |
| 5,942,761 | A | 8/1999 | Tuli |
| 5,973,844 | A | 10/1999 | Burger |
| 6,323,846 | B1 | 11/2001 | Westerman et al. |
| 6,323,892 | B1 | 11/2001 | Mihara |
| 6,469,755 | B1 * | 10/2002 | Adachi et al. ............ 349/62 |
| 6,883,919 | B2 | 4/2005 | Travis |
| 6,895,164 | B2 | 5/2005 | Saccomanno |
| 6,972,753 | B1 | 12/2005 | Kimura et al. |
| 6,997,558 | B2 | 2/2006 | Perlin et al. |
| 7,302,152 | B2 | 11/2007 | Luther et al. |
| 7,330,629 | B2 | 2/2008 | Cooke et al. |
| 7,351,949 | B2 | 4/2008 | Oon et al. |
| 7,394,058 | B2 | 7/2008 | Chua et al. |
| 7,410,286 | B2 | 8/2008 | Travis |
| 7,412,119 | B2 | 8/2008 | Smits |
| 2002/0048438 | A1 * | 4/2002 | Veligdan ............ 385/120 |
| 2003/0210537 | A1 | 11/2003 | Engelmann |
| 2004/0071417 | A1 | 4/2004 | Veligdan |
| 2005/0068537 | A1 | 3/2005 | Han et al. |
| 2005/0200293 | A1 | 9/2005 | Naugler et al. |
| 2006/0022956 | A1 | 2/2006 | Lengeling et al. |
| 2006/0026521 | A1 | 2/2006 | Hotelling et al. |
| 2006/0026535 | A1 | 2/2006 | Hotelling et al. |
| 2006/0026536 | A1 | 2/2006 | Hotelling et al. |
| 2006/0033724 | A1 | 2/2006 | Chaudhri et al. |
| 2006/0053387 | A1 | 3/2006 | Ording |
| 2006/0085757 | A1 | 4/2006 | Andre et al. |
| 2006/0086896 | A1 | 4/2006 | Han |
| 2006/0188196 | A1 | 8/2006 | Charters et al. |
| 2006/0227120 | A1 * | 10/2006 | Eikman ............ 345/175 |
| 2006/0279558 | A1 | 12/2006 | Van Delden et al. |
| 2007/0070050 | A1 | 3/2007 | Westerman et al. |
| 2007/0084989 | A1 | 4/2007 | Lange et al. |
| 2007/0152985 | A1 | 7/2007 | Ostergaard et al. |
| 2008/0007540 | A1 | 1/2008 | Ostergaard |
| 2008/0029691 | A1 * | 2/2008 | Han ............ 250/224 |
| 2008/0121787 | A1 * | 5/2008 | Pyo et al. ............ 250/227.14 |
| 2008/0123908 | A1 * | 5/2008 | Waldman et al. ............ 382/124 |
| 2008/0150913 | A1 | 6/2008 | Bell et al. |
| 2008/0179507 | A2 | 7/2008 | Han |
| 2008/0192025 | A1 | 8/2008 | Jaeger et al. |
| 2008/0284925 | A1 | 11/2008 | Han |
| 2009/0033637 | A1 | 2/2009 | Han |
| 2009/0122020 | A1 | 5/2009 | Eliasson et al. |
| 2009/0122226 | A1 * | 5/2009 | Hwang et al. ............ 349/63 |
| 2009/0128499 | A1 | 5/2009 | Izadi et al. |
| 2009/0161368 | A1 * | 6/2009 | Pakhchyan et al. ............ 362/298 |
| 2010/0302185 | A1 | 12/2010 | Han |
| 2010/0302210 | A1 | 12/2010 | Han |

FOREIGN PATENT DOCUMENTS

| | | |
|---|---|---|
| JP | 10-162698 | 6/1998 |
| JP | 200494569 | 3/2004 |
| JP | 2006318512 | 11/2006 |
| WO | 0172037 | 9/2001 |
| WO | 02/45413 A1 | 6/2002 |
| WO | 2005/029395 A2 | 3/2005 |
| WO | 2005029172 | 3/2005 |
| WO | 2010141453 | 4/2005 |
| WO | 2006/044652 A1 | 4/2006 |
| WO | 2006/082444 A2 | 8/2006 |
| WO | 2007/003196 A2 | 1/2007 |
| WO | 2007/008766 A1 | 1/2007 |
| WO | 2008017077 | 2/2008 |
| WO | 2009018317 | 2/2009 |
| WO | 2009020940 | 2/2009 |
| WO | 2010141372 | 12/2010 |
| WO | 2010141380 | 12/2010 |

OTHER PUBLICATIONS

Taira, Y., et al., "Low-Power LCD Using a Novel Optical System", 2002 SID International Symposium Digest of Technical Papers, Boston, MA, May 21-23, 2002, 3 pages.
International Search Report and Written Opinion dated Apr. 28, 2011 from WO10/141371, 10 pages.
International Search Report and Written Opinion dated Mar. 1, 2011 from WO10/141308, 7 pages.
International Search Report and Written Opinion dated Apr. 28, 2011 from WO10/141453, 8 pages.
Boual, Sophie; Large, Timothy; Buckingham, Mark; Travis, Adrian; Munford, Simon, "Wedge Displays as Cameras," 2006 Society for Information Display (SID) International Symposium Digest of technical Papers, pp. 1999-2002 (2006).
Non-final Office Action issued in U.S. Appl. No. 11/833,908, mailed Sep. 13, 2010, 49 pages.
Non-final Office Action issued in U.S. Appl. No. 12/185,782, mailed Jan. 12, 2011, 14 pages.
International Search Report dated Oct. 20, 2008 from WO08/017077, 3 pages.
International Search Report dated Feb. 19, 2009 from WO09/020940, 2 pages.
International Search Report dated Jan. 29, 2009 from WO09/018317, 2 pages.
Han, Jefferson Y., "Low-Cost Multi-Touch Sensing Through Frustrated Total Internal Reflection," Media Research Laboratory, (New York University; Oct. 23-27, 2005; Seattle, Washington), 115-118.
Lee, S., Buxton, W. and Smith, K.C., "A Multi-Touch Three Dimensional Touch-Sensitive Tablet," Proceedings of the SIGCHI Conference on Human Factors in Computing Systems (San Francisco, CA, USA), CHI '85. ACM Press, New York, NY 21-25 (1955).
Malik, S and Laszio, J., "Visual Touchpad: A Two-Handed Gestural Input Device," Proceedings of the 6th International Conference on Multimodal Interfaces (State College, PA USA, Oct. 13-15, 2004), ICMI '04. ACM Press, New York, NY 289-296 (2004), 8 pgs.
Matsushita, N. and Rekimoto, J., "HoloWall: Designing a Finger, Hand, Body and Object Sensitive Wall," Proceedings of the 10th Annual ACM Symposium on User Interface Software and Technology (Banff, Alberta, Canada, Oct. 14-17, 1997), UIST '97. ACM Press, New York, NY 209-210 (1997).
Rekimoto, J., "SmartSkin: An Infrastructure for Freehand Manipulation on Interactive Surfaces," Proceedings of the SIGCHI Conference on Human Factors in Computing Systems, CHI '02. ACM Press, New York, NY 113-120 (2002), 8 pgs.
Westerman, W., Elias, J.G., and Hedge, A., "Multi-Touch: A New Tactile 2-D Gesture Interface for Human-Computer Interaction," Proceedings of the Human Factors and Ergonomics Society 45th Annual Meeting (Minneapolis/St. Paul, MN, Oct. 2001), 632-636 (2001).
Wilson, A.D., "TouchLight: An Imaging Touch Screen and Display for Gesture-Based Interaction," Proceedings of the 6th International Conference on Multimodal Interfaces (State College, PA USA, Oct. 13-15, 2004), ICMI '04. ACM Press, New York, NY (2004), 6 pgs.
State Intellectual Property Office of China, Office Action for Chinese Patent Application No. 201080034238.6, Mar. 5, 2014, 26 pages.
State Intellectual Property Office of China, Office Action Issued in Application No. 201080034238.6, Nov. 14, 2014, 6 pages.

* cited by examiner

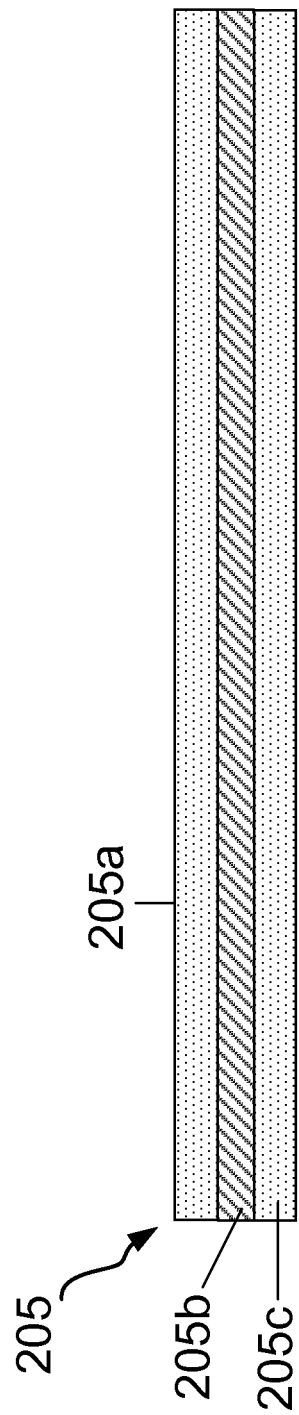

TOUCH SENSING

CROSS-REFERENCE TO RELATED APPLICATIONS

This application claims the benefit under 35 U.S.C. §119(e) of U.S. Application No. 61/219,742 entitled "Touch Sensing," filed Jun. 23, 2009, U.S. Application No. 61/182,992 entitled "Touch Sensing," filed Jun. 1, 2009, and U.S. Application No. 61/182,984 entitled "Touch Sensing," filed Jun. 1, 2009, each of which is incorporated herein by reference in its entirety.

TECHNICAL FIELD

This disclosure relates to touch sensing.

BACKGROUND

Touch sensitive systems refer, in general, to systems that detect and respond to multiple simultaneous points of contact on a surface. Typically, a touch sensitive system is incorporated within an electronic device in the form of a touch screen display that allows a user to both view and manipulate objects using one or more inputs that are in contact with the screen. Examples of electronic devices in which a touch sensitive system has been used include computer tablets, personal digital assistants (PDA), and cell-phones, among others. A variety of techniques are available that enable touch sensitive systems. For example, some touch systems identify surface contact by detecting changes in heat, pressure, capacitance or light intensity.

SUMMARY

This specification describes technologies relating to touch sensing. In general, one aspect of the subject matter described in this specification can be embodied in a touch-screen device that includes: a contact receiving structure having an exposed contact surface for receiving contact by one or more input mechanisms, the contact receiving structure being configured to emit radiation as a consequence of contact with the exposed contact surface by an input mechanism at a contact point, the emitted radiation being emitted by a region of the contact receiving structure that corresponds to the contact point; an imaging waveguide having a radiation receiving surface and an imaging surface that is different than the radiation receiving surface, the imaging waveguide being configured to: receive, at the radiation receiving surface, radiation emitted by the contact receiving structure, and transmit received radiation from a position on the radiation receiving surface to a position and with an angle of incidence on the imaging surface that are each a function of the position on the radiation receiving surface at which the transmitted radiation was received; an imaging sensor that is optically coupled to the imaging surface of the imaging optical waveguide and that is configured to detect radiation incident upon the imaging surface of the imaging optical waveguide; and a processing device configured to determine contact points on the exposed contact surface of the contact receiving structure based on the radiation detected by the imaging sensor.

This and other implementations may optionally include one or more of the following features. For example, in some implementations, the imaging waveguide is configured to transmit the received radiation by total internal reflection. The imaging waveguide can include a first side and a second side, the second side having a length that extends in a direction substantially orthogonal to a direction extended by a length of the first side, and the length of the second side being shorter than the length of the first side, in which the first side includes the radiation receiving surface and the second side includes the imaging surface.

In certain implementations, the imaging waveguide is formed to have a tapered shape. The imaging waveguide can be configured to transmit the received radiation by total internal reflection.

In some cases, the imaging waveguide includes a diffractive optical element. The diffractive optical element can include a thin hologram structure and/or a thick hologram structure. The thin hologram structure can include a blazed grating. The diffractive optical element can be located adjacent to the radiation receiving surface. The diffractive optical element can be located adjacent to a surface of the imaging waveguide opposite to the radiation receiving surface.

In some cases, the imaging waveguide includes a refractive optical element. The refractive optical element can include Fresnel prisms. The refractive optical element can include Fresnel lenses. The refractive optical element can be located adjacent to the radiation receiving surface. The refractive optical element can be located adjacent to a surface of the imaging waveguide opposite to the radiation receiving surface.

In some implementations, the imaging waveguide comprises a reflective layer opposite the radiation receiving surface.

In some cases, the radiation receiving surface includes an anti-reflection layer. The anti-reflection layer can include multiple alternating high refractive index and low refractive index layers. The anti-reflection layer can include an array of protrusions, each protrusion having a height and width smaller than a wavelength associated with the radiation emitted by the contact receiving surface.

In some implementations, the device includes a lens between the imaging sensor and the imaging surface of the imaging waveguide.

In certain cases, the device includes a display device between the contact receiving structure and the imaging waveguide. The display device can include a liquid crystal device. Alternatively, or in addition, the display device includes a light emitting diode device. The light emitting diode device can include an organic light emitting diode device.

In some cases, the contact receiving structure includes a waveguide layer and a pliable frustrating layer disposed relative to the waveguide layer so as to enable the pliable frustrating layer to contact the waveguide layer when the pliable frustrating layer is physically deformed by the input mechanism at the contact point, the pliable frustrating layer being configured to: cause frustration, at an interface between the pliable frustrating layer and the waveguide, of radiation propagating within the waveguide by total internal reflection when the pliable frustrating layer is physically deformed to contact the waveguide layer such that some of the radiation undergoing total internal reflection within the waveguide is emitted from the contact receiving structure at the interface between the pliable frustrating layer and the waveguide.

In some implementations, the contact receiving structure includes a pliable waveguide and a frustrating layer disposed relative to the pliable waveguide so as to enable the pliable waveguide to contact the frustrating layer when the pliable waveguide is physically deformed by the input mechanism at the contact point, the frustrating layer being configured to: cause frustration, at an interface between the frustrating layer and the pliable waveguide, of radiation propagating within the pliable waveguide by total internal reflection when the pliable waveguide is physically deformed to contact the frustrating layer such that some of the radiation undergoing total internal reflection within the pliable waveguide is emitted from the contact receiving structure at the interface between the frustrating layer and the pliable waveguide.

Another aspect of the subject matter described in this specification may be embodied in a touch-screen device that includes: a contact receiving structure having an exposed contact surface for receiving contact by one or more input mechanisms, the contact receiving structure being configured to emit radiation as a consequence of contact with the exposed contact surface by an input mechanism at a contact point, the emitted radiation being emitted by a region of the contact receiving structure that corresponds to the contact point; and a radiation steering structure configured to: receive the emitted radiation from the contact receiving structure at a first position, and re-direct the received radiation at an angle that is a function of the first position.

This and other implementations may optionally include one or more of the following features. For example, in some implementations, the device includes an imaging sensor configured to detect the re-directed radiation; and a processing device configured to determine contact points on the exposed contact surface of the contact receiving structure based on the re-directed radiation detected by the imaging sensor. The radiation steering structure can be further configured to re-direct the received radiation to a position on a detection surface of the imaging sensor, the position on the detection surface being a function of the first position.

In some instances, the radiation steering structure includes a diffractive optical element. The diffractive optical element can include a thin hologram structure. The diffractive optical element can include a thick hologram structure.

In some cases, the radiation steering structure comprises a refractive optical element. The radiation steering structure can be further configured to transmit the received radiation through the radiation steering structure.

In certain implementations, the radiation steering structure is further configured to reflect the received radiation from the radiation steering structure.

In some cases, the radiation steering structure includes a reflective structure. The reflective structure can include a single mirror. The reflective structure can include multiple mirrors.

In some instances, the device includes a display device between the contact receiving structure and the radiation steering structure. The display device can include a liquid crystal device. The display device can include a light emitting diode device. The light emitting diode device can include an organic light emitting diode device.

The details of one or more embodiments are set forth in the accompanying drawings and the description below. Other features will be apparent from the description and drawings, and from the claims. The technology described herein can be employed in various implementations including single touch or multi-touch sensitive devices.

BRIEF DESCRIPTION OF DRAWINGS

FIG. 2C is a schematic cross-sectional diagram of an example of a cladding layer.

DETAILED DESCRIPTION

Figure 1A:
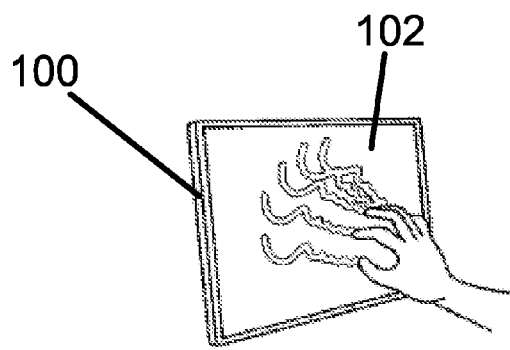
FIGS. 1A-1D show examples of how a user can interact with a multi-touch sensitive device.
Figure 1B:
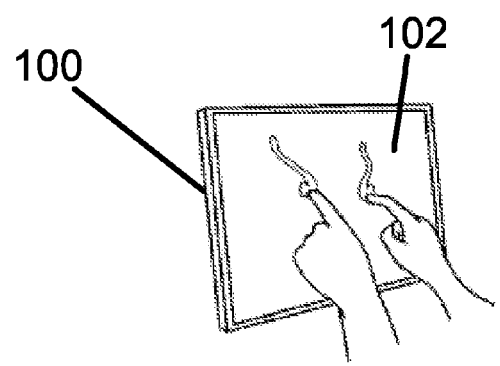
Figure 1C:
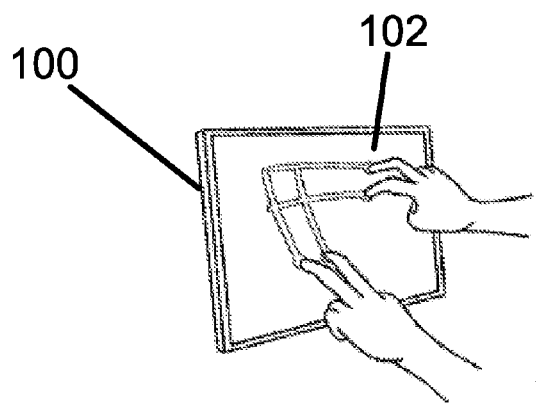
Figure 1D:
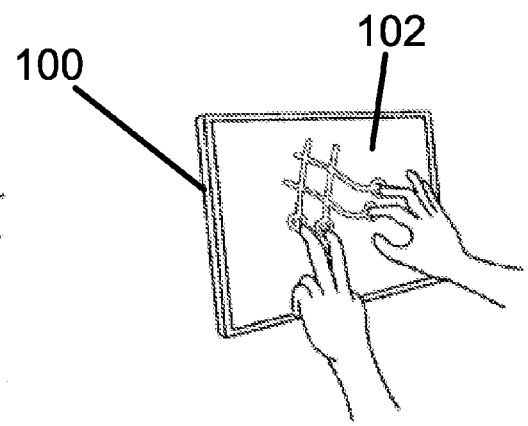

In some implementations, a touch-sensitive device is disclosed in which contact with a surface of the device causes light traveling through a waveguide to escape at or near the point of contact. The touch-sensitive device is able to contact with the device surface by detecting the escaped light. In these implementations, the touch-sensitive device can include light steering structures (e.g., waveguides, holographic structures, etc.) that steer the escaped light towards a sensor for detecting the escaped light. The light steering structures enable the sensor to be located closer to the waveguide such that a thickness of the touch-sensitive device may be reduced. To determine where contact was made on the device surface, the touch-sensitive device analyzes a position and/or angle at which the light is incident on the sensor and determines a point of contact based on the analysis.

The disclosure below is organized into three sections. A first section of the disclosure entitled, "Touch-Sensitive System," relates to a general description of how a touch-sensitive system may operate. A second section of the disclosure entitled, "FTIR in a Touch-Sensitive Device," relates to structures and methods that allow light to escape from a waveguide when contact is made with a surface of a touch-sensitive device.

A third section of the disclosure entitled, "Imaging FTIR light in a Touch-Sensitive Device," relates to structures and methods for steering escaped light toward a sensor. The third section also discusses how the detected light and corresponding structures can be used to determine where contact is made along a surface of a touch-sensitive device.

Touch-Sensitive System

A touch-sensitive system can receive an input from various sources of contact which include, for example, a human finger, a stylus, and/or a mechanical object. FIGS. 1A through 1D are diagrams of a user interacting with a multi-touch sensitive device 100. As illustrated in FIGS. 1A-1D, when a user contacts a touch-screen 102 of device 100 using one or more fingers, the device 100 detects the contact made by the user's finer(s) with the touch-screen 102 and tracks movement(s) made by the user's finger(s) along the surface of the touch-screen 102. Based on a detected path or paths traced by the user's finger(s) on touch-screen 102, device 100 can manipulate information in a corresponding display, whether the display is separate from touch-screen 102 or is integrated as part of touch-screen 102. Given that device 100 can detect contact from multiple inputs, many users may operate device 100 concurrently.

One approach for sensing the contact of one or more objects on a surface of a touch sensitive device involves sensing contact points on a waveguide by detecting points along the waveguide from which light is escaping the waveguide due to frustrated total internal reflectance (FTIR) occurring as a consequence of the contact being made with the waveguide. When light traveling in a first medium (e.g., a waveguide) encounters an interface with a second medium having a lower refractive index (e.g., air), the light traveling in the first medium may, depending on its angle of incidence with the interface, refract as it passes through the interface. If the angle of incidence is greater than a critical angle, on the other hand, the light will undergo total internal reflection (TIR) within the first medium. For example, waveguides such as fiber optic cables employ TIR to transport light efficiently with very little loss. In some cases, however, such total internal reflection of light can be "frustrated" by replacing the medium having the lower refractive index with another material that allows the light to escape from the waveguide, i.e., a "frustrating" layer. By sensing the escaped light, it may be possible to detect the location at which the new material was introduced.

Implementations of a touch sensitive device disclosed herein include a pliable frustrating layer that deforms responsive to surface manipulation (e.g., pressure from a finger interacting with a display), which causes a portion of the frustrating layer at the location of the surface manipulation to physically contact a waveguide layer therebeneath. Light that travels along the waveguide, e.g., via total internal reflection, escapes at the point of contact with the frustrating layer to yield a detectable position of the frustrating layer deformation, and hence surface manipulation (i.e., total internal reflection of light in the waveguide is "frustrated" at the point of contact between the waveguide and the frustrating layer).

Other implementations of a touch sensitive device include a pliable waveguide that is configured to deform responsive to surface manipulation (e.g., pressure from a finger interacting with a display), which causes a portion of the waveguide at the location of the surface manipulation to physically contact a frustrating layer therebeneath. Light that travels along the waveguide, e.g., via total internal reflection, escapes at the point of contact to yield a detectable position of waveguide deformation, and hence surface manipulation (i.e., total internal reflection of light in the waveguide is frustrated at the point of contact between the waveguide and the frustrating layer).

FTIR in a Touch-Sensitive Device

The following section of the disclosure relates to examples of structures used to sense contact of one or more objects on a surface based on FTIR and methods of operating those structures. In particular, various methods of inducing FTIR in waveguides and optionally controlling the escaped light are discussed.

Figure 2A:
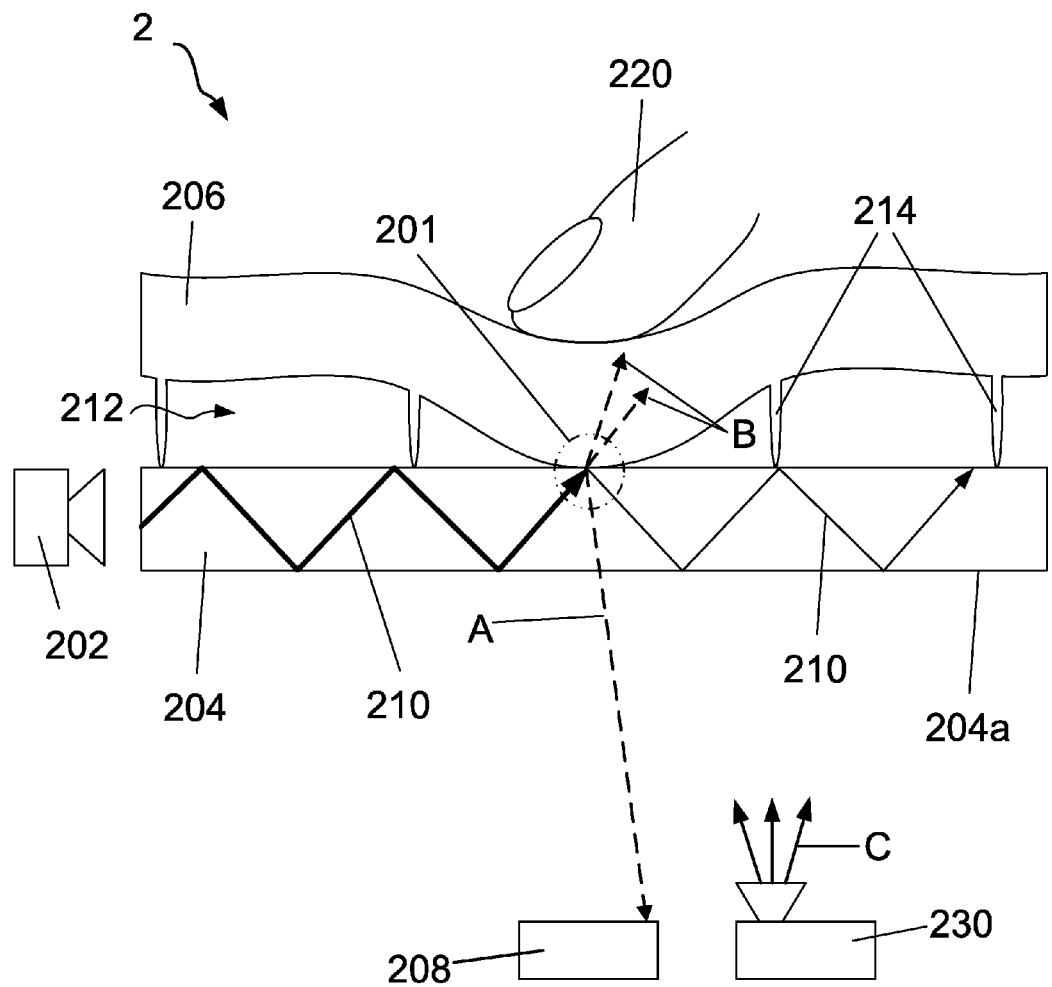
FIGS. 2A, 2B, 2D, 3, 4, 19A, 19B and 23-25 are schematic cross-sectional diagrams of examples of touch sensitive devices.

FIG. 2A is a schematic cross-sectional diagram of an example of a touch sensitive device 2, in which a point of contact with device 2 is detected based on FTIR. As shown in the schematic, device 2 includes a radiation source 202, a waveguide 204, a pliable frustrating layer 206 above waveguide 204 and an imaging sensor 208. Pliable frustrating layer 206 is formed from a material that has a refractive index comparable to or greater than waveguide 204 and is flexible enough to respond to pressure applied by an input such that sufficient contact can be made with waveguide layer 204. Pliable frustrating layer 206 is positioned relative to waveguide 204 such that a small gap 212 exists between pliable frustrating layer 206 and waveguide 204. In some implementations, protrusions 214 may be formed on or as part of frustrating layer 206 to maintain gap 212 between the pliable frustrating layer 206 and the waveguide 204. In such implementations, protrusions 214 (e.g., surface roughness) can be formed integrally with pliable frustrating layer 206, i.e., protrusions 214, together with frustrating layer 206, form a single mass of seamless, contiguous material. In some implementations, protrusions 214 are a result of the microroughness that exists on the surface of frustrating layer 206 in which the spacing between protrusions 214 is random or semi-random. In some cases, protrusions 214 are formed from material distinct from frustrating layer 206. For example, glass spacers could be used to separate an acrylic waveguide from a polycarbonate frustrating layer. The spacing between protrusions 214 can be random, pseudo-random or periodic.

Electromagnetic radiation (e.g., infrared (IR) radiation) is emitted from radiation source 202 and coupled into waveguide 204. Due to the refractive index difference between waveguide 204 and the medium surrounding waveguide 204, at least some of the coupled radiation then undergoes TIR and proceeds to travel down waveguide 204. For example, waveguide 204 could be formed from a layer of acrylic surrounded by air. Given the refractive index difference between acrylic (n=1.49) and air (n=1.0), radiation introduced by radiation source 202 into waveguide 204 at an appropriate angle of incidence propagates within and along the acrylic layer by TIR.

Due to the presence of air gap 212 between pliable frustrating layer 206 and waveguide 204, little or no frustration of TIR within waveguide 204 occurs absent some external stimulus. However, when pliable frustrating layer 206 is depressed by, for example, a user's finger 220, a portion of pliable frustrating layer 206 contacts waveguide layer 204 in a region 201 (identified by dashed line circle) corresponding to the point of depression. When the portion of pliable frustrating layer 206 contacts waveguide 204, total internal reflection within waveguide 204 is frustrated, causing at least some radiation to escape from the waveguide 204. Upon frustration, the escaped radiation can continue to travel in generally the same direction as it was traveling in the waveguide. Alternatively or in addition, some of the escaped radiation may escape in different directions. Locally depressing frustrating layer 206 may cause substantial local deformation of waveguide layer 204 or frustrating layer 206 as frustrating layer 206 comes into contact with waveguide layer 204. In contrast, portions of waveguide layer 204 or frustrating layer 206 far from the region of contact between waveguide 204 and frustrating layer 206 may experience little or no deformation. Such pronounced local deformation may lead to an increase in the area of physical contact between compliant frustrating layer 206 and waveguide layer 204, thereby causing an increased amount of IR to escape from waveguide 204 in the region of the point of contact.

It should be noted that although protrusions 214 contact waveguide 204, the area of contact between protrusions 214 and waveguide 204, when no pressure is applied to frustrating layer 206, is relatively small compared to the area of contact between layer 206 and waveguide 204 when frustrating layer 206 is depressed. Accordingly, frustration of TIR that might occur in the regions of contact between protrusions 214 and waveguide 204 is negligible when no pressure is applied to frustrating layer 206. Additionally or alternatively, such FTIR can be accounted for when processing images of light that has escaped from waveguide 204 (e.g., by generating and subtracting a background image from the images of light that has escaped from waveguide 204) because such FTIR remains substantially constant due to the fact that the positions of protrusions 214 are fixed.

As shown in FIG. 2A, some of the escaped radiation, represented by arrow "A," escapes from surface 204a of waveguide 204 and proceeds to travel in a direction towards imaging sensor 208. Imaging sensor 208 images the radiation that escapes from surface 204a. As a result, imaging sensor 208 can discriminately sense, for successive instants of time, points of contact that are sufficiently forceful to deform pliable frustrating layer 206 such that it contacts a substantial portion of waveguide 204 relative to the portion of waveguide 204 contacted by frustrating layer 206 when no pressure is applied. That is, for a "single" point of contact on pliable frustrating layer 206, such as contact by finger 220 shown in FIG. 2A, a single "area" of contact corresponding to the area of pliable frustrating layer 206 that comes into contact with waveguide 204 is discriminately sensed by imaging sensor 208. Likewise, when two or more objects (e.g., two or more fingers of a user) contact and depress pliable frustrating layer 206, multiple areas of contact are discriminately (and concurrently) sensed by imaging sensor 208. For ease of discussion, the term "a point of contact" may be used throughout this disclosure to refer more generally to any region or area at which contact is made. In some cases, at least a portion of radiation 210 continues to propagate by TIR in waveguide 204, as shown in FIG. 2A. Some of the radiation that escapes from waveguide 204 may travel in a direction toward pliable frustrating layer 206. As a result, a portion of the escaped radiation, as shown by arrows "B" in FIG. 2A, never reaches imaging sensor 208. In some cases, the escaped radiation can be re-directed or steered by structures incorporated into the touch-sensitive device 2. For example, diffractive, refractive and/or reflective structures may be added to the touch-sensitive device depicted in FIG. 2A in order to steer radiation indicated by arrows "B" in the same direction as radiation indicated by arrow "A."

Reflective structures can include, for example, highly reflective films such as thin film metals or dielectric mirrors. Diffractive structures can be formed on or adjacent to the frustrating layer and can include, for example, diffraction gratings having a single-bit modulated binary (e.g., square-wave) profile, a multiple-bit modulated binary (i.e., stepped) profile, a sinusoidal (i.e., sine-shaped grooves and ridges) profile, a semi-sinusoidal (i.e., half sine-wave grooves or half sine-wave ridges) profile, a saw-tooth profile, a blazed profile, or an aperiodic profile, among others. Alternatively, or in addition, the diffractive structures can include thin or thick hologram structures. Refractive structures also can be formed on or adjacent to the frustrating layer and can include, for example, prisms and/or lenses having a blazed profile, a saw-tooth profile, a sinusoidal profile, a semi-sinusoidal profile, a spherical profile or a truncated saw-tooth profile, among others.

In some implementations, the frustrating layer 206 may be formed from an engineered material having light-steering microstructures formed within or on a surface of the engineered material, with the light-steering microstructures being configured to steer radiation/light in one or more particular directions. In some implementations, the light-steering structures are formed in a light-steering layer that is separate from frustrating layer 206 and/or a different material from frustrating layer 206. Various implementations of such engineered materials and light-steering microstructures for re-directing radiation that escapes from waveguide 204 may be employed within or on the frustrating layer 206.

In some implementations, the engineered microstructures which are employed on or within frustrating layer 206 and/or light-steering layer include may include diffractive optical elements (DOEs). In general, a DOE structure is a structure that includes a pattern of refractive index variations on the order of a wavelength of light and which primarily diffracts incident radiation. Depending on the design and construction, a DOE structure transmits or reflects incident radiation in one or more directions.

DOE structures include a class of structures called holographic optical elements (HOE) that may be considered to fall within two categories: thin hologram structures and thick (volume) hologram structures. In general, thin hologram structures include surface structures or planes of refractive index variation that vary substantially perpendicularly to the surface on which the radiation is incident and can be used to steer a range of wavelengths into one or more particular directions. Thick hologram structures, on the other hand, typically include planes of refractive index variations that run substantially parallel to the surface on which radiation is incident.

Figure 2B:
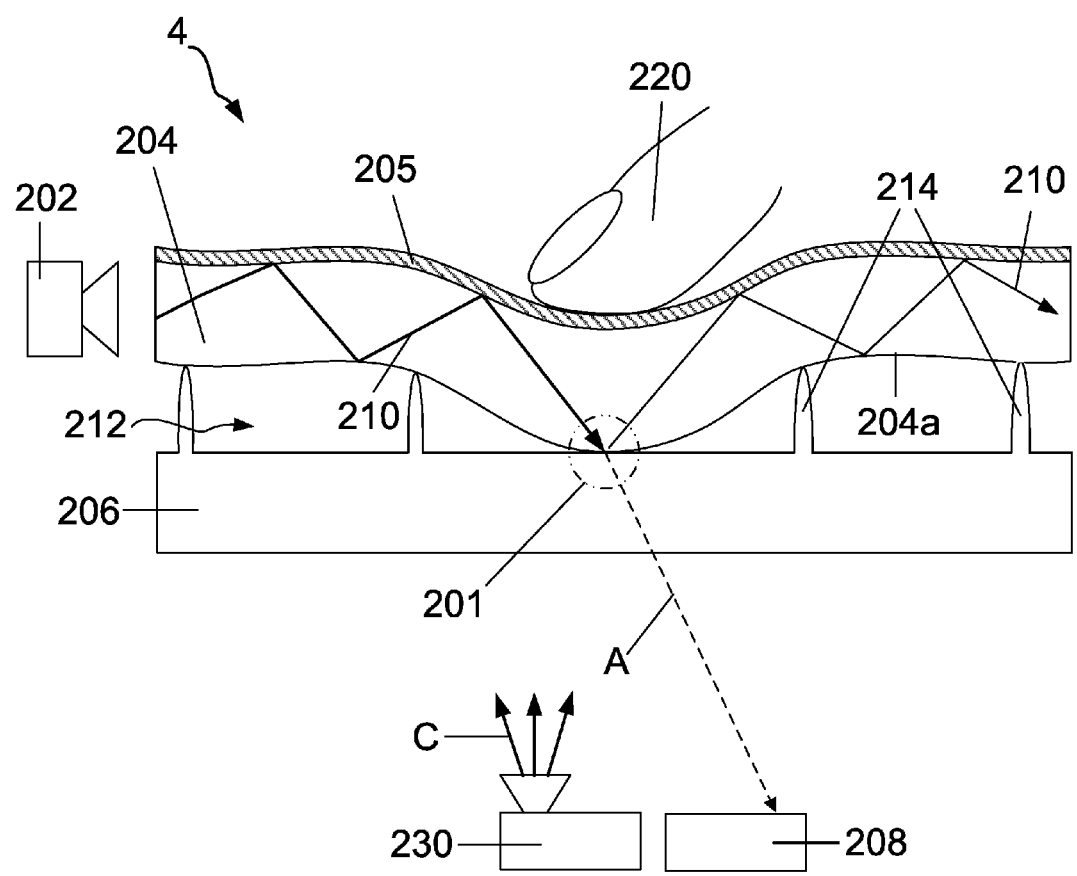

Alternatively, or in addition to having a pliable frustrating layer, the touch sensitive device includes a pliable waveguide that is formed from a pliable material flexible enough to respond to pressure applied by an input. For example, FIG. 2B is a cross-sectional schematic diagram of an example touch sensitive device 4, in which a point of contact with device 4 is detected based on a pliable waveguide layer 204 contacting a frustrating layer 206.

Similar to device 2, device 4 includes a radiation source 202 for emitting electromagnetic radiation into pliable waveguide 204 and an imaging sensor 208 for detecting light that escapes from waveguide 204 due to FTIR. Frustrating layer 206 is positioned relative to the pliable waveguide 204, in which protrusions 214 maintain a small gap 212 between the pliable waveguide 204 and the frustrating layer 206. As in the previous example illustrated in FIG. 2A, protrusions 214 can be formed integrally with frustrating layer 206, such as a micro-roughness layer, or can be formed from material distinct from frustrating layer 206 and/or waveguide 204. At least some of the coupled radiation undergoes TIR and proceeds to travel along waveguide 204 due to the refractive index difference between pliable waveguide 204 and the medium surrounding the waveguide. In contrast to device 2, however, pliable waveguide 204 of device 4 deforms responsive to surface manipulation (e.g., pressure from a finger interacting with a display), causing a portion of waveguide 204 corresponding to the surface manipulation to touch the frustrating layer 206 therebeneath. The refractive index of frustrating layer 206 is comparable to or greater than the refractive index of pliable waveguide 204. Accordingly, at least some of the radiation that travels along the waveguide via TIR escapes (as shown by arrow "A") at the point of contact 201 due to FTIR and can be sensed by imaging sensor 208 to yield a detectable position of waveguide deformation, and hence surface manipulation.

Imaging sensor 208 images the radiation that escapes from a surface of waveguide 204. As a result, imaging sensor 208 can discriminately sense, for successive instants of time, points of contact that are sufficiently forceful to deform pliable waveguide 204 such that it contacts a substantial portion of frustrating layer 206 relative to the portion of frustrating layer 206 contacted by waveguide 204 when no pressure is applied. That is, for a "single" point of contact on waveguide 204, such as contact by finger 220 shown in FIG. 2A, a single "area" of contact corresponding to the portion of frustrating layer 206 that contacts waveguide 204 is discriminately sensed by imaging sensor 208. Likewise, when two or more objects (e.g., two or more fingers of a user) contact and depress waveguide 204 concurrently, multiple areas of contact are discriminately (and concurrently) sensed by imaging sensor 208.

As with touch sensitive device 2 shown in FIG. 2A, it should be noted that although protrusions 214 contact compliant waveguide 204 in device 4, the area of contact between protrusions 214 and waveguide 204, when no pressure is applied to pliable waveguide 204, is relatively small compared to the area of contact between frustrating layer 206 and pliable waveguide 204 when pliable waveguide 204 is depressed. Accordingly, frustration of TIR that might occur in the regions of contact between protrusions 214 and waveguide 204 is negligible when no pressure is applied to pliable waveguide 204.

In some implementations, locally depressing pliable waveguide 204 may cause substantial local deformation of frustrating layer 206 as waveguide 204 comes into contact with frustrating layer 206. In contrast, portions of frustrating layer 206 far from the region of contact between compliant waveguide 204 and frustrating layer 206 may experience little or no deformation. Such pronounced local deformation may lead to an increase in the area of physical contact between compliant waveguide 204 and frustrating layer 206, thereby causing an increased amount of IR to escape from compliant waveguide 204 in the region of the point of contact.

In some cases, diffractive, refractive and/or reflective structures may be added to touch-sensitive device 4 depicted in FIG. 2B in order to steer radiation indicated by arrow "A" toward the imaging sensor 208. The reflective structures can include, for example, highly reflective films such as thin film metals or mirrors. The diffractive structures can be formed on or adjacent to the frustrating layer and can include, for example, diffraction gratings having a single-bit modulated binary profile, a multiple-bit modulated binary profile, a sinusoidal profile, a semi-sinusoidal profile, a spherical profile, a saw-tooth profile, a blazed profile, or an aperiodic profile, among others. Alternatively, or in addition, the diffractive structures can include DOE structures, such as thin or thick HOE structures. The refractive structures also can be formed on or adjacent to the frustrating layer and can include, for example, prisms and/or lenses having a blazed profile, a saw-tooth profile, a sinusoidal profile, a semi-sinusoidal profile, or a truncated saw-tooth profile, among others.

The materials selected for frustrating layer 206 in FIG. 2A and for the waveguide layer 204 in FIG. 2B may be pliable so as to respond to pressure that is applied by an input, such as a user's finger. However, it should be noted that either a rigid or non-rigid material can be used to form waveguide 204 in FIG. 2A and frustrating layer 206 in FIG. 2B. In each of the example configurations shown in FIGS. 2A and 2B, waveguide 204 and frustrating layer 206 can be formed from materials that include, but are not limited to, acrylics (e.g., polymethylmethacrylate (PMMA)), polyvinyl butyral (PVB), polycarbonates (PC), polyethylene terrephthalates (PET), polyvinyl chlorides (PVC), triacetate cellulose (TAC), and transparent polyurethanes (TPU). In some implementations, pliable waveguide 204 is formed from materials that support TIR of infrared light. When integrated as part of a display, both frustrating layer 206 and waveguide 204 can be formed from a material that is transparent (or at least transmissive) to the range of wavelengths emitted by a display light source. For example, frustrating layer 206 and/or waveguide 204 may be formed glass or PMMA, which are highly transmissive in both the visible and near-infrared regions of the spectrum.

In each of the examples shown in FIGS. 2A and 2B, frustrating layer 206 can be configured to have a substantially uniform thickness that is within a range of approximately 100 µm through 300 µm. In selecting an appropriate thickness for frustrating layer 206, the following considerations may be taken into account. If frustrating layer 206 is too thin, it may be difficult to manipulate and handle, for example, during manufacturing. On the other hand, if frustrating layer 206 is too thick, it may cause a parallax issue, where a user perceives a point of contact to be displaced (e.g., by the thickness of frustrating layer 206) from the actual object (produced by a display light source) with which the user is attempting to interact. In alternative implementations, frustrating layer 206 may be configured to be thinner than 100 µm (e.g., about 10 µm or about 30 µm) or thicker than 300 µm (e.g., about 1 mm or about 2 mm).

In each of the examples shown in FIGS. 2A and 2B, the edges of waveguide 204 can be polished to maximize TIR coupling of radiation from source 202. In some implementations, the waveguide 204 shown in FIG. 2A (or FIG. 2B) may be configured to have a substantially uniform thickness that is within a range of approximately 0.5 mm through 20 mm. In selecting an appropriate thickness for waveguide 204, the following considerations may be taken into account. In certain applications, it is advantageous to use a thin waveguide. Thinness can serve multiple goals, including decreasing scattering and diffusion of visible light emitted relative to systems using thicker waveguides, thus improving the visual quality of the display. In some cases (such as the configuration shown in FIG. 2B), a thin waveguide diminishes the amount of pressure necessary to deform the waveguide, leading to more comfortable use. Alternatively, in some cases (such as, for example, the configuration shown in FIG. 2A), a waveguide 204 that is too thin may not provide a sufficiently rigid surface, e.g., the waveguide may bend excessively with typical contact force expected to be applied to touch-sensitive device 200 during use. Alternatively, or in addition, if waveguide 204 is too thin, an insufficient amount of radiation may be coupled into waveguide 204 from source 202. In implementations that utilize one or more lasers for radiation source 202, however, it may be possible to use a thinner waveguide 204 and still have a sufficient amount of radiation couple into the waveguide 204 than in implementations that utilize one or more LEDs as source 202.

In some cases, if waveguide 204 is too thick, this may lead to an increase in the weight and cost of touch-sensitive device 200. Alternatively, or in addition, if waveguide 204 is too thick, the waveguide may degrade the quality of output images displayed by the device and/or the touch-view parallax is excessive. Minimizing the distance between the input and the image displayed below the touch surface can, in some implementations, reduce visual parallax errors.

In some cases, contacting pliable waveguide 204, as shown in FIG. 2B, with a finger, stylus or other object can cause inadvertent frustration of total internal reflection within waveguide 204 even if waveguide 204 is not depressed enough to come into contact with frustrating layer 206. In addition, such objects may damage waveguide 204. Accordingly, in some implementations, a cladding layer 205 is positioned on top of compliant waveguide 204. To maintain total internal reflection of radiation within waveguide 204, cladding layer 205 can be formed of a material that has a refractive index lower than or equal to waveguide 204. Cladding layer 205 may prevent the occurrence of inadvertent FTIR and serves as a barrier between waveguide 204 and a contacting object. In addition, cladding layer 205 protects waveguide 204 from damage and/or contamination when waveguide 204 is contacted by an object such as a finger or stylus. In some implementations, touch sensitive device 2 also can include a cladding layer (not shown) positioned on or above a surface of frustrating layer 206.

FIG. 2C is a cross-sectional schematic of an example of a cladding layer 205 that can be positioned above a pliable frustrating layer 206 or pliable waveguide layer 204 of a touch-sensitive device as described with regard to FIG. 2A or 2B. When integrated as part of a display, cladding layer 205 also is transparent (or at least transmissive) to the range of wavelengths emitted by a display light source.

As shown in the example of FIG. 2C, cladding layer 205 may include an anti-glare layer 205a, an infrared (IR) filter 205*b* and a non-wetting layer 205*c*. IR filter layer 205*b* functions filters out or reflects ambient IR light incident on touch-sensitive device 200 so as to reduce (e.g., prevent) occurrences in which image sensors 208 detect ambient IR light and erroneously detect contact with device 200. An example of material that can be used in an IR filter layer includes ClearAS, commercially available from Sumitomo Osaka Cement Co., Ltd. Anti-glare layer 205*a* is a scratch-resistant, low friction film disposed on a top surface of IR filter layer 205*b*. A film that can be used as an anti-glare layer includes, for example, a textured polyester film such as Autotex, which is commercially available from MacDermid Inc.

In some cases, substantial regions of cladding layer 205 may contact frustrating layer 206 such that cladding layer 205 appears to "wet" pliable frustrating layer 206 or pliable waveguide layer 204, depending on the configuration of the touch sensitive device. In some implementations, such regions of "wetting" can alter the amount of visible light that is reflected between frustrating layer 206 (or waveguide layer 204) and cladding layer 205, resulting in portions of touch-sensitive device 200 that appear as blotches when dark images are displayed. By forming anti-wetting layer 205*c* on a bottom surface of IR filter layer 205*b*, however, the size and number of wetting regions may be reduced. Similar to anti-glare layer 205*a*, anti-wetting layer 205*c* also may be a polyester film, such as Autotex. Alternatively, in some cases, cladding layer 205 can be formed of a single film of polytetrafluoroethylene (PTFE) or acrylic film. The films in cladding layer 205 may be bonded together using, for example, an optical adhesive. In some implementations, an air gap exists between cladding layer 205 and frustrating layer 206 (or waveguide layer 204). The air gap may be maintained using, for example, the surface roughness of the bottom surface of cladding layer 205 (e.g., surface roughness of the non-wetting layer 205*c*).

In each of the examples of shown in FIGS. 2A and 2B, radiation source 202 can include multiple light emitting diodes (LEDs), which are arranged directly against an edge of waveguide 204 so as to maximize coupling of electromagnetic radiation into total internal reflection. Other sources of electromagnetic radiation, such as laser diodes, may be used instead. In some implementations, source 202 can be selected to emit radiation in the infrared (IR) portion of the electromagnetic spectrum such that its emissions do not interfere with visible light if either device 2 or 4 is integrated into a display.

In some implementations, the touch sensitive display device can include one or more image sensors 208 as part of the display device (e.g., image sensors 208 may be embedded on or within the display device). Various detectors may be used as imaging sensor 208 including, for example, charge-coupled devices (CCDs), photo-diodes or complimentary metal-oxide-semiconductor (CMOS) sensors. In some cases, a lens is placed in front of imaging sensor 208 to focus light on sensor 208. Alternatively, or in addition the imaging sensor 208 may include one or more waveguides and/or lenses to assist guiding the incident radiation towards a detection area of a sensing device. The output of imaging sensor 208 is supplied to a suitable computer (not shown) or other electronic device capable of handling image-processing operations, such as rectification, background subtraction, noise removal, and analysis for each video frame. Machine vision tracking techniques then may be employed by the computer or other electronic device to translate the captured images into discrete touch events and strokes. Such processing may be carried out by any suitable computing system.

In some implementations, touch sensitive devices 2 and/or 4 are combined with a rear-projection source 230 (e.g., a video projector) that is capable of emitting light (indicated by arrows "C") in order to display images visible to the user. Accordingly, touch sensitive devices 2 and/or 4 can function as both a sensing and a display device at the same time. In implementations where a rear-projection source 230 is used to generate output images, frustrating layer 206 may be configured to be diffusive in the visible spectrum such that frustrating layer 206 operates as a screen onto which the output images projected by rear-projection source 230 are projected. Alternatively, devices 2 and/or 4 can be configured to include a separate screen that includes a diffusive material or layer, which is diffusive in the visible spectrum such that the diffusive material or layer may operate as a screen onto which the output images projected by rear-projection source 230 are projected. The diffusive material/layer of the projection screen can be combined either alone or in combination with another diffuser film.

Although FIGS. 2A-2B show projection source 230 arranged alongside imaging sensor 208, projection source 230 also can be disposed at other locations and/or away from imaging sensor 208, generally with the aid of suitable optics devices. As illustrated in FIGS. 2A-2B, devices 2 and/or 4 may include a single imaging sensor 208 and a single projection source 230. In certain implementations, the distance between imaging sensor 208 and pliable waveguide 204 is large enough such that a field of view of sensor 208 is capable of imaging/detecting radiation escaping from waveguide 204 at substantially any point of contact along the surface of waveguide 204. However, in other implementations, multiple projectors and/or multiple imaging sensors can be employed so that different images/videos can be projected onto different respective portions of a display and so that radiation escaping from different portions of waveguide 204 can be detected. In such implementations, the imaging sensors and projectors may be spaced apart from one another along a single axis, multiple axes, along a grid system, or in other suitable manners.

In some implementations, a liquid crystal display (LCD) technology or light emitting diode (LED) display technology, which includes organic light emitting diode (OLED) display technology, can be used in place of projector technology in the touch-sensitive devices 2 and/or 4. Employing LCD or LED display technology instead of rear projection technology enables a touch sensitive device that has reduced volume and thickness compared to a device which utilizes projector technology. Using LEDs, OLEDs or LCD panels also may increase portability. Such "thin-panel" touch-sensitive systems can be used in laptop screens, flat-panel displays, PDA's and cell phones, among other devices. LCD panels, LED and OLED arrays can be used as the light source in any of the examples and implementations described herein.

Figure 2D:
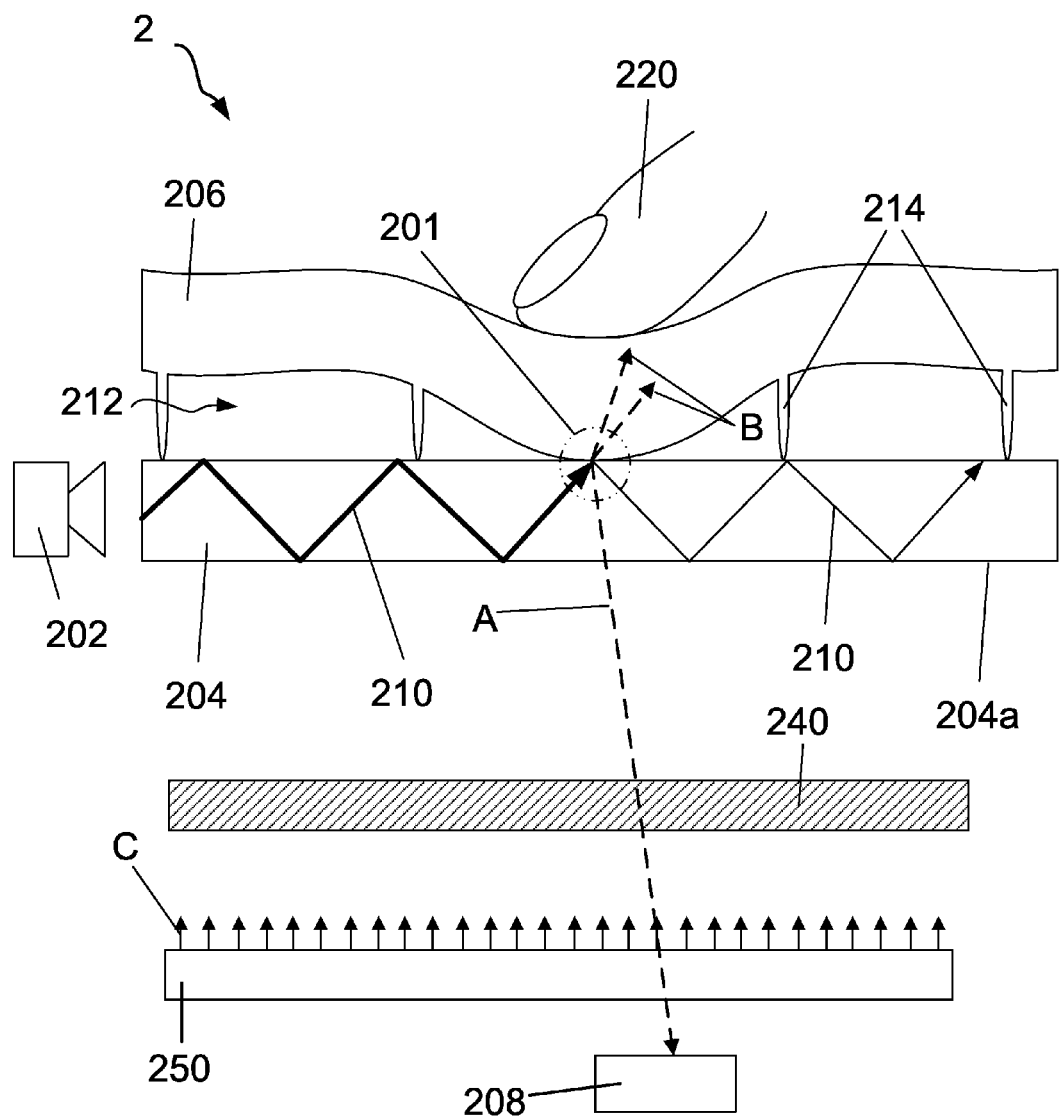

For example, FIG. 2D is a schematic diagram of a cross-section of a touch sensitive device 6 that employs an LCD panel 240 and backlight 250 to generate a visible display. Although device 6 is shown employing an arrangement in which pliable frustrating layer 206 is configured to contact a surface of waveguide 204, it may also employ a pliable waveguide configured to contact a surface of a frustrating layer. As illustrated in FIG. 2D, the LCD panel 240 and backlight 250 are disposed beneath frustrating layer 206. Although not shown, LCD panel 240 may include one or more components or layers such as, for example, a liquid crystal layer, a color filter layer, one or more polarizer layers, one or more electrode layers, and a substrate layer (e.g., a glass substrate). Other layers or components can be included as well. Similarly, LED and OLED panels can include, but are not limited to, one or more layers or components, such as a light emitting diode layer, an electrode layer, an adhesive/encapsulant layer and a substrate layer (e.g., a glass substrate). Although not shown, backlight 250 also may be bonded and/or fixed to a bottom surface of LCD panel 240.

Individual pixel portions within LCD panel 240 can be configured to block or transmit visible light, represented by arrows "C," emitted by backlight 250 in order to display an image. Furthermore, LCD panel 240 may be transparent to infrared radiation so that infrared light "A" that escapes from surface 204a of waveguide 204 passes through LCD panel 240 and can be imaged by imaging sensor 208. In some implementations, the backlight 250 also may be transparent to radiation that escapes from waveguide 204. In some implementations, LEDs (or OLEDs) can be used as the light source in FTIR-based touch sensitive devices Because LEDs (OLEDs) themselves are emissive elements, in implementations in which LEDs (OLEDs) are used to generate output images, there may be no need for a backlight (e.g., backlight 250).

To further reduce the thickness of the touch-sensitive device, relative to a touch sensitive display device that employs a rear-mounted imaging sensor, it can be advantageous to replace the optics and/or imaging sensor with a thin/flat imaging apparatus that senses radiation escaping the waveguide due to FTIR. In addition to a reduction in thickness, a substantially flat and/or thin imaging apparatus can, in some cases, reduce the number of optical components and sensors of the touch-sensitive device, leading to a decrease in manufacturing costs.

Imaging FTIR Light in a Touch-Sensitive Device

In general, a large distance may be required between a touch image sensor and a touch sensitive surface so that the image sensor can sense contact on the entire touch sensitive surface with sufficient resolution. To minimize the distance between the sensor and touch sensitive surface, however, light steering structures may be employed to re-direct light that has escaped a waveguide due to FTIR. The light steering structures enable the sensor to be located closer to the waveguide such that a thickness of the touch-sensitive device may be reduced. The following section of the disclosure relates to examples of structures used to direct and image light that has escaped a waveguide due to FTIR as a result of one or more objects contacting a surface of a touch-sensitive device. In particular, various methods of re-directing the escaped light and determining the location(s) of one or more points of contact with the device surface are discussed.

Figure 3:
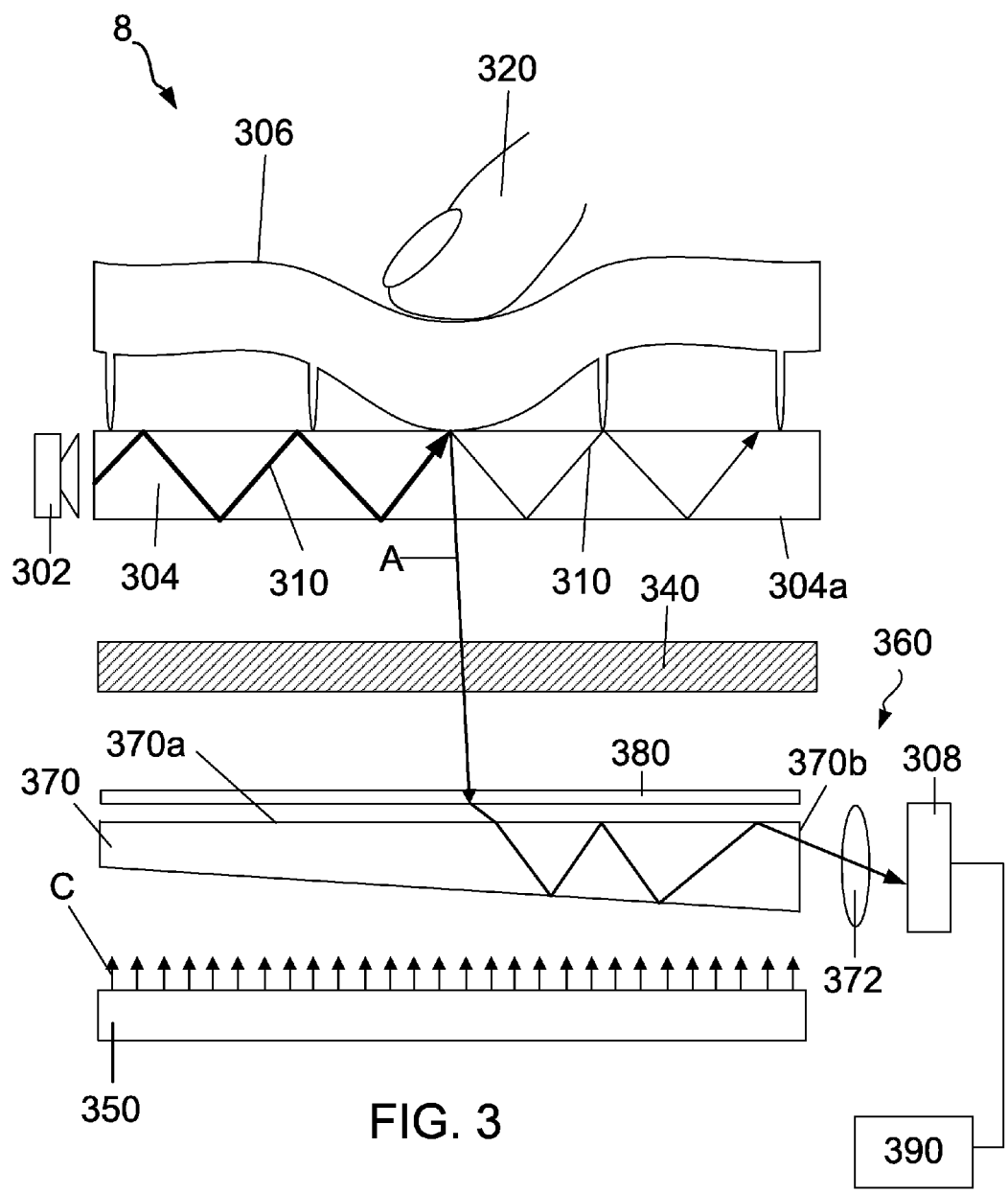

FIG. 3 is a cross-sectional schematic diagram of an example touch sensitive device 8. Although FIG. 3 shows a pliable frustrating layer 306 contacting a waveguide 304, a similar arrangement can be used in which a pliable waveguide layer is configured to contact a frustrating layer. The touch-sensitive device 8 employs an imaging apparatus 360 disposed so as to be able to detect radiation (identified by arrow "A") that escapes from waveguide 304 as a consequence of FTIR caused by contact between the pliable frustrating layer 306 and the waveguide layer 304. As explained above, in some cases, diffractive structures, refractive structures or reflective structures can be included in the device to steer the escaped radiation towards a position that is essentially directly underneath the point of contact between waveguide 304 and frustrating layer 306. The thin imaging apparatus 360 can further be configured to identify, based on the detected radiation, a general position at which an input contacts the touch-sensitive device. In the example shown in FIG. 3, an LCD panel 340 and backlight 350 are employed to generate a visible display. Although the backlight 350 is shown beneath imaging apparatus 360, it may instead be positioned above imaging apparatus 360. Both LCD panel 340 and backlight 350 may be transparent to the wavelengths of light that escape from waveguide 304. In some implementations, a projection light source or LEDs (e.g., such as OLEDs) can be used as the light source in place of LCD panel 340 and backlight 350.

Apparatus 360 includes an imaging sensor 308, a lens 372, a light-steering structure/coupling device 380 and a wedge-shaped imaging waveguide 370. Imaging waveguide 370 has a first surface that is angled with respect to a second opposite surface, such that a profile of the waveguide appears to have a taper or "wedge" profile, as opposed to a rectangular profile. Imaging sensor 308 is positioned adjacent to the thick edge 370b of waveguide 370. Wedge-shaped waveguide 370 can be used to guide radiation, received on surface 370a, by TIR towards imaging sensor 308 such that the position at which a ray of radiation is incident along surface 370a correlates with a unique angle of incidence upon edge 370b. Radiation then passes from waveguide 370 through lens 372 which converts the angle of incidence on edge 370b into a position along an imaging surface of sensor 308. The ray of radiation incident on imaging sensor 308 then can be processed by any suitable computing system to determine the position along surface 370a of the imaging waveguide 370 at which the ray of radiation was received as well as the position at which the ray of radiation exited from waveguide 304 as a consequence of FTIR caused by contact between the pliable frustrating layer 306 and the waveguide 304. In this manner, the point at which finger 320 contacted frustrating layer 306 can be determined. For example, FIG. 3 illustrates a computing device 390 coupled to the imaging sensor 308, in which data from imaging sensor 308 is passed to the computing device 390. The computing device 390 then determines a position at which contact was made with the touch-sensitive device based on the data received from the imaging sensor 308.

In some implementations, the lateral position at which an input contacts the touch-sensitive device may be located nearly exactly above the lateral position along surface 370a at which radiation is received. In such implementations, radiation that escapes from waveguide 304 is steered toward a position that is essentially directly underneath the point of contact between waveguide 304 and frustrating layer 306.

In other implementations, the lateral position along surface 370a at which radiation is received may not be located nearly exactly below the lateral position at which the input contacted the touch-sensitive device. Instead, the lateral position along surface 370a at which radiation is received may be displaced by some lateral distance from the lateral position at which the input contacted the touch-sensitive device. For example, in these implementations, radiation may escape waveguide 304 at a shallow angle relative to the surface of waveguide 304 from which the radiation escapes, travel some distance, and then enter imaging waveguide 370 at a grazing angle relative to surface 370a. In such circumstances, the lateral position at which the radiation enters the waveguide 370 does not correspond to the same general lateral position of the point of contact between waveguide 304 and frustrating layer 306. Instead, the radiation enters waveguide 370 at a point that is laterally displaced from where it escaped waveguide 304. In such implementations, the displacement between the lateral position at which an input contacts the touch-sensitive device and the lateral position at which radiation enters waveguide 370 is determined, and the computing device 390 is configured to account for this lateral displacement when determining the position at which an input contacted the touch-sensitive.

It should be appreciated that both the imaging waveguide 370 and the imaging sensor 308 have a depth that extends into and out of the page and that the touch-sensitive device is capable of determining a 2D point of contact with the touch-sensitive device.

Multiple different implementations of imaging apparatus 360 can be used to guide radiation, which escapes from a waveguide due to FTIR, towards an imaging sensor. For example, in some implementations, the imaging apparatus may employ techniques based on multiple reflections, such as TIR as shown in FIG. 3, to guide the received radiation toward an imaging sensor. In alternative implementations, techniques based on a single reflection (e.g., using a mirror and/or lenses) are employed to direct received radiation toward the imaging sensor. Additionally or alternatively, the imaging waveguide can be configured to include structures, such as diffractive optical elements and/or refractive optical elements that collect and/or steer radiation (that escapes a waveguide, such as, for example, waveguide 304, due to FTIR) in one or more desired directions in order to couple the escaped radiation into the imaging waveguide. In some implementations, the diffractive optical element and/or refractive optical element structures can be incorporated within the touch-sensitive device separately from the imaging waveguide in a separate light steering layer. For example, such structures can be formed on a separate layer located beneath and/or above the imaging waveguide. In other configurations, such structures can be formed as part of the frustrating layer.

Figure 4:
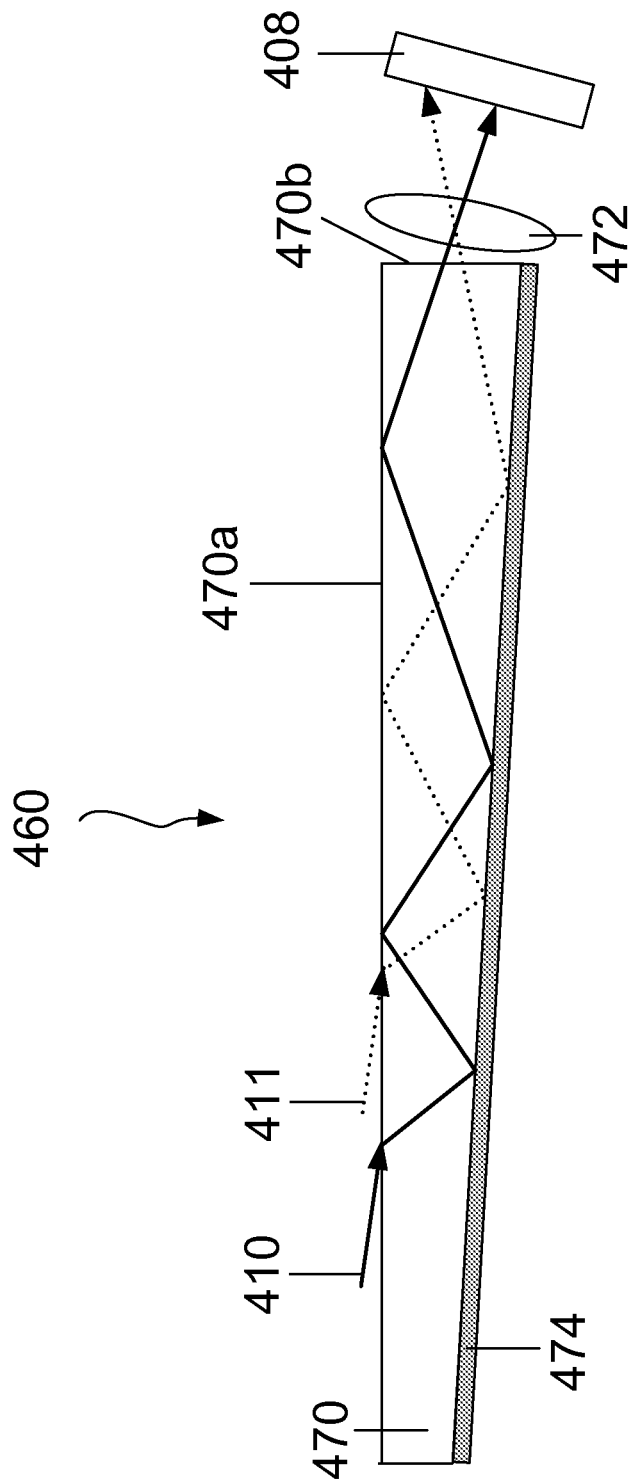

FIG. 4 is a cross-sectional schematic diagram illustrating a possible path of radiation 410 along wedge waveguide 470. Waveguide 470 is formed from a material (e.g., glass) that has a refractive index higher than the refractive index of a surrounding medium (e.g., air) such that TIR of radiation is possible. As shown in the example, once radiation 410 enters waveguide 470, it proceeds by TIR towards edge 470b at the thick end of the taper. Each time radiation 410 impinges against the glass/air interface along the angled surface of the imaging waveguide 470, its direction changes with respect to the opposite glass/air interface. That is, as radiation 410 propagates through waveguide 410, the angle of incidence of radiation 410, with respect to a normal of the tapered face, becomes shallower until radiation 410 impinges on edge 470b. Consequently, the angle at which radiation 410 impinges on edge 470b maps to a lateral position along surface 470a where the radiation 410 entered waveguide 470.

Similarly, the angle of incidence of radiation 411 (which also enters waveguide 470 and proceeds by TIR towards edge 470b), becomes shallower changes with respect to the tapered face until it impinges on edge 470b. The angle at which radiation 411 impinges on edge 470b maps to a lateral position along surface 470a where the radiation 411 entered waveguide 470. Accordingly, radiation 410 and radiation 411 impinge on edge 470b at different angles and/or different positions given the different positions at which they entered waveguide 470. Although the taper is illustrated on the bottom of waveguide 470 (i.e., the side of the waveguide 470 furthest away from the point of contact), the taper may be located instead on the waveguide top (i.e. the side of waveguide 470 nearest to the point of contact).

In some implementations, the angled side of the imaging waveguide 470 can be coated with a reflective layer 474 to ensure that radiation propagating through waveguide 470 does not escape from the angled side of waveguide 470. Reflective layer 474 may be formed to extend across all of or less than the entire surface of the angled side of imaging waveguide 470. Reflective layer 474 is formed of material that is reflective to radiation traveling through imaging waveguide 470. If the touch-sensitive device incorporates a display, reflective layer 474 also may be transparent (or at least transmissive) to wavelengths of light emitted by a projection source or backlight (e.g., visible light). In some cases, reflective layer 474 can be formed on a surface of the imaging waveguide 470 using techniques such as electron beam deposition, thermal evaporation, chemical vapor deposition or sputtering. In some cases, the reflective layer can be formed from multiple layers of polymers with varying refractive indices. The resulting stack of polymer layers can selectively reflect a range of wavelengths (i.e., a bandpass filter). Such filters can be used to reflect near IR light while leaving the visible light spectrum mostly unaffected. An example of a mirror stack suitable for this purpose includes the Multilayer Optical Film manufactured by 3M.

Referring again to FIG. 3, radiation that escapes waveguide 304, for example, as a consequence of FTIR, encounters surface 370a of the wedge-shaped waveguide 370 at a relatively steep angle. In order to ensure that this radiation couples into the wedge-shaped waveguide 370 upon encountering surface 370a and thereafter undergoes TIR within the wedge-shaped waveguide 370 and travels down the wedge-shaped waveguide 370 towards edge 370b and imaging sensor 308, it may be necessary to adjust the angle of incidence of the radiation on surface 370a. Otherwise, if the angle of incidence on surface 370a is too small (relative to the surface normal), the radiation may simply experience a relatively small amount of refraction upon encountering surface 370a, ultimately passing through waveguide 370 without undergoing TIR. Therefore, optical structures, in, for example, a light-steering layer, may be positioned adjacent to surface 370a of the wedge-shaped waveguide 370 to steer the incident radiation at a desired angle. Notably, the angle of the wedge-shaped waveguide 370 (i.e., the angle between the top surface 370a and the bottom surface opposite surface of waveguide 370) is large enough such that light entering surface 370a is steered into a steep enough angle after reflecting off the surface of waveguide 370 opposite surface 370a that the light is from then on totally internally reflected within waveguide 370. Alternatively, or in addition, an optical coupler 380 may be positioned adjacent (or near) waveguide 370 to increase the incidence angle on surface 370a (i.e., the angle of incidence relative to the normal of surface 370a), reducing the wedge angle required to TIR-capture the light after the first bounce.

Various types of structures can be employed to ensure that radiation that escapes waveguide 304 couples into wedge-shaped imaging waveguide 370. For example, in some cases, a diffractive optical element (DOE) structure can be formed on or adjacent to the wedge waveguide to steer radiation that escapes from the waveguide as a consequence of FTIR into the wedge waveguide. In general, a DOE structure is a structure that includes a pattern of refractive index variations on the order of a wavelength of light and which primarily diffracts incident radiation. A DOE structure can be generated digitally or recorded optically as an interference pattern between two wavefronts of coherent light. In some implementations, the patterns of refractive index variations in the DOEs may be formed by transferring an interference pattern to material such that a series of fringes representing intensity minima and maxima of the interference pattern correspond to the patterns of refractive index variation. For example, interference patterns can be transferred to a recording material using techniques such as interference lithography. The pattern can be represented by a periodic, random, semi-random, or mathematically complex, deterministic variation of refractive index or thickness across one or more different materials.

In some cases, the fringes of the transferred interference pattern correspond to a grating structure. Depending on the design and construction, a DOE structure transmits or reflects incident radiation in one or more directions (i.e., diffraction orders). DOE structures can include surface diffusing structures that are formed on or within a surface of a material, or volume diffusing structures that are formed integrally through at least a portion of the material bulk.

DOE structures include a class of structures called holographic optical element (HOE) structures. HOE structures can be considered as a generalized case of gratings, where the structure can be periodic, aperiodic, random or noisy, or some combination of these. In addition, they can also vary continuously or discretely (piecewise) across their aperture. HOE structures may be considered to fall within two categories: thin hologram structures and thick (volume) hologram structures. In general, thin hologram structures include surface structures or planes of refractive index variation that vary substantially perpendicularly to the surface on which the radiation is incident and are generally used to transmissively steer a range of wavelengths into one or more particular directions. However, in some cases, if the refractive index variations are generally parallel with the surface on which the incident radiation is incident, then the thin hologram structures also can be designed steer radiation reflectively. In addition, reflective thin hologram structures may have a reflective film (e.g., reflective materials such as gold) on their surface to enhance the reflectivity of the structure. If the thin hologram structures are embossed or otherwise form a single interface between a solid material and air, they are sometimes referred to as surface-relief structures.

Figure 5A:
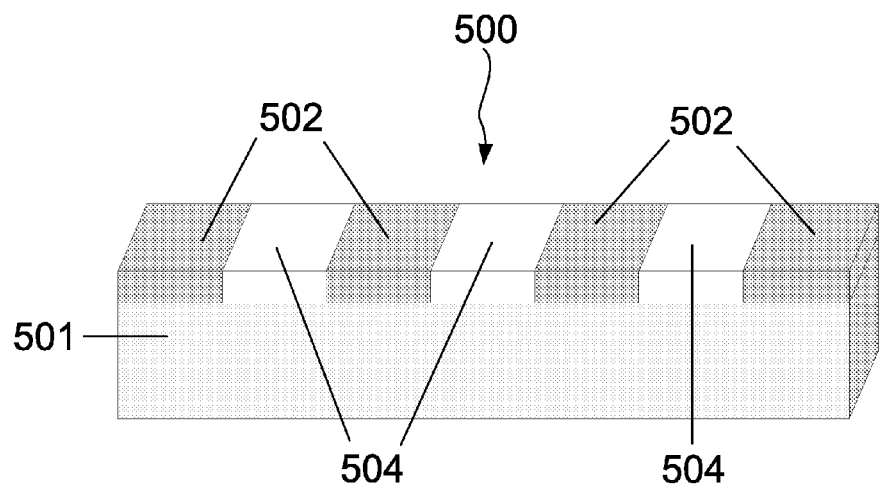
FIG. 5A is a diagram of an example of a thin hologram structure.

An example of a thin hologram structure is shown in FIG. 5A. The example structure 500 includes first regions 502 alternating with second regions 504 formed on a substrate 501, in which the refractive index of region 502 is different from region 504. The size of each of the first and second regions 502, 504 is on the order of the preferred wavelength of incident radiation. For example, for incident radiation in the near-infrared range, regions 502, 504 can have a width, length and/or height each of which are generally on the order of 300-2000 nm.

Figure 5B:
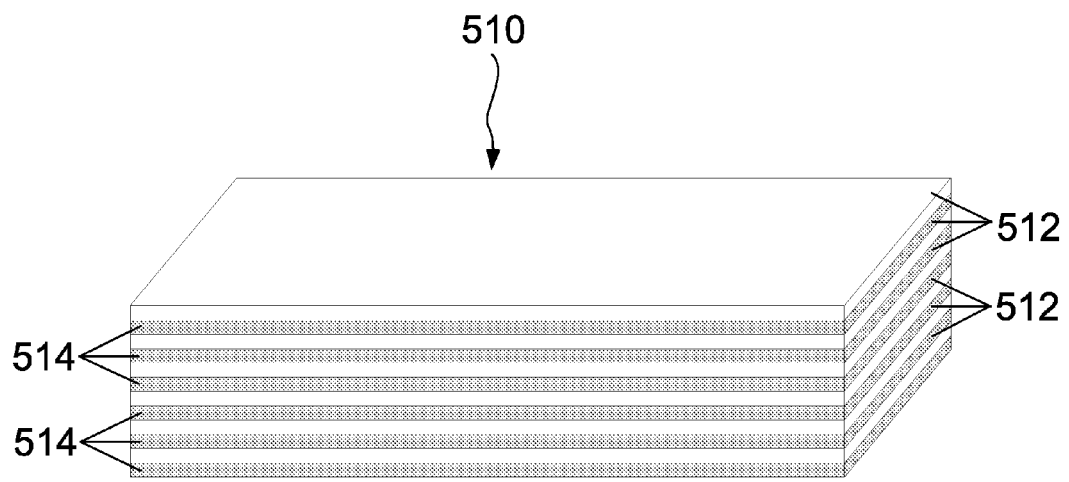
FIG. 5B is a diagram of an example of a thick hologram structure.

In contrast to thin hologram structures, thick holograms generally rely on the effect of Bragg selectivity to reflect or transmit a narrow range of wavelengths incident at one or more specific incident angles into one or more particular directions. An example of a thick hologram structure is illustrated in FIG. 5B. The example structure 510 includes first layers 512 alternating with second layers 514 in which the refractive index of layer 512 is different from layer 514. Similar to the thin hologram structure, a thickness of each of the first and second layers 512, 514 is on the order of half the preferred wavelength of incident radiation. Thick hologram structures can be designed to preferentially transmit or reflect incident radiation based on the direction along which the refractive index variations extend. For example, a thick hologram structure having a refractive index that varies in a direction substantially perpendicular to the surface on which radiation is normally incident is primarily reflective. In contrast, a thick hologram structure having a refractive index that varies in a direction substantially parallel to the surface on which radiation is normally incident is primarily transmissive.

Optical modeling software packages are available to facilitate the design of thin or thick hologram structures to direct radiation in a desired direction. Code V® is one example of such an optical modeling software package that can be used to design thin or thick hologram structures to direct radiation in a desired direction. Other optical modeling software packages also are available.

Examples of wedge-shaped imaging waveguides that include thin hologram structures for steering incident radiation are shown in FIGS. 6-11. As will be described further below in connection with FIGS. 16-18, the thin hologram structures are not limited to use in conjunction with wedge-shaped imaging waveguides but can be used with various imaging waveguides of different shapes, including, for example, imaging waveguides having a substantially rectangular profile. The structures presented herein are not drawn to scale. Thus, although reflective and transmissive hologram structures may appear similar, the illustrated dimensions and proportions should not be considered exact representations of actual devices and components.

Figure 6:
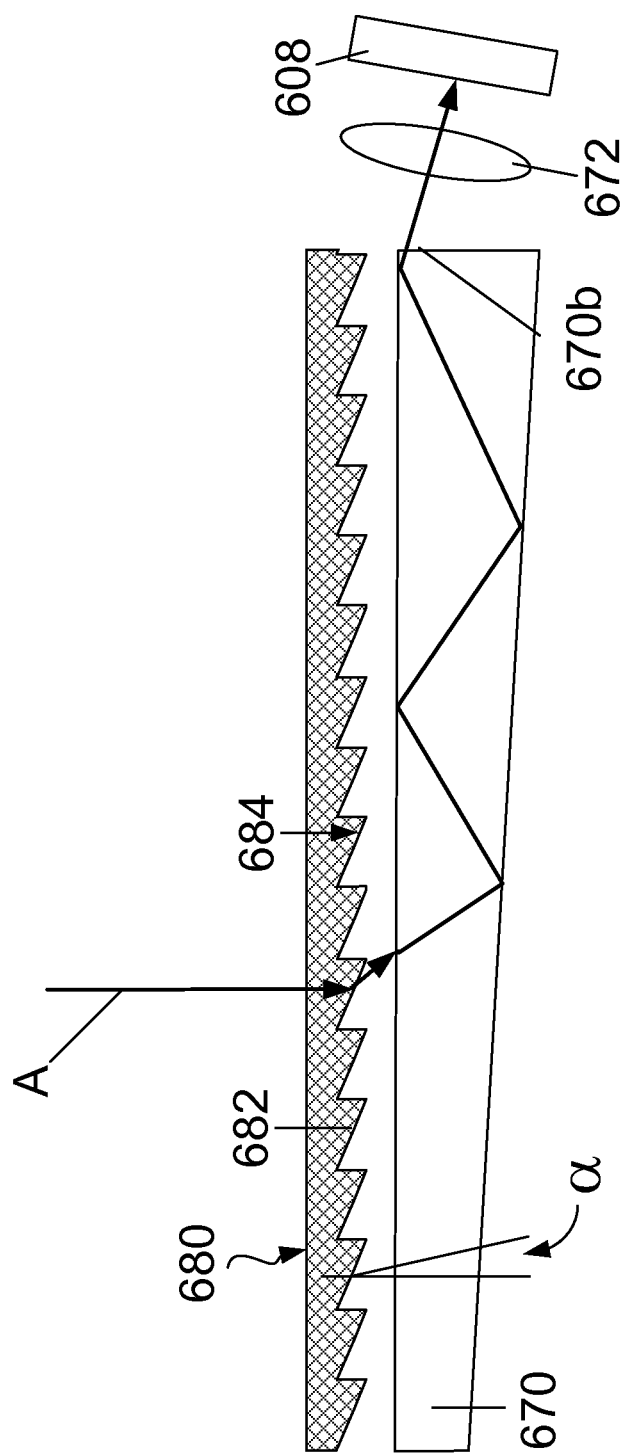
FIGS. 6-18, 20-21 and 22 are schematic cross-sectional diagrams of examples of imaging apparatuses for use in a touch-sensitive device.

FIG. 6 is a schematic cross-sectional diagram of an example imaging apparatus for use in a touch-sensitive device. The imaging apparatus includes a wedge-shaped waveguide 670, a lens 672, a transmissive hologram structure 680 and an imaging sensor 608. Radiation (indicated by arrow "A") that escapes from a separate waveguide (not shown) due to FTIR impinges on the transmissive thin hologram structure 680. The structure 680 then re-directs the incident radiation along a direction that allows TIR coupling into waveguide 670 (provided the angle of wedge-shaped waveguide 670 is large enough). That is, once radiation enters waveguide 670, it continues to propagate by TIR. The thin hologram structure 680 can be positioned so as to be close to a top surface 670a of the waveguide 670. For example, the hologram structure 680 can be separated from the waveguide 670 by about 1 mm or less, or about 500 microns or less. The gap between the waveguide 670 and the structure 680 can be filled with, for example, air or vacuum.

Thin hologram structure 680 has a blazed grating profile. Grooves 684 of structure 680 form triangular profile ridges 682 with a blaze angle, $\alpha$. The blaze angle $\alpha$ is a measure of the blaze slope with respect to a normal to the plane on which the blaze structure is formed. Furthermore, the length of ridges 682 can extend uniformly across the surface of structure 680 (i.e., into and out of the page). Changing the spacing between the blazed ridges determines the output direction (i.e., the separation between diffractive orders) of the transmitted radiation while changing the blaze angle $\alpha$ affects the efficiency in which incident radiation is transmitted into a particular diffractive order.

The material which forms ridges 682 of thin hologram 680 can be transparent (or at least transmissive) to the wavelength of the incident radiation. If the touch-sensitive device incorporates a display, ridges 682 also can be transparent (or at least transmissive) to the wavelengths of radiation (e.g., visible light) used to generate the display.

Figure 7:
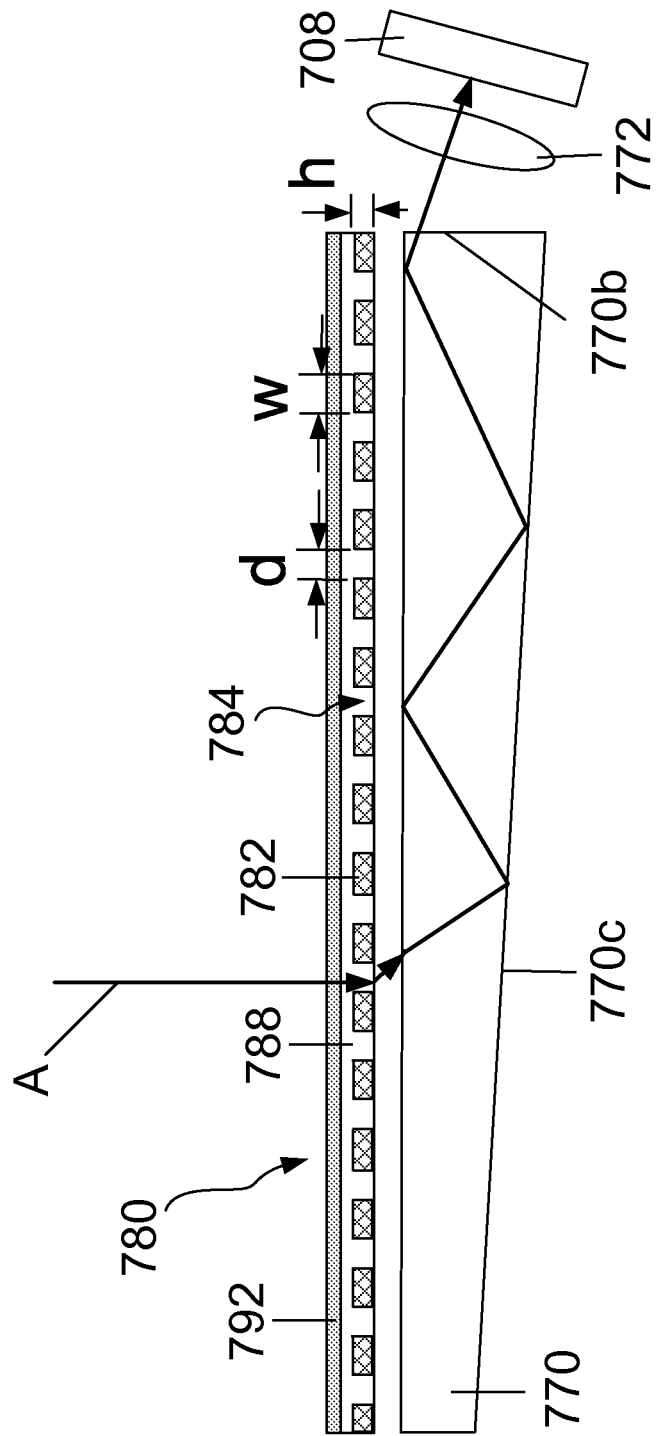

Other variations of thin hologram structures also may be used in conjunction with an imaging waveguide to ensure that incident radiation is coupled into the imaging waveguide. FIGS. 7-11 are schematic cross-sectional diagrams of example imaging apparatuses for use in a touch-sensitive device. For example, FIG. 7 shows a thin hologram structure 780 having a 1-bit binary (or more generally square-wave) diffraction grating profile. Hologram structure 780 can be positioned so as to be close to a top surface 770a of the waveguide 770. For example, the hologram structure 780 can be separated from the waveguide 770 by about 500 microns or less. The gap between waveguide 770 and structure 780 can be filled with, for example, air or vacuum.

Hologram structure 780 may be formed from a series of regularly spaced ridges 782 having thicknesses h and widths w that are spaced apart from one another by grooves 784 of distance d. The ridges 783 can be formed on or in a substrate 788. Furthermore, the length of ridges 782 can extend uniformly across the surface of wedge waveguide 770 (i.e., into and out of the page). The direction of radiation transmitted by hologram structure 780 is a function of the periodicity, $\Pi=w+d$, of ridges 782 and the radiation wavelength. Accordingly, the hologram structure is designed such that incident radiation is re-directed at an angle which is sufficient to couple into the wedge waveguide 770 and propagate by TIR.

The material which forms ridges 782 and/or substrate 788 of thin hologram 780 can be transparent (or at least transmissive) to the wavelength of the incident radiation. If the touch-sensitive device incorporates a display, ridges 782 and/or substrate 788 also can be transparent (or at least transmissive) to the wavelengths of radiation (e.g., visible light) used to generate the display.

In some implementations, the thin hologram structure can be coated with an anti-reflection coating 792. The presence of an anti-reflection coating 792 on thin hologram structure 780 reduces reflection (Fresnel reflectance) of the incident radiation. Thus, the efficiency of the touch-sensitive device can be improved given that less light will be lost to reflection. The anti-reflection coating can include, for example, a single layer coating, multiple layers or a moth-eye structure. A single layer anti-reflection coating may include a single quarter-wave layer of transparent material whose refractive index is the square root of the substrate's refractive index. Multi-layer anti-reflection coatings may include alternating layers of a low-index material and a higher-index material.

Moth-eye anti-reflection coatings typically correspond to films having features smaller than the wavelength of incident light. A moth-eye structure may create what is effectively a gradient-index film from a material of uniform refractive index. For example, a moth-eye anti-reflection film may include a hexagonal or rectangular array of tapered features, each smaller than the wavelength of light. The moth-eye structure behaves as if it were a gradient-index film with a refractive index that varies continuously from that of the surrounding medium to that of the underlying substrate. Accordingly, moth-eye structures appear similar to a continuous refractive index gradient such that reflections are reduced.

Single layer, multi-layer and moth-eye anti-reflection films can be designed for an ultraviolet (UV), visible, and infrared (IR) radiation. Such anti-reflection coatings can be fabricated using techniques such as electron-beam deposition, plasma deposition, holographic interference lithography, and reactive ion etching.

Anti-reflection coatings also can be formed on the edge 770b of the imaging waveguide 770 to reduce reflections as radiation passes from waveguide 770 to imaging sensor 708. In implementations where the touch-sensitive device is incorporated into a display, the touch-sensitive device may include a display light source to illuminate a display screen. Furthermore, the imaging waveguide may be positioned above or in front of the display light source such that light emitted by the display source passes through the imaging waveguide before reaching the display screen. Accordingly, the imaging waveguide can be configured so it is transparent to light emitted by the display light source. Nevertheless, some light still may be reflected upon reaching the bottom tapered surface 770c of the imaging waveguide. Therefore, an anti-reflection coating also can be formed on the bottom surface 770c of the imaging waveguide to reduce reflections that may occur at that surface.

Figure 8:
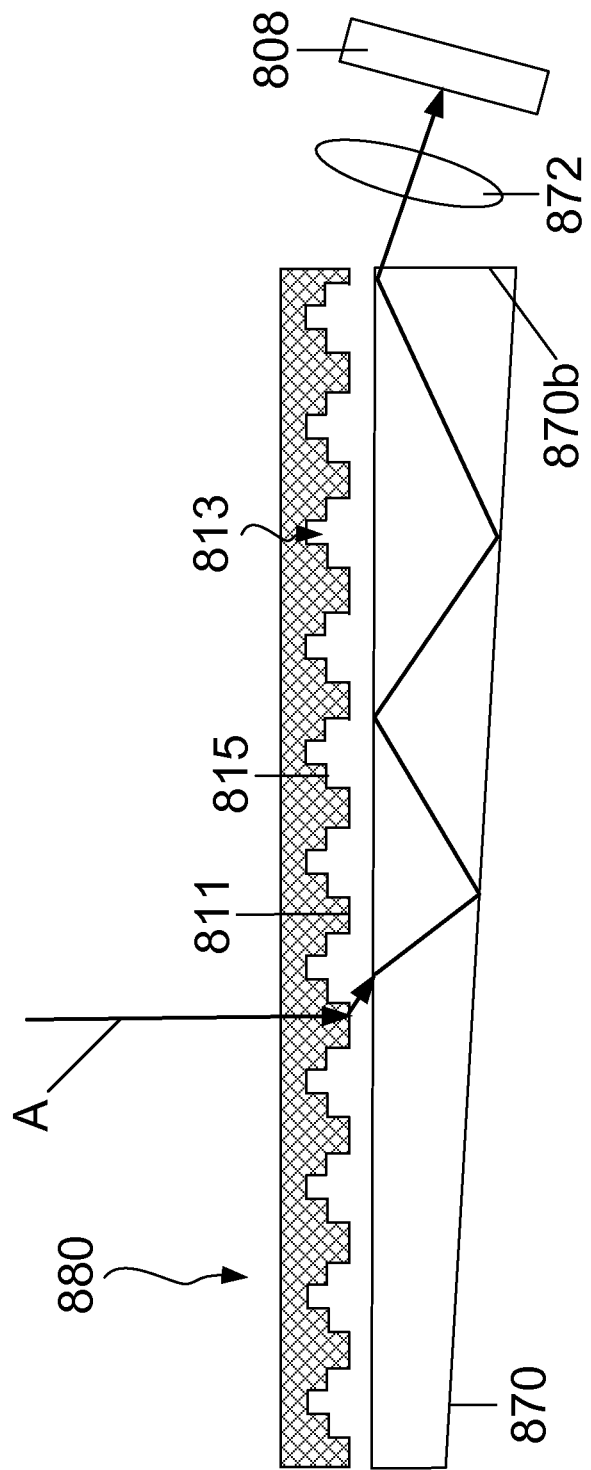
Figure 9:
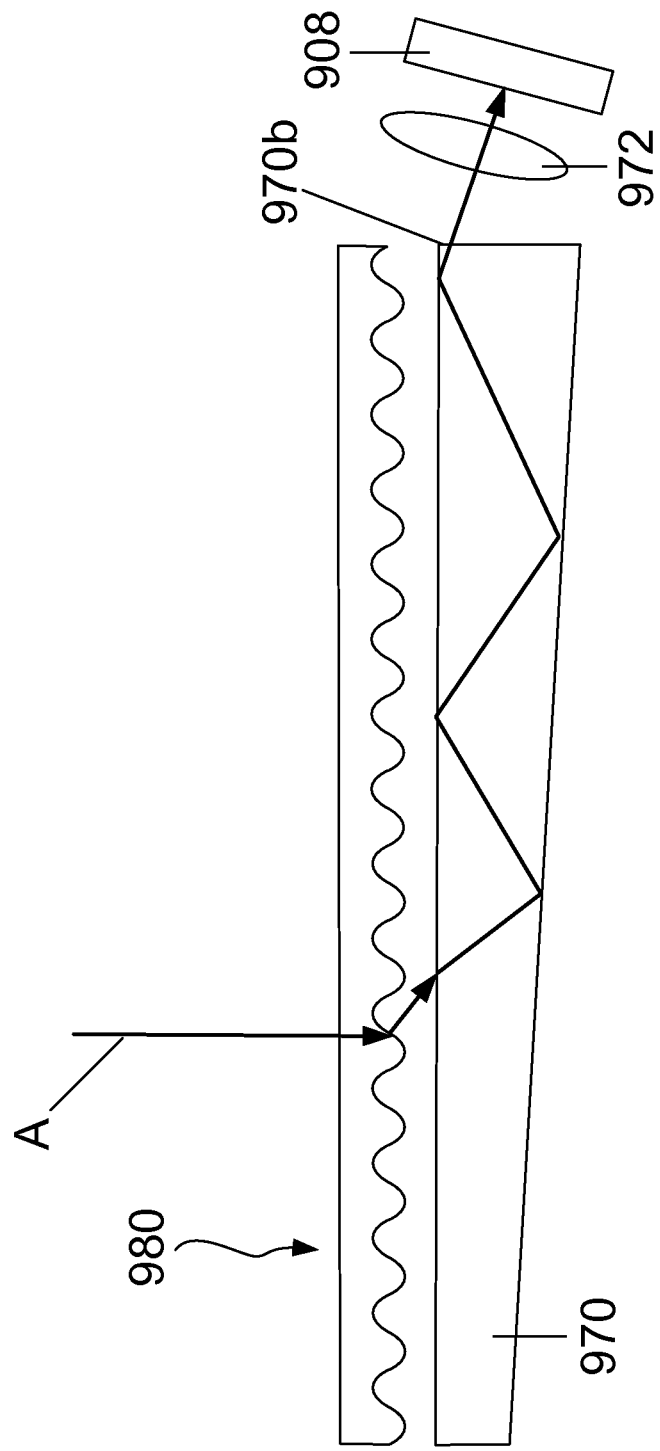

As illustrated in FIG. 8, a hologram structure 880 is formed adjacent to the surface of a wedge-shaped imaging waveguide 870, in which the structure 880 includes a multi-level or multiple-bit modulated binary grating profile as opposed to the single step profile of the hologram structure 780 illustrated in FIG. 7. The multi-level binary grating profile is also sometimes referred to as an "Aztec" structure. As illustrated in FIG. 8, the hologram structure includes ridges 811 and grooves 813 separated by shelves 815. In some implementations, the square-wave structures can be replaced with other periodic structures. For example, FIG. 9 illustrates a hologram structure 980 having a sinusoidal-shaped profile, i.e., a symmetrical, sine-wave shaped grooves and ridges. The length of the grooves and ridges can extend uniformly across the surface of structure 980 (i.e., into and out of the page). Similar to the thin hologram structure shown in FIG. 7, the direction of radiation transmitted by hologram structure 980 is a function of its periodicity Hand the wavelength of incident radiation. In some cases, the profile can be semi-sinusoidal, i.e., symmetrical, half sine-wave shaped grooves.

The thin hologram structures described in connection with FIGS. 6-9 can be formed from materials including, for example, Polyethylene terephthalate (PET), acrylic/polymethylmethacrylate (PMMA) or polycarbonate (PC). The profiles can be manufactured using embossing techniques, in which embossing shims are made from diamond-turned, digitally or optically generated masters. Another common means of replication is to photo-cure impressions of the structures in resin on a PET or other substrate material. Other techniques may be used as well. The substrate having the embossed or photo-cured impressions then can be positioned on a surface of the imaging waveguide using, for example, optical adhesives.

In some implementations, the thin hologram structure can be positioned beneath a bottom surface of the imaging waveguide as opposed to the top surface as shown in FIGS. 6-9. Thus, when radiation enters the imaging waveguide, the hologram structure re-directs the radiation such that it propagates by TIR within the imaging waveguide (provided the angle of wedge-shaped waveguide is large enough). Accordingly, in such implementations, the thin hologram structure is reflective instead of transmissive.

Figure 10:
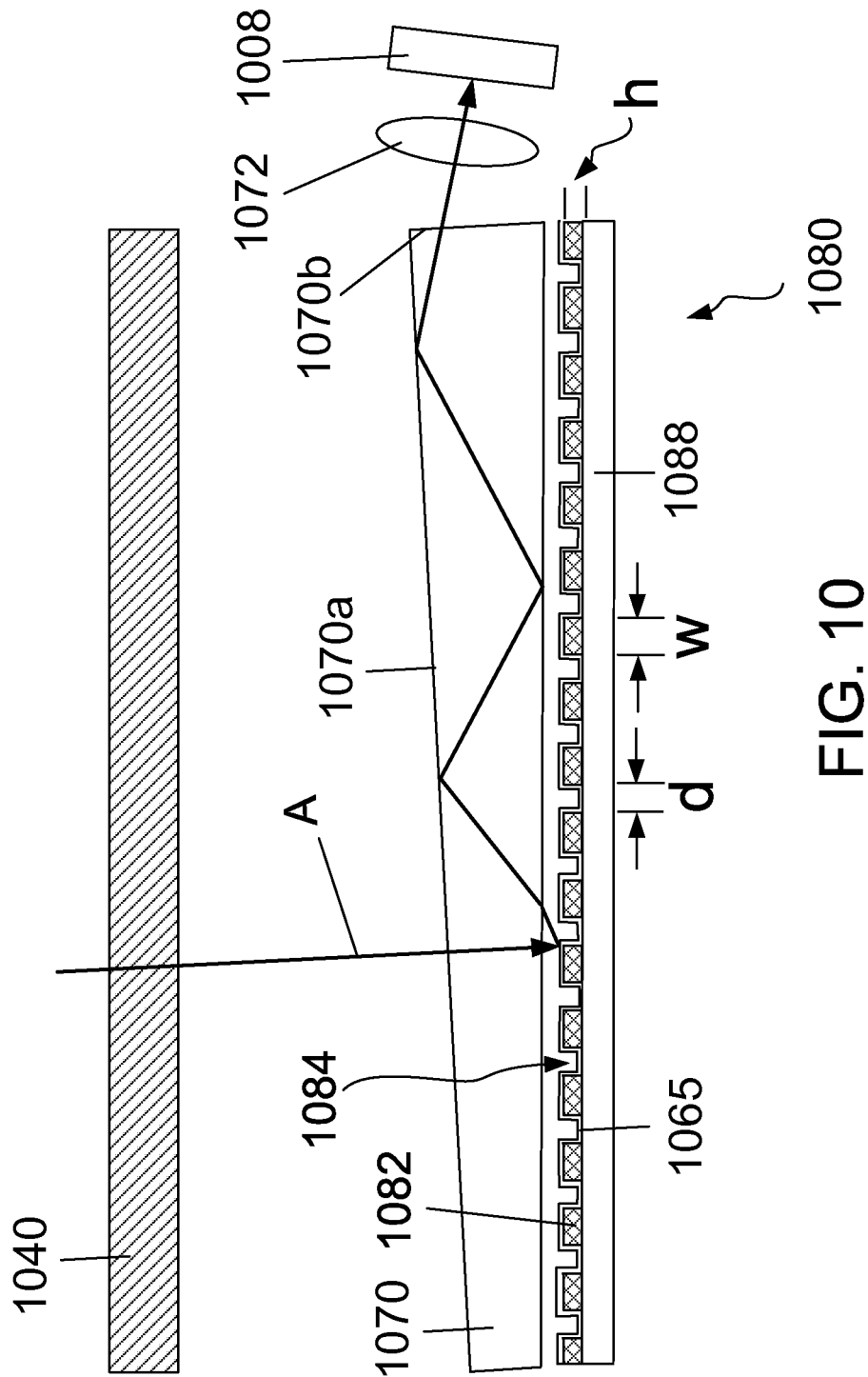

For example, FIG. 10 shows an imaging apparatus that includes an imaging sensor 1008, a lens 1072, a wedge-shaped imaging waveguide 1070, and a coupling structure 1080 beneath the waveguide 1070. An LCD panel 1040, which can be a part of a touch sensitive device, is also shown to provide a reference for orientation of waveguide 1070. In the present example, a top surface 1070a of waveguide 1070 is non-parallel with LCD panel 1040. The gap between coupling structure 1080 and waveguide can be, for example, about 500 microns or less. In some cases, the gap between the waveguide 1070 and the coupling structure 1080 can be filled with, for example, air or vacuum, although other material and/or substances may be used as well. Radiation (indicated by arrow "A") that escapes from a separate waveguide (not shown) due to FTIR (upon input contact with the touch-sensitive device) impinges on a top surface of the wedge-shaped waveguide 1070. If the incident radiation "A" is generally perpendicular to the waveguide surface 1070a (or at an angle that does not result in TIR coupling of the incident radiation after reflection from the bottom surface of waveguide 1070), a portion of the radiation will pass through waveguide 1070. The thin hologram structure 1080 then can re-direct the incident radiation such that it is reflected back into the waveguide 1070 and begins to propagate by TIR along the wedge-shaped waveguide 1070 toward the imaging sensor 1008 after reflection off of the angled top surface of waveguide 1070.

The hologram structure 1070 shown in FIG. 10 has a 1-bit binary diffraction grating profile formed from a series of regularly spaced ridges 1082 having thicknesses h and widths w that are spaced apart from one another by grooves 1184 of distance d. Furthermore, the length of ridges 1082 can extend uniformly across the surface of wedge-shaped waveguide 1070 (i.e., into and out of the page). The direction of radiation reflected by hologram structure 1080 is a function of the periodicity, Π=w+d, of ridges 1082 and the radiation wavelength.

In some cases, the ridges 1082 are formed on a substrate 1088. The substrate 1088 can be formed beneath ridges 1082 and/or fill the grooves 1084 between ridges 1082. Ridges 1082 and substrate 1088 are generally formed from materials of different refractive indices. In some cases, the hologram structure 1080 can include a reflective layer 1065 formed on a surface of the ridges 1082 and in between grooves 2084 to enhance the reflectivity of the structure. If the touch sensitive device incorporates a display, however, substrate 1088, ridges 1082 and reflective layer 1065 also can be transparent (or at least transmissive) to the wavelengths of radiation (e.g., visible light) used to generate the display.

The thin hologram structure positioned beneath the imaging waveguide can employ other profiles as well. For example, the thin hologram structure can include a multi-bit modulated square wave, sinusoidal, semi-sinusoidal, or blazed grating profile. The periodicity of the thin hologram structure can have a regular periodicity or a combination of structures with different periodicities. The hologram structures can be formed from materials including, but not limited to, PET, PMMA and PC. The thin hologram structures can be fixed to the bottom surface of the imaging waveguide using, for example, optical adhesives.

As discussed above, thick hologram structures are another type of DOE structure that can be used to steer radiation to ensure that the radiation couples into an imaging waveguide. One characteristic of thick holograms is that the hologram is made up of layers corresponding to a periodic variation of transmittance or refractive index that is, to at least some extent, parallel to the hologram surface on which the radiation is incident. If the variation is generally more perpendicular than parallel to the hologram surface, then radiation is preferentially transmitted through the structure. In contrast, if the variation is generally more parallel to the hologram surface, then radiation is preferentially reflected by the structure. That is, radiation is transmitted or reflected by means of Bragg diffraction, i.e., light having the correct wavelength and beam shape (e.g., beam direction, wavefront profile) will be preferentially transmitted or reflected at a desired angle by the thick hologram structure. Thus, in contrast to thin hologram structures, a thick hologram structure serves to transmit or reflect a relatively small range of wavelengths across a narrow range of incident angles into a relatively small range of output angles. For example, radiation within a narrow band of wavelengths centered around 850 nm that is incident on a thick hologram structure may be diffracted at a desired output angle, whereas radiation of other wavelengths (e.g., visible light) travel unaffected through the thick hologram structure.

Thick hologram structures lead to generally higher diffraction efficiency than in thin hologram structures. Diffraction efficiency corresponds to the amount of light diffracted by the hologram relative to the total amount of light incident on the hologram. Thick holograms can be replicated from optically generated masters into photopolymer by contact copying.

Figure 11:
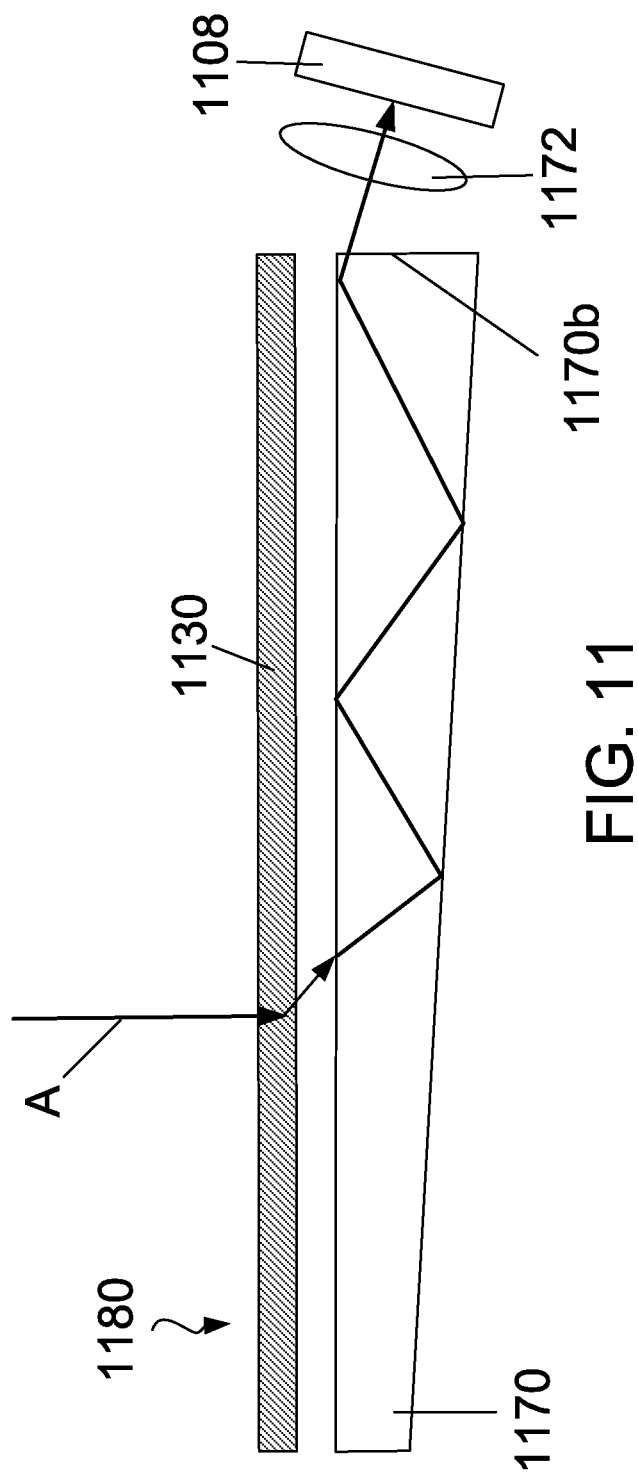
Figure 12:
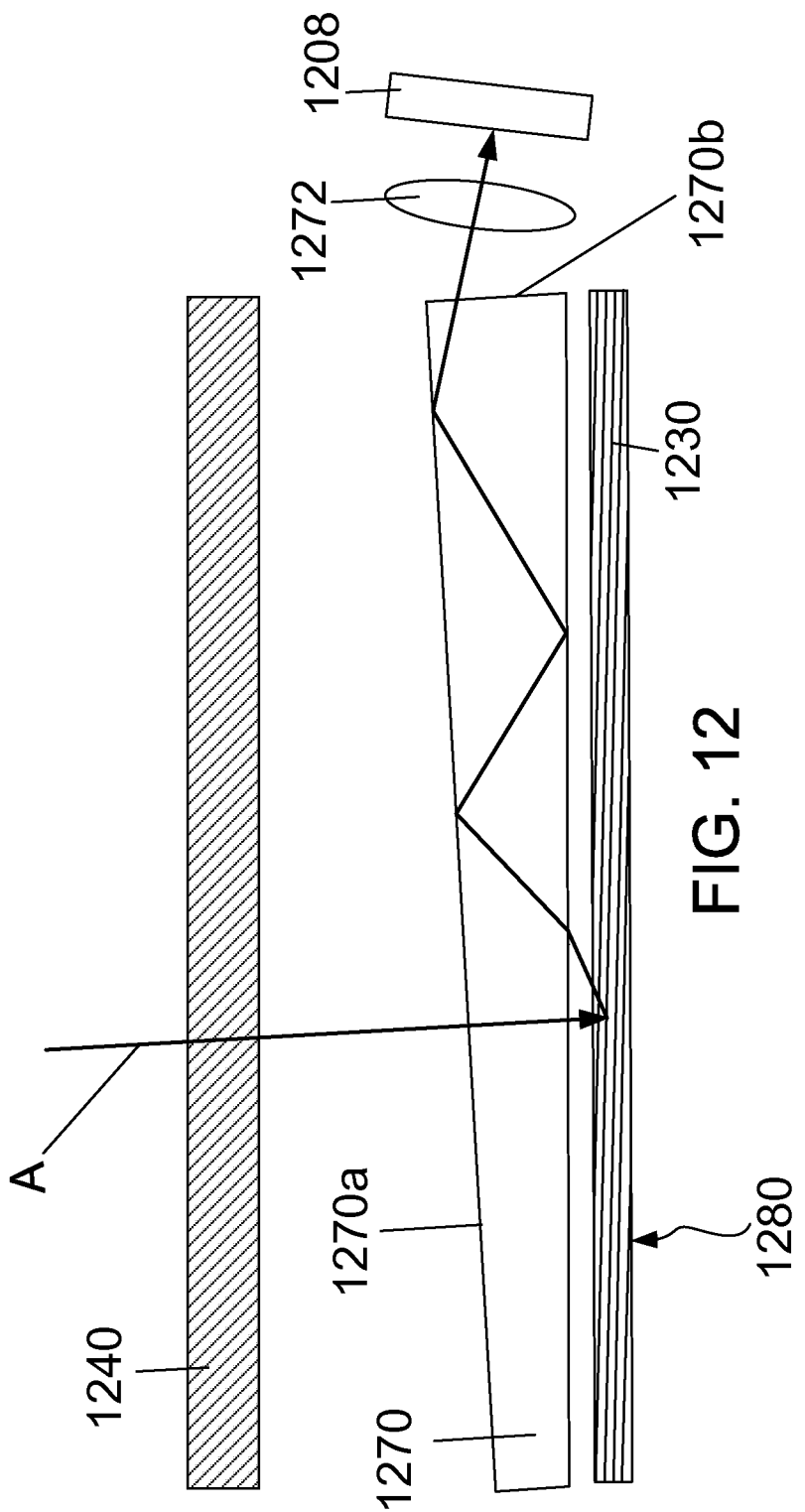

FIGS. 11-12 are schematic cross-sectional diagrams of example imaging apparatuses for use in a touch-sensitive device. As shown in FIG. 11, an imaging apparatus includes an imaging sensor 1108, a lens 1172, an imaging waveguide 1170 and a thick hologram structure 1180 positioned above a top surface of the imaging waveguide 1170. The thick hologram structure 1180 can be separated from the waveguide 1170, for example, by about 500 microns or less. The gap between the structure 1180 and waveguide may be filled with, for example, air or vacuum. Radiation (indicated by arrow "A") that escapes from a separate waveguide (not shown) due to FTIR (upon input contact with the touch-sensitive device) impinges on a top surface of the thick hologram structure 1180. The thick hologram structure 1180 includes layers of material having a variation in refractive index. Due to the refractive index variation, the layers of material form a series of fringe planes 1130. The fringe planes 1130 control transmission of incident radiation in a manner similar to a multilayer dielectric film. In the present implementation, the thick hologram structure 1180 is configured to diffract radiation of the wavelength of the incident radiation towards the imaging waveguide 1170 at an angle that ensures that the incident radiation is coupled into the imaging waveguide 1170 and, after reflection from the bottom surface of waveguide 1170, propagates through the imaging waveguide 1170 by TIR.

The material and dimensions of the layers of refractive index modulated material in a thick hologram structure are configured to diffract radiation of the wavelength of the incident radiation within a particular range of angles. Example materials for a thick hologram structure include, but are not limited to, photopolymer and bleached silver halide. The thick hologram structure 1180 can be formed separately from imaging waveguide 1170 and, in some cases, fixed to a surface of the imaging waveguide 1170 using, for example, an optical adhesive, provided the optical adhesive and/or hologram structure 1180 do not frustrate TIR within waveguide 1170. For example, the optical adhesive can be highly reflective to enhance or maintain the propagation of light within waveguide 1370.

FIG. 12 shows an imaging apparatus that includes an imaging sensor 1208, a lens 1272, an imaging waveguide 1270 and a thick hologram structure 1280. Thick hologram structure 1280 can be formed from materials including, but not limited to, PET, PMMA and PC. An LCD panel 1240, which can be a part of a touch sensitive device, is also shown to provide a reference for orientation of waveguide 1070. In the present example, a top surface 1270*a* of waveguide 1270 is non-parallel with LCD panel 1240. In contrast to the imaging apparatus of FIG. 11, the thick hologram structure 1280 is positioned beneath a bottom surface of the imaging waveguide 1270. Thus, the thick hologram structure 1280 can be configured to reflect radiation back into the imaging waveguide 1270 such that the radiation propagates by TIR towards the imaging sensor 1208 after reflection off the angled top surface 1270*a* of waveguide 1270. For example, incident radiation (indicated by arrow "A") which escapes from a separate waveguide (not shown) due to FTIR upon input contact with the touch-sensitive device impinges on a top surface of the imaging waveguide 1270. In the present implementation, the incident radiation is substantially perpendicular to the waveguide surface, although the incident radiation may be incident on the waveguide at other angles as well. A portion of the incident radiation passes through the waveguide 1270 and impinges on the thick hologram structure 1280. Thick hologram structure 1280 then reflects the radiation back into the wedge-shaped waveguide 1270 at an angle such that it propagates by TIR towards imaging sensor 1208. The radiation then passes from waveguide 1270 through lens 1272 which converts the angle of incidence on edge 1270*b* into a position along an imaging surface of sensor

1208. Accordingly, the position at which the radiation is incident on imaging sensor 1208 correlates with the position along waveguide 1270 at which the radiation was initially reflected by thick hologram structure 1280.

In addition to, or as an alternative to, DOE structures, refractive optical element (ROE) structures also may be formed on or adjacent to a wedge-shaped imaging waveguide so as to re-direct radiation that escapes from a separate waveguide (not shown) due to FTIR upon input contact with the touch-sensitive device to ensure that the radiation is coupled into the imaging waveguide. In general, ROE structures include a series of elements that are significantly larger than the wavelength(s) of incident radiation and direct radiation primarily by refraction. Depending on its design and construction, an ROE structure can re-direct incident radiation in one or more directions.

Figure 13:
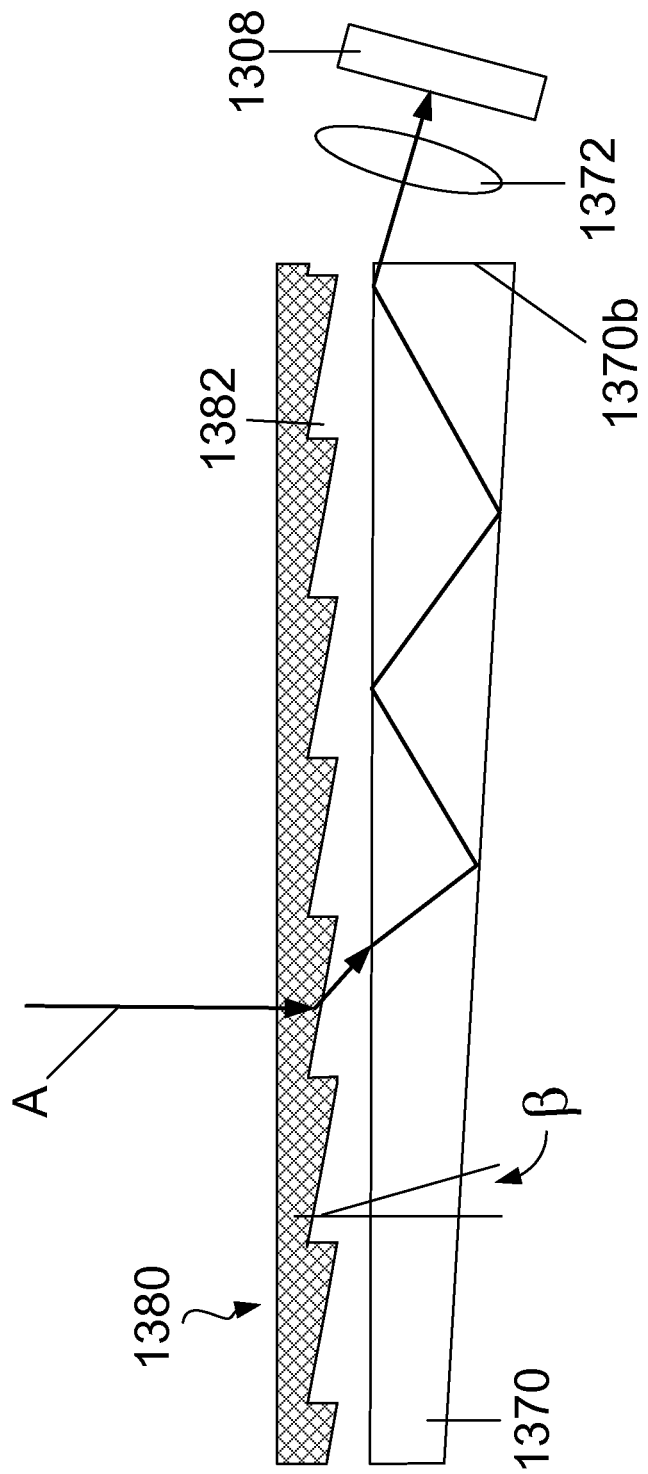

FIG. 13 is a schematic cross-sectional diagram of an example imaging apparatus for use in a touch-sensitive device. As shown in the example of FIG. 13, an ROE structure 1380, such as a Fresnel prism array, which includes individual Fresnel prism elements 1382, is positioned above a surface of wedge-shaped imaging layer 1370. The ROE structure 1380 can be separated from the waveguide 1370, for example, by about 1 mm or less, or about 500 microns or less. The gap between the structure 1380 and waveguide may be filled with, for example, air or vacuum. In some cases, the structure 1380 may be secured to the waveguide 1370 using an optical adhesive, provided the optical adhesive does not frustrate TIR within the waveguide. For example, the optical adhesive can be highly reflective to enhance or maintain the propagation of light within waveguide 1370. Fresnel prism elements 1382 are similar to the blazed grating structures illustrated in FIG. 6, except that elements 1382 are formed to have dimensions significantly greater than the wavelength of radiation for which re-direction is desired.

For example, in the present implementation, the pitch between prism elements 1382 can be on the order of tens of microns to millimeters in size. The Fresnel prism elements 1382 form a triangle profile with an angle $\beta$ that is a measure of the prism slope with respect to a normal to the plane on which the elements 1382 are formed. In the present implementation, radiation (indicated by arrow "A") impinges on a surface of one of the prism elements 1382. The prism element slope and refractive index as well as the angle at which the incident radiation impinges on the prism element 1382, the incident radiation may refract into the wedge-shaped imaging waveguide 1370 such that it begins to propagate by TIR. The radiation then passes from waveguide 1370 through lens 1372 which converts the angle of incidence on edge 1370b into a position along an imaging surface of sensor 1308. Accordingly, the position at which the radiation is incident on imaging sensor 1308 correlates with the position along waveguide 1370 at which the radiation was initially refracted by ROE structure 1380. Although the example of FIG. 13 illustrates a Fresnel prism structure having a blazed profile, other profiles including, but not limited to, sinusoidal or saw-tooth shapes also can be implemented.

ROE structures can be formed integrally with the wedge-shaped waveguide layer, i.e., as a single mass of seamless contiguous material or, alternatively, laminated using an adhesive. ROE structures can be formed using materials that include, but are not limited to acrylic, PET, PMMA, TPU or PC substrate. Examples of pre-fabricated ROE structures include Vikuiti™ Thin Brightness Enhancement Films (TBEF) and Vikuiti™ Transmissive Right Angle Films (TRAF), both of which can be purchased from 3M (St. Paul, Minn.).

Each of the example imaging apparatuses shown in FIGS. 6-13 employs a wedge-shaped imaging waveguide. In some cases, however, it may be difficult to manufacture an imaging waveguide having the precise wedge-shaped profile that allows incident radiation positions to be mapped with corresponding output angles. In addition, to enable TIR of the incident light, the wedge angle of the imaging waveguide may be so large as to result in a waveguide with substantial thickness and weight. Accordingly, other imaging waveguides can be used as well. For example, in some cases, an imaging waveguide having a rectangular profile (i.e., a rectangular cuboid waveguide) can be employed. In contrast to a wedge-shaped imaging waveguide, though, the angle and/or direction along which radiation exits from a rectangular shaped imaging waveguide may not necessarily correlate with a position at which the radiation enters the waveguide. Instead, a DOE structure or an ROE structure may be used in conjunction with the rectangular shaped waveguide to both couple incident radiation into the imaging waveguide at an angle that allows for TIR propagation and that corresponds to the position at which the radiation impinges on the DOE structure or the ROE structure. In such a rectangular-shaped waveguide, radiation propagating down the waveguide may tend to reflect at the same angle the entire length of the waveguide. Therefore, if the DOE or ROE structure that is used to couple incident radiation into the waveguide also causes the radiation to enter the waveguide at a particular angle that is a function of the lateral position at which the radiation enters the waveguide, it is possible to determine the lateral position at which the radiation entered the waveguide based on the angle of incidence of the radiation upon the imaging sensor.

Alternatively, in some implementations, a DOE structure can be formed on one or both surfaces of an imaging waveguide such that the angle of reflection is continuously altered as the radiation propagates down the waveguide. That is, at each "bounce" the radiation makes within the waveguide at one or both interfaces, the direction of radiation is modified by a DOE structure. The modification can cause the radiation to proceed at a steeper or shallower angle.

Figure 14:
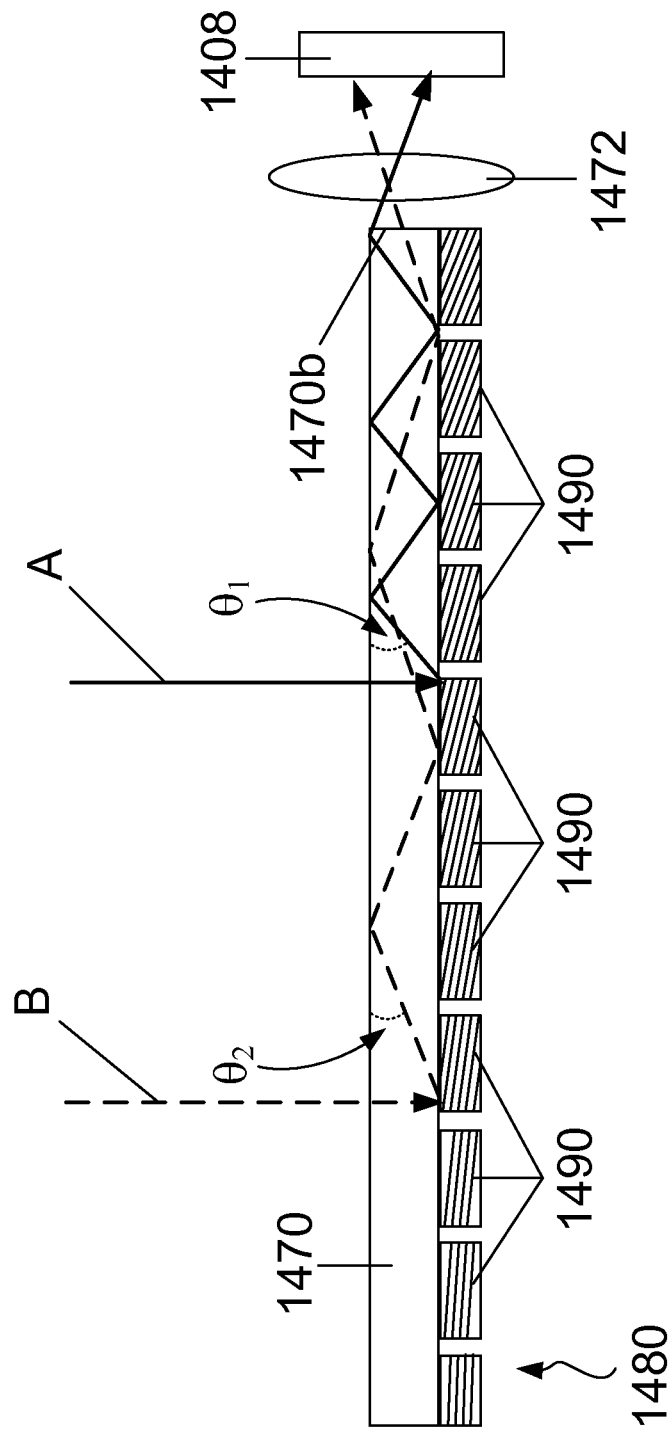

FIG. 14 is a schematic cross-sectional diagram of an example imaging apparatus for use in a touch-sensitive device in which a rectangular shaped imaging waveguide 1470 is used. In the present implementation, the imaging apparatus also includes an imaging sensor 1408, a lens 1472, and a thick hologram structure 1480 for transmitting and re-directing incident radiation. The thick hologram structure 1480 can be divided into a number of sub-holograms 1490 in which each sub-hologram 1490 extends uniformly across the surface of waveguide 1470 (i.e., into and out of the page). Each sub-hologram 1490 can be formed from materials including, but not limited to, PET, PMMA and PC. Each sub-hologram 1490 can re-direct incident radiation within slab waveguide 1470 such that TIR of the reflected radiation occurs after the first reflection from the sub-hologram 1490. That is, the angle of reflection of the reflected radiation is within a range of angles that allow TIR along the waveguide 1470. Furthermore, each sub-hologram 1490 can be configured to re-direct the incident radiation at a different angle of reflection, in which each of the different angles of reflection result in TIR along the waveguide 1470. For example, the fringe planes (representative of the refractive index variation) in each sub-hologram 1490 can be arranged so as to reflect incident radiation along a different angle of reflection.

In some implementations, each sub-hologram 1490 is configured to re-direct radiation that is incident within a substantially defined range of angles such that TIR of the re-directed radiation occurs after reflection from the sub-hologram 1490.

Radiation that is incident on the sub-holograms 1490 at angles outside of the substantially defined range, however, is scattered, transmitted through the sub-hologram or specularly reflected at angle substantially equal to the incident angle. For example, each sub-hologram 1490 can be configured to primarily re-direct radiation incident at angles substantially perpendicular to the interface between the sub-hologram 1490 and the waveguide 1470, such that the incident radiation is reflected off of the sub-hologram 1490 at an angle of reflection that allows TIR of the radiation down the waveguide 1470. Incident radiation that passes through waveguide 1470 and impinges on the sub-hologram 1490 at substantially non-perpendicular angles can be scattered by sub-hologram 1490, allowed to pass through sub-hologram 1490, or specularly reflected from sub-hologram 1490 along an angle substantially equal to the incident angle.

In the present example, incident radiation (indicated by arrow "A") is redirected by a first sub-hologram 1490 into the imaging waveguide such that it propagates by TIR with a first angle of internal reflection $\theta_1$. A second ray of incident radiation (indicated by arrow "B") is redirected by a second sub-hologram 1490 such that it propagates by TIR with a second angle of internal reflection $\theta_2$. Thus, each ray is incident upon edge 1470b of waveguide 1470 (and thus the imaging sensor 1408) at an angle that is a function of its corresponding angle of internal reflection. For example, the first ray exits the waveguide at an angle $90°-\theta_1$ and the second ray exits the waveguide at an angle $90°-\theta_2$. Both propagating beams then pass from waveguide 1470 through lens 1472 which converts the angle of incidence on edge 1470b into a position along an imaging surface of sensor 1408. Accordingly, the position at which the radiation is incident on imaging sensor 1408 correlates with the position along waveguide 1470 at which the radiation was initially transmitted by thick hologram structure 1480. Preferably, hologram structure 1480 serves as a very efficient reflector when the incident angle is larger than a certain amount, such that the TIR light can propagate down the waveguide with low loss after multiple reflections. In some implementations, however, there may be a certain amount of radiation that escapes upon each reflection at the interface between waveguide 1470 and hologram structure 1480, as the radiation travels along the waveguide by TIR. This loss may be due to some of the radiation having an incident angle less than the critical angle required for TIR at the interface between waveguide 1470 and hologram structure 1480. Alternatively, or in addition, the loss may be due to some of the incident radiation being scattered or transmitted by the hologram structure 1480.

Although FIG. 14 shows a space between sub-holograms 1490, the sub-holograms can be formed from a single contiguous material or positioned so that they are in contact with one another. Alternatively, the space between sub-holograms 1490 can be filled with air or some other material having a refractive index different from one or more of the refractive indexes of adjacent sub-holograms. In some implementations, thick hologram structure 1480 can be separated from waveguide 1470 by a small gap. For example, thick hologram structure 1480 can be separated from waveguide 1470 by about 50 µm, about 25 µm, about 10 µm, about 5 µm, about 1 µm, or about 500 nm. Other separation thicknesses are possible as well. The gap region between hologram structure 1480 and waveguide 1470 can include, but is not limited to, for example, air or vacuum.

Although FIG. 14 shows the thick hologram structure 1480 positioned on a bottom surface of waveguide 1470, it can be positioned on a top surface of waveguide 1470 instead. In that case, however, the thick hologram structure 1480 can be configured to transmit, instead of reflect, the incident radiation into rectangular shaped waveguide 1470. Thus, it is possible to efficiently "position encode" the incident radiation as it impinges on the thick hologram structure.

Other structures can be used to re-direct incident radiation into a rectangular shaped waveguide as well. For example, thin hologram structures including, but not limited to, square-wave profile diffraction gratings, sinusoidal profile diffraction gratings and blazed profile diffraction gratings can be used. Similar to the thick hologram structure of FIG. 14, such thin hologram structures can be configured to couple the incident radiation into the waveguide such that the incident radiation is position encoded.

Figure 15:
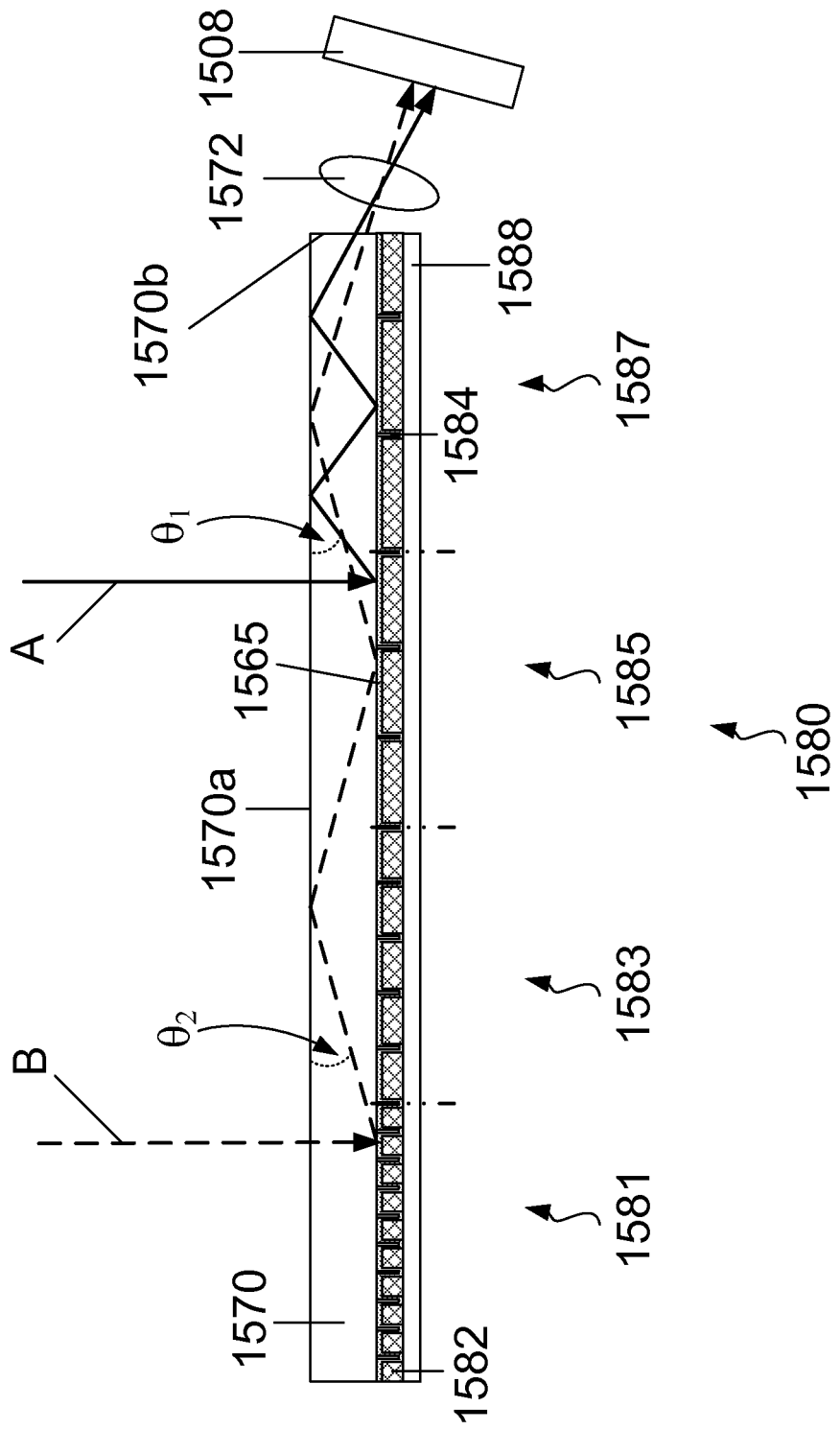

For example, FIG. 15 is a schematic cross-sectional diagram of an imaging apparatus for use in a touch-sensitive device in which a thin hologram structure 1580 is used in conjunction with a rectangular-shaped imaging waveguide 1570 to position encode incoming radiation that has escaped from a waveguide due to FTIR. The thin hologram structure 1580 is formed on a bottom surface of imaging waveguide 1570 and includes a 1-bit binary diffraction grating profile formed from a series of ridges 1582 spaced apart from one another by grooves 1584. The ridges 1582 can be formed from materials including, but not limited to, PET, PMMA and PC. The hologram structure 1580 may be covered with a thin reflective film 1565, such as a gold or silver film, to enhance the structure's reflectivity. The dashed-dotted lines show how the ridges 1582 can be grouped into separate regions (1581, 1583, 1585, 1587) in which the periodicity and/or width of the ridges 1582 and/or grooves 1584 differs based on the particular region selected. Furthermore, the length of ridges 1582 can extend uniformly across the surface of waveguide 1570 (i.e., into and out of the page).

Incident radiation (indicated by arrows "A" and "B") that escapes from a separate waveguide (not shown) due to FTIR, upon input contact with the touch-sensitive device, impinges on a top surface 1570a of the waveguide 1570. When the incident radiation is generally perpendicular to the waveguide surface 1570a (or at an angle that does not result in TIR coupling of the incident radiation), a portion of the radiation will pass through waveguide 1570 and impinge at an interface between the imaging waveguide 1570 and the thin hologram structure 1580. The thin hologram structure 1580 then can re-direct the incident radiation at an angle of reflection such that the radiation begins to propagate by TIR along the imaging waveguide 1570 toward the imaging sensor 1508.

The angle of the reflected radiation depends on the periodicity of the hologram structure 1580 and the radiation wavelength. Accordingly, the angle at which radiation is reflected may differ depending on the region in which the radiation is incident. For example, incident radiation "A" is reflected by region 1585 of the hologram structure 1580 into the imaging waveguide 1570 such that it propagates by TIR with a first angle $\theta_1$. In contrast, incident radiation "B" is reflected by region 1581 of the hologram structure 1680 such that it propagates by TIR within the waveguide 1570 at a different angle $\theta_2$.

Thus, each ray is incident upon edge 1570b of waveguide 1570 at an angle that is a function of its corresponding angle of internal reflection. For example, radiation "A" is incident upon edge 1570b at an angle $90°-\theta_1$ and radiation "B" is incident upon edge 1570b at an angle $90°-\theta_2$. Both propagating beams then pass from waveguide 1570 through lens 1572 which converts their angles of incidence into a position along an imaging surface of sensor 1508. As a result, the position at which the radiation is incident on imaging sensor 1508 correlates with the position at which the radiation entered the waveguide 1570 and was initially reflected by thin hologram structure 1580. Thus, when the initial reflection is located essentially directly beneath a point of contact, the position at which the point of contact with the touch-sensitive device occurs can be determined.

In some implementations, each region (1581, 1583, 1585, 1587) of hologram 1580 is configured to re-direct radiation that is incident within a substantially defined range of angles along an angle that allows TIR of the re-directed radiation within waveguide 1570. Radiation that is incident on the regions (1581, 1583, 1585, 1587) of hologram 1580 at angles outside of the substantially defined range, however, is scattered, transmitted through hologram 1580 or specularly reflected at angle substantially equal to the incident angle. For example, each region (1581, 1583, 1585, 1587) of hologram 1580 can be configured to primarily re-direct radiation incident at angles substantially perpendicular to the interface between the corresponding region and waveguide 1570, such that the incident radiation is reflected from hologram 1580 at an angle of reflection that allows TIR of the radiation down the waveguide 1570. Incident radiation that passes through waveguide 1570 and impinges on one of the regions of hologram 1580 at substantially non-perpendicular angles can be scattered, allowed to pass through hologram 1580, or specularly reflected from hologram 1580 along an angle substantially equal to the incident angle.

Preferably, hologram 1580 serves as a very efficient reflector when the incident angle is larger than a certain amount, such that the TIR radiation can propagate down the waveguide with low loss after multiple reflections. Thin reflective film 1565 can, in some cases, reduce such loss. In some implementations, however, there may be a certain amount of radiation that escapes upon each reflection at the interface between waveguide 1570 and hologram 1580, as the radiation travels along the waveguide by TIR. This loss may be due to some of the radiation having an incident angle less than the critical angle required for TIR at the interface between waveguide 1570 and hologram 1580. Alternatively, or in addition, the loss may be due to some of the incident radiation being scattered or transmitted by hologram 1580.

In some implementations, hologram 1580 can be separated from waveguide 1570 by a small gap. For example, hologram 1580 can be separated from waveguide 1570 by about 50 µm, about 25 µm, about 10 µm, about 5 µm, about 1 µm, or about 500 nm. Other separation thicknesses are possible as well. The gap region between hologram 1580 and waveguide 1570 can include, but is not limited to, for example, air or vacuum.

Although FIG. 15 shows hologram 1580 positioned on a bottom surface of waveguide 1570, it can be positioned on a top surface of waveguide 1570 instead. In that case, however, thin hologram structure 1580 can be configured to transmit, instead of reflect, the incident radiation into the rectangular-shaped waveguide 1570 at an angle that is a function of the lateral position along the waveguide.

Figure 16:
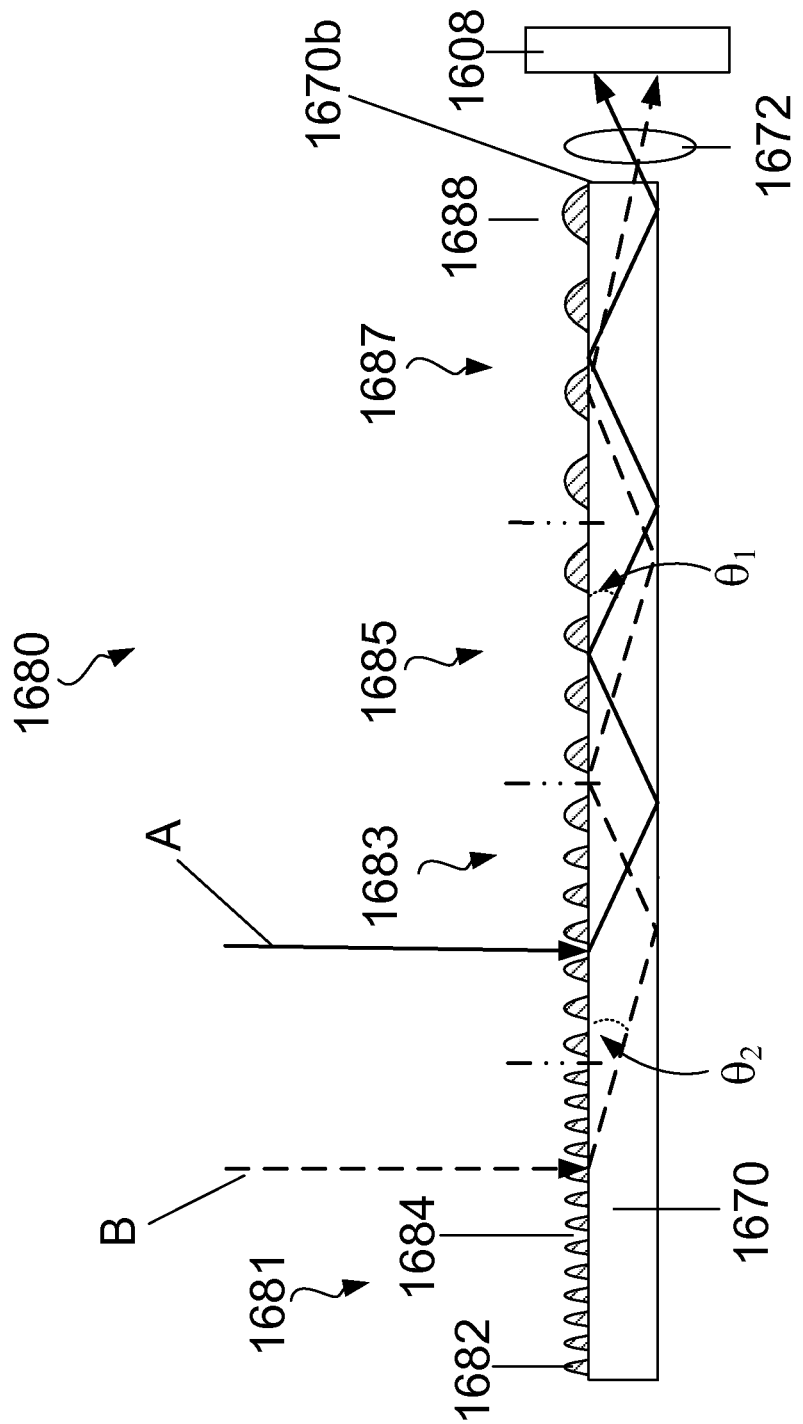

FIG. 16 is a schematic cross-sectional diagram of an example imaging apparatus for use in a touch-sensitive device in which a thin hologram structure 1680 is used in conjunction with a rectangular-shaped imaging waveguide 1670 to position encode incoming radiation that has escaped from a waveguide due to FTIR. The thin hologram structure 1680 is formed on a top surface of imaging waveguide 1670 and includes a sinusoidal diffraction grating profile formed from a series of sinusoidal shaped ridges 1682 and grooves 1684. Each of the ridges 1682 can be formed from materials including, but not limited to, PET, PMMA and PC. In some implementations, the grooves can be filled with air or some other material having a refractive index different from the ridge material. The dashed-dotted lines show how the structure 1680 can be grouped into separate regions (1681, 1683, 1685, 1687), each of which has a sinusoidal profile with a different periodicity. The ridges 1682 can be formed on or integrally with a substrate 1688. Furthermore, the ridges 1682 and grooves 1684 can extend uniformly across the surface of rectangular-shaped waveguide 1670 (i.e., into and out of the page).

Radiation (indicated by arrow "A" or by arrow "B") that escapes from a separate waveguide (not shown) due to FTIR (upon input contact with the touch-sensitive device) impinges on a top surface of the hologram structure 1680. The thin hologram structure 1680 then can re-direct the incident radiation such that it begins to propagate by TIR along the imaging waveguide 1670 toward the imaging sensor 1608.

The direction of the transmitted radiation can depend on the periodicity and/or pitch of the hologram structure 1680 and the radiation wavelength. Accordingly, the angle at which the radiation is transmitted may differ depending on the region in which the radiation is incident. For example, incident radiation "A" is transmitted by region 1685 of the hologram structure 1680 into the imaging waveguide 1670 such that it propagates by TIR with a first angle $\theta_1$. In contrast, incident radiation "B" is reflected by region 1681 of the hologram structure 1680 such that it propagates by TIR within the waveguide 1670 at a different angle $\theta_2$.

Thus, each ray is incident upon edge 1670b of waveguide 1670 at an angle that is a function of its corresponding angle of internal reflection. For example, radiation "A" is incident upon edge 1670b at an angle $90°-\theta_1$ and radiation "B" is incident upon edge 1670b at an angle $90°-\theta_2$. Both propagating beams then pass from waveguide 1670 through lens 1672 which converts their angles of incidence into a position along an imaging surface of sensor 1608. As a result, the position at which the radiation is incident on imaging sensor 1608 correlates with the position along waveguide 1670 at which the radiation entered the waveguide 1670 and was initially transmitted by hologram structure 1680. Thus, when the initial diffraction is located essentially directly beneath a point of contact with the touch-sensitive device, the position at which the point of contact occurs can be determined.

Furthermore, in some implementations, direction of the transmitted radiation can depend on the angle at which radiation, which has escaped a separate waveguide (due to FTIR), is incident on hologram structure 1680. For example, each region (1681, 1683, 1685, 1687) of hologram 1680 can be configured to re-direct radiation that is incident within a substantially defined range of angles along an angle that allows TIR of the re-directed radiation within waveguide 1670. Radiation that is incident on the regions (1681, 1683, 1685, 1687) of hologram 1680 at angles outside of the substantially defined range, however, is scattered, transmitted through hologram 1680 at angles that do not enable TIR or reflected from hologram 1680. For example, each region (1681, 1683, 1685, 1687) of hologram 1680 can be configured to primarily re-direct radiation incident at angles substantially perpendicular to the interface between the corresponding region and waveguide 1670, such that the incident radiation is transmitted from hologram 1680 at an angle that allows TIR of the radiation down the waveguide 1670. Incident radiation that impinges on one of the regions of hologram 1680 at substantially non-perpendicular angles can be scattered, allowed to pass through hologram 1680 at angles that do not result in TIR, or reflected from hologram 1680.

Preferably, hologram 1680 serves as a very efficient reflector for radiation traveling within waveguide 1670 by TIR, such that the TIR radiation can propagate down the waveguide with low loss after multiple reflections. In some implementations, however, there may be a certain amount of radiation that escapes upon each reflection at the interface between waveguide 1670 and hologram 1680, as the radiation travels along the waveguide by TIR. This loss may be due to some of the radiation having an incident angle less than the critical angle required for TIR at the interface between waveguide 1670 and hologram 1680. Alternatively, or in addition, the loss may be due to some of the incident radiation being scattered or transmitted out of waveguide 1670 by hologram 1680.

In some implementations, hologram 1680 can be separated from waveguide 1670 by a small gap. For example, hologram 1680 can be separated from waveguide 1670 by about 50 µm, about 25 µm, about 10 µm, about 5 µm, about 1 µm, or about 500 nm. Other separation thicknesses are possible as well. The gap region can include, but is not limited to, for example, air or vacuum.

Although FIG. 16 shows the thin hologram structure 1680 positioned on a top surface of waveguide 1670, it can be positioned on a bottom surface of waveguide 1670 instead. In that case, however, the thin hologram structure 1680 can be configured to reflect, instead of transmit, the incident radiation into rectangular-shaped waveguide 1670.

Figure 17:
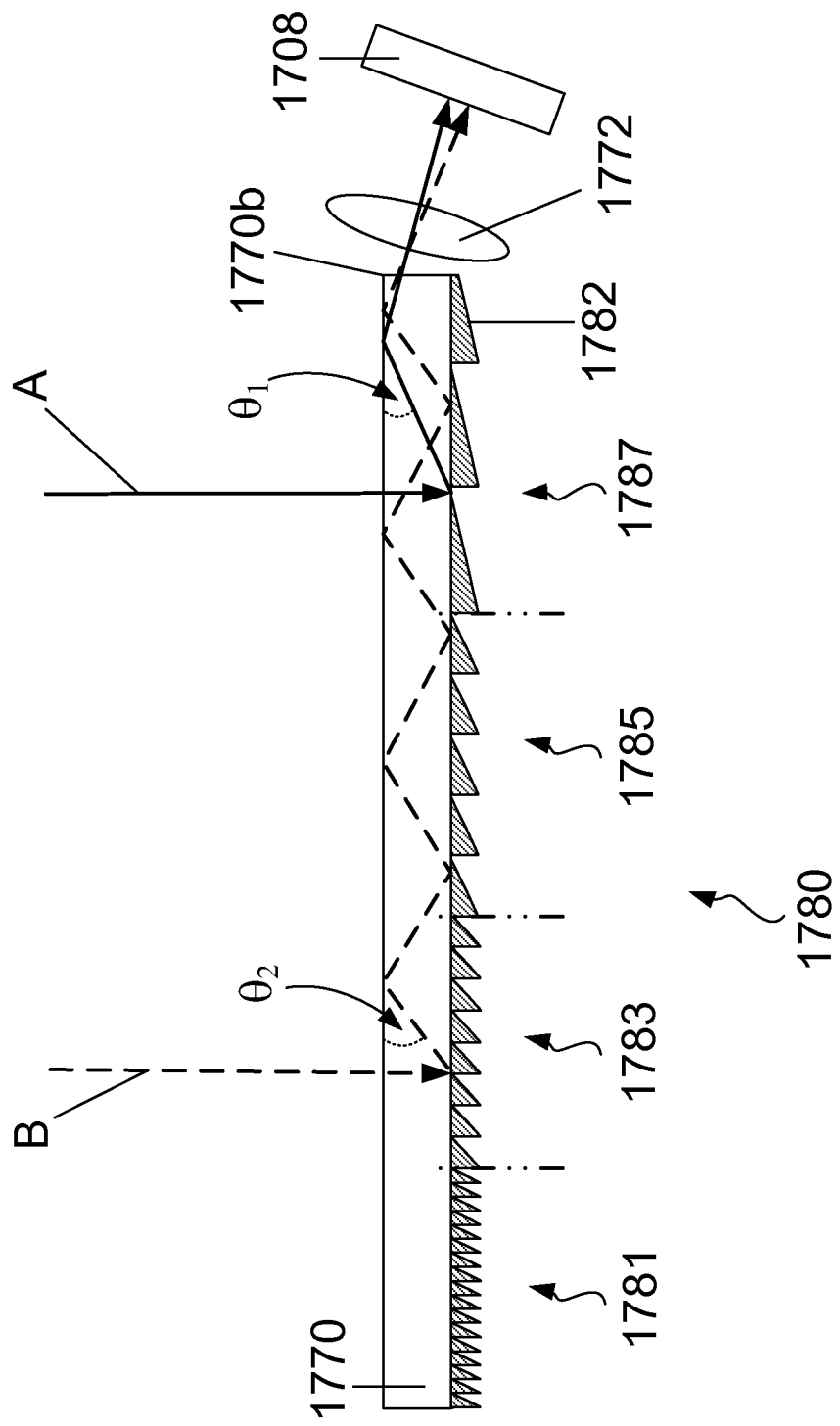

In some implementations, the thin hologram structure can have a blazed grating profile. For example, FIG. 17 is a schematic cross-sectional diagram of an example imaging apparatus for use in a touch-sensitive device in which a thin hologram structure 1780 having a blazed grating profile is used in conjunction with a rectangular-shaped imaging waveguide 1770 to position encode incoming radiation that has escaped from a waveguide due to FTIR. The thin hologram structure 1780 is formed on a bottom surface of imaging waveguide 1770. Each blazed grating 1782 can be formed from materials including, but not limited to, PET, PMMA and PC. The region between blazed gratings 1782 and the waveguide 1770 can be filled with air, vacuum or other material, such as an optical adhesive. The blazed gratings 1782 of the hologram structure 1780 are separated into different regions (1781, 1783, 1785, 1787), in which the periodicity, pitch and/or slope of the blazed gratings varies across the different regions. Furthermore, the gratings 1782 can extend uniformly across the surface of the rectangular-shaped waveguide 1770 (i.e., into and out of the page). As explained above with regards to the structures illustrated in FIG. 15, the direction of radiation reflected by the hologram structure 1780 can depend on the periodicity and/or pitch of each of the regions 1781, 1783, 1785, 1787.

Thus, the thin hologram structure 1780 can reflect radiation along different directions based on the region in which the radiation is incident. For example, incident radiation "A" is reflected by region 1787 of the hologram structure 1780 into the imaging waveguide 1770 such that it propagates by TIR with a first angle $\theta_1$. In contrast, incident radiation "B" is reflected by region 1783 of the hologram structure 1780 such that it propagates by TIR within the waveguide 1770 at a different angle $\theta_2$.

Each ray is incident upon edge 1770b of waveguide 1770 at an angle that is a function of its corresponding angle of internal reflection. The propagating beams then pass from waveguide 1770 through lens 1772 which converts their angles of incidence into a position along an imaging surface of sensor 1708. As a result, the position at which the radiation is incident on imaging sensor 1708 correlates with the position along waveguide 1770 at which the radiation entered the waveguide 1770 and was initially reflected by hologram structure 1780. Thus, when the initial reflection is located essentially directly beneath a point of contact with the touch-sensitive device, the position at which the point of contact occurs can be determined.

Furthermore, in some implementations, the direction of the re-directed radiation can depend on the angle at which the incident radiation, which has escaped a separate waveguide (due to FTIR), impinges on hologram structure 1780. For example, each region (1781, 1783, 1785, 1787) of hologram 1780 can be configured to re-direct radiation that is incident within a substantially defined range of angles along an angle that allows TIR of the re-directed radiation within waveguide 1770. Radiation that is incident on the regions (1781, 1783, 1785, 1787) of hologram 1780 at angles outside of the substantially defined range, however, is scattered, transmitted through hologram 1780, or specularly reflected from hologram 1780 at an angle substantially equal to the incident angle. For example, each region (1781, 1783, 1785, 1787) of hologram 1780 can be configured to primarily re-direct radiation incident at angles substantially perpendicular to the interface between the corresponding region and waveguide 1770, such that the incident radiation is reflected from hologram 1780 at an angle that allows TIR of the radiation down the waveguide 1770. Incident radiation that impinges on one of the regions of hologram 1780 at substantially non-perpendicular angles can be scattered, allowed to pass through hologram 1780, or specularly reflected from hologram 1780 at an angle substantially equal to the incident angle.

Preferably, hologram 1780 serves as a very efficient reflector for radiation traveling within waveguide 1770 by TIR, such that the TIR radiation can propagate down the waveguide with low loss after multiple reflections. In some implementations, however, there may be a certain amount of radiation that escapes upon each reflection at the interface between waveguide 1770 and hologram 1780, as the radiation travels along the waveguide 1770 by TIR. This loss may be due to some of the radiation having an incident angle less than the critical angle required for TIR at the interface between waveguide 1770 and hologram 1780. Alternatively, or in addition, the loss may be due to some of the incident radiation being scattered or transmitted out of waveguide 1770 by hologram 1780.

In some implementations, hologram 1780 can be separated from waveguide 1770 by a small gap. For example, hologram 1780 can be separated from waveguide 1770 by about 50 µm, about 25 µM, about 10 µm, about 5 µm, about 1 µm, or about 500 nm. Other separation thicknesses are possible as well. The gap region can include, but is not limited to, for example, air or vacuum.

Although FIG. 17 shows the thin hologram structure 1780 positioned on a bottom surface of waveguide 1770, it can be positioned on a top surface of waveguide 1770 instead. In that case, however, the thin hologram structure 1780 can be configured to transmit, instead of reflect, the incident radiation into rectangular-shaped waveguide 1870.

Figure 18:
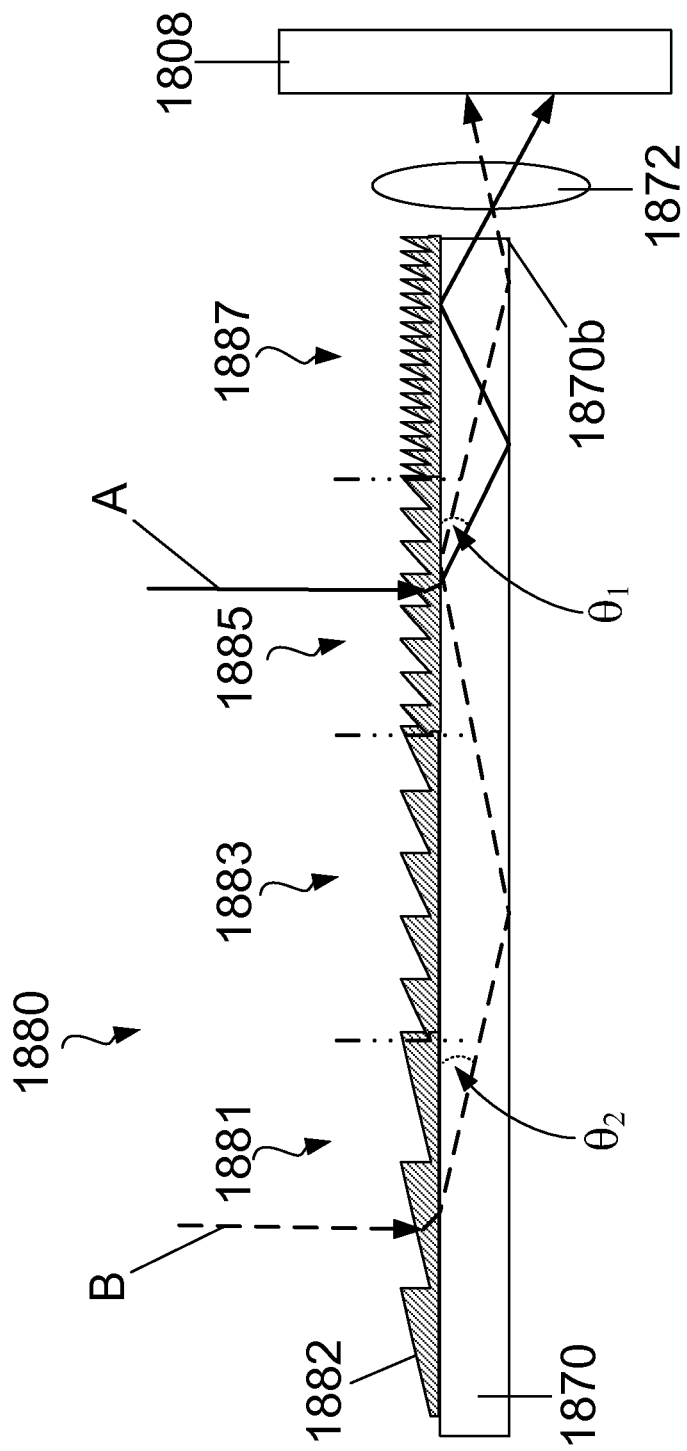

In some cases, ROE structures such as Fresnel prisms, lenses or other refractive elements can be used to re-direct incident radiation into a rectangular-shaped waveguide. Such ROE structures can be configured to couple the incident radiation into the waveguide such that the incident radiation is position encoded. For example, FIG. 18 is a schematic cross-sectional diagram of an example imaging apparatus for use in a touch-sensitive device in which an ROE structure 1880 is used in conjunction with a rectangular-shaped imaging waveguide 1870 to position encode incoming radiation that has escaped from a waveguide due to FTIR. The ROE structure 1880 is formed on a top surface of the imaging waveguide 1870 and includes an array of Fresnel prisms 1882. The Fresnel prisms 1882 can be formed on a substrate 1888. In some cases, the Fresnel prisms 1882 extend uniformly across the surface of rectangular-shaped waveguide 1870 (i.e., into and out of the page).

Each of the Fresnel prism elements 1882 forms a triangular profile. Similar to the ROE structure illustrated in FIG. 13, the Fresnel prisms 1882 have dimensions significantly greater than the wavelength of radiation for which re-direction is desired. For example, for radiation in the infrared portion of the electromagnetic spectrum, the Fresnel prisms 1882 could have a pitch anywhere between tens of microns and several millimeters. In the present implementation, the array of Fresnel prisms 1882 is divided into separate regions (1881, 1883, 1885, 1887), in which the slope associated with the triangular profile of the Fresnel prisms 1882 differs depending on the selected region. In addition, each region of the prism array shown in FIG. 18 may be associated with a different pitch.

As illustrated in FIG. 18, radiation (indicated by arrow "A") impinges on a surface of one of the prism elements 1882 in region 1885 of the ROE structure 1880. A second beam of radiation (indicated by arrow "B") also impinges on a surface of one of the prism elements 1882 but in a second region 1881 of the ROE structure 1880. Due to the different slopes of the Fresnel prism elements in each region, the beams will be refracted along different directions into the rectangular-shaped imaging waveguide 1870 such that the beams begin to propagate by TIR with different angles of reflection. The two separate beams then pass from waveguide 1870 through lens 1872 which converts the angle at which the radiation is emitted from edge 1870b into a position along an imaging surface of sensor 1808. As a result, the position at which the radiation is incident on imaging sensor 1808 correlates with the position along waveguide 1870 at which the radiation entered the waveguide 1870 and was initially refracted by ROE structure 1880. Thus, the position at which the point of contact occurs can be determined.

Although the example of FIG. 18 illustrates a Fresnel prism structure having a blazed profile, other profiles including, but not limited to, sinusoidal or saw-tooth shapes also can be implemented.

Figure 19A:
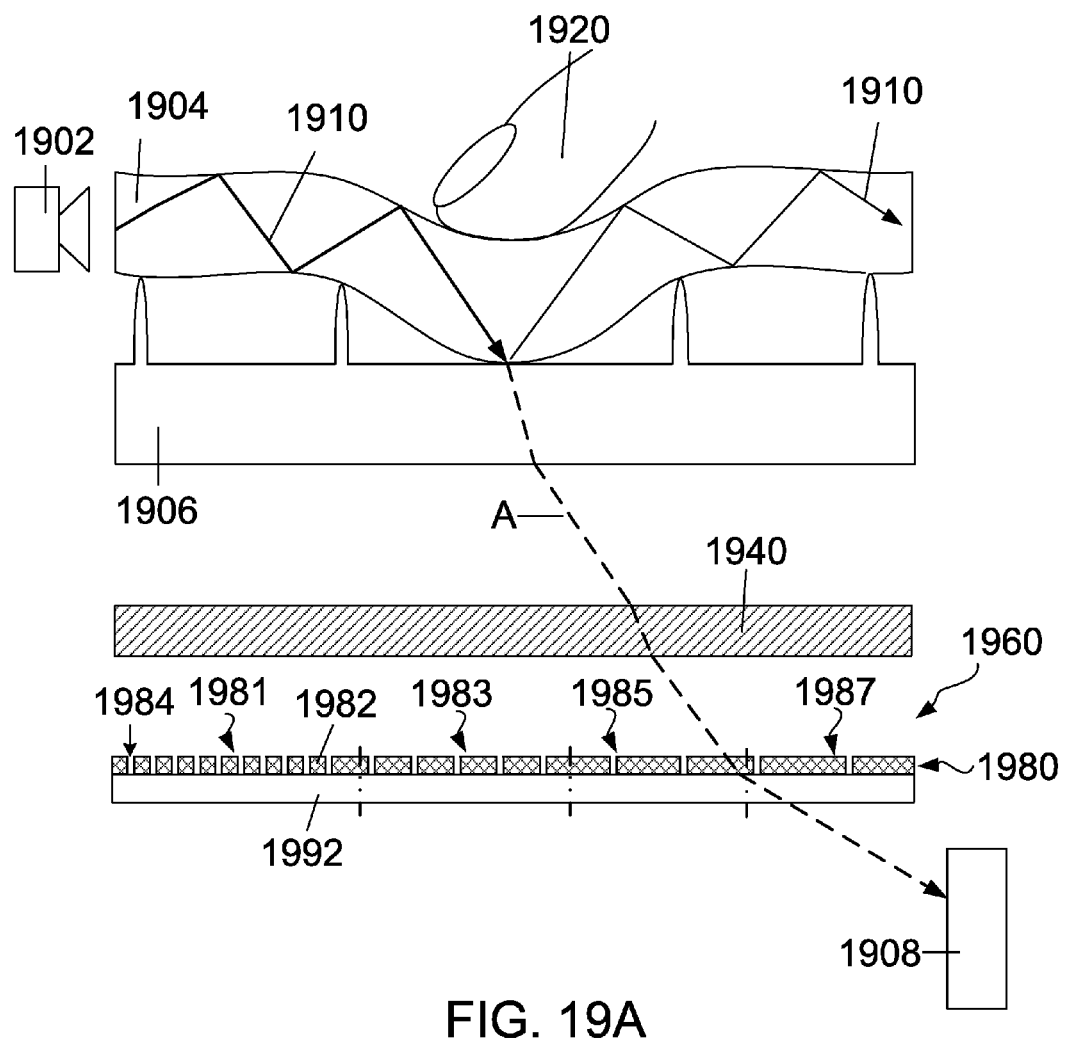
Figure 19B:
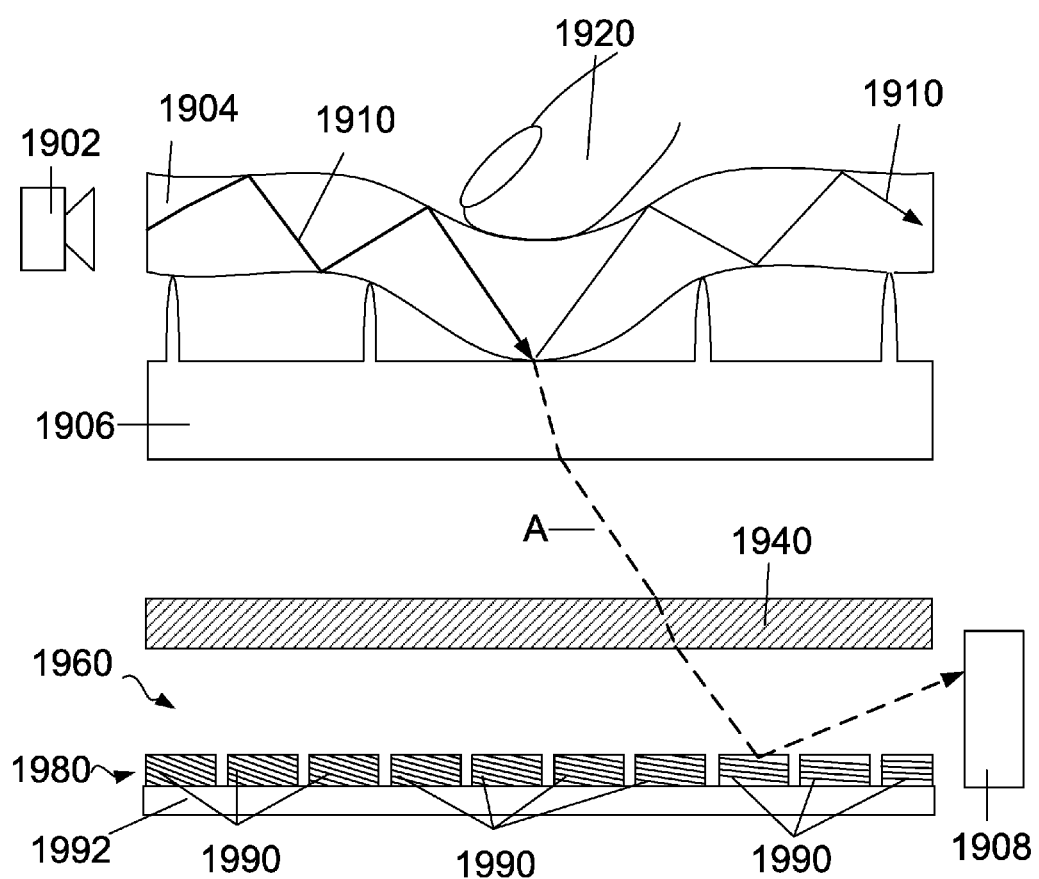

Moreover, in some implementations, the hologram structures can reflect or transmit the incident radiation without any imaging waveguide. For example, FIGS. 19A and 19B are schematic cross-sectional diagrams of example touch sensitive devices in which a hologram structure is used to re-direct incident light without an imaging waveguide. As shown in FIG. 19A, an input 1920 (such as a user's finger) deforms a pliable waveguide 1904 through which radiation 1910 is propagating by TIR. The pliable waveguide 1904 then contacts a frustrating layer 1906 located beneath the pliable waveguide 1904 such that radiation 1910 escapes by FTIR. The escaped radiation (indicated by arrow "A") travels through an LCD panel 1940 toward an imaging apparatus 1960 which includes a thin hologram structure 1980 formed on the surface of a substrate 1992. Similar to the hologram structure illustrated in FIG. 7, the thin hologram structure 1980 includes a series of ridges 1982 each having an essentially uniform thickness and separated by grooves 1984, in which the ridges and grooves extend uniformly across the substrate 1992 (i.e., into and out of the page). The dashed-dotted lines show how the ridges 1982 can be grouped into separate regions (1981, 1983, 1985, 1987) in which the periodicity, pitch and/or width of the ridges 1982 differs based on the particular region selected. Accordingly, the angle at which radiation is transmitted by hologram structure 1980, and thus the position along the imaging sensor 1908, depends on the region in which it is incident. In contrast to the structure illustrated in FIG. 7, however, the hologram structure 1980 of FIG. 19A is configured to re-direct incident radiation directly towards an imaging sensor 1908 without the use of an imaging waveguide.

Thin hologram structures other than a square-wave profile also may be used to transmit (or reflect) radiation towards an imaging sensor without the use of an imaging waveguide. For example, in some cases, a sinusoidal shaped profile or a blazed grating profile may be used. In some cases, a thick hologram structure can be used instead of a thin hologram structure. For example, as shown in FIG. 19B, radiation that escapes from pliable waveguide 1904 is re-directed by thick hologram structure 1980. Thick hologram structure can be divided into a number of sub-holograms 1990 in which each sub-hologram 1990 extends uniformly across the substrate 1992 (i.e., into and out of the page). Furthermore, each sub-hologram 1990 can be configured to steer incident radiation along a different angle so that the incident radiation is re-directed toward a surface of the imaging sensor 1908. Accordingly, the angle at which radiation is reflected by hologram structure 1980, and thus the position along the imaging sensor 1908, depends on the sub-hologram 1990 in which it is incident.

Although the imaging sensor 1908 is shown beneath and to the right of hologram structure 1980 in FIG. 19A, imaging sensor 1908 can be positioned anywhere in the vicinity of the hologram structure as long as radiation transmitted (or reflected) by hologram structure 1980 can reach the imaging sensor 1908. Furthermore, although a pliable waveguide layer 1904 is shown contacting a frustrating layer 1906 in FIGS. 19A-19B, a pliable frustrating layer can be configured to contact a waveguide layer instead.

In some implementations, a DOE structure can be formed on one or both surfaces of an imaging waveguide such that the angle of reflection within the waveguide is continuously altered as the radiation propagates down the waveguide. That is, at each "bounce" the radiation makes within the waveguide at one or both interfaces, the direction of radiation is modified by a DOE structure. The modification can cause either increase or decrease the angle of propagation within the waveguide. In such implementations, the waveguide mimics the operation of a wedge-shaped waveguide without requiring the use of a wedge-shape waveguide.

Figure 20:
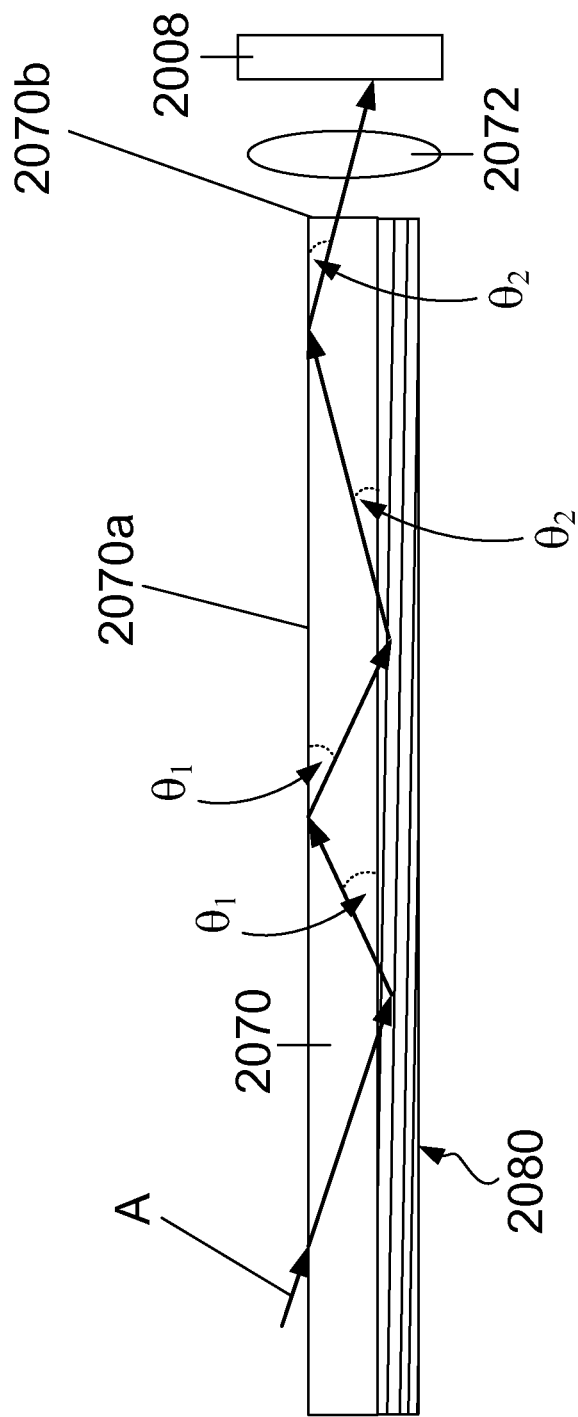

FIG. 20 is a schematic cross-sectional diagram of an example imaging apparatus for use in a touch-sensitive device in which a DOE structure 2080 is formed on the bottom surface of a waveguide 2070. In the present implementation, the DOE structure 2080 is a thick hologram structure in which the fringe planes associated with the refractive index variation are chirped. That is, the fringe planes are positioned closer together towards the bottom of the hologram structure 2080 than they are near the top of the hologram structure. By forming a chirped refractive index variation, the thick hologram structure is capable of interacting with radiation over a wider range of incident angles.

As shown in FIG. 20, incident radiation (indicated by arrow "A") enters the waveguide 2070 at a very shallow angle. By having the incident radiation enter at a shallow angle, the thick hologram structure 2080 can re-direct the light along angles that allow for total internal reflection within the waveguide 2070. Other DOE or ROE structures (not shown) can be used to steer the incident radiation into waveguide 2070 at a shallow angle.

Upon passing through waveguide 2070, radiation "A" is incident on thick hologram structure 2080 and re-directed back into the waveguide 2070 at a first angle of reflection $\theta_1$.

The radiation then proceeds toward the top surface of waveguide 2070 where it is totally internally reflected back towards the thick hologram structure 2080. The radiation then is reflected a second time by thick hologram structure 2080 at a second angle of reflection $\theta_2$ which is smaller than $\theta_1$. The radiation then proceeds to reflect off the top surface of the waveguide 2070 again and passes from waveguide 2070 through lens 2072 which converts the angle of incidence on edge 2070b into a position along an imaging surface of sensor 2008.

Accordingly, the hologram structure 2080 on the bottom surface of waveguide 2070 alters the radiation angle of reflection as a function of the angle of incidence. Thus, waveguide 2070 and hologram structure 2080 effectively mimic the function of a wedge-waveguide in which the angle of propagation changes as the radiation is guided towards the imaging sensor 2008. Thus, the position at which the radiation is incident on imaging sensor 2008 correlates with the position along waveguide 2070 at which the radiation was initially reflected by thick hologram structure 2080.

Figure 21:
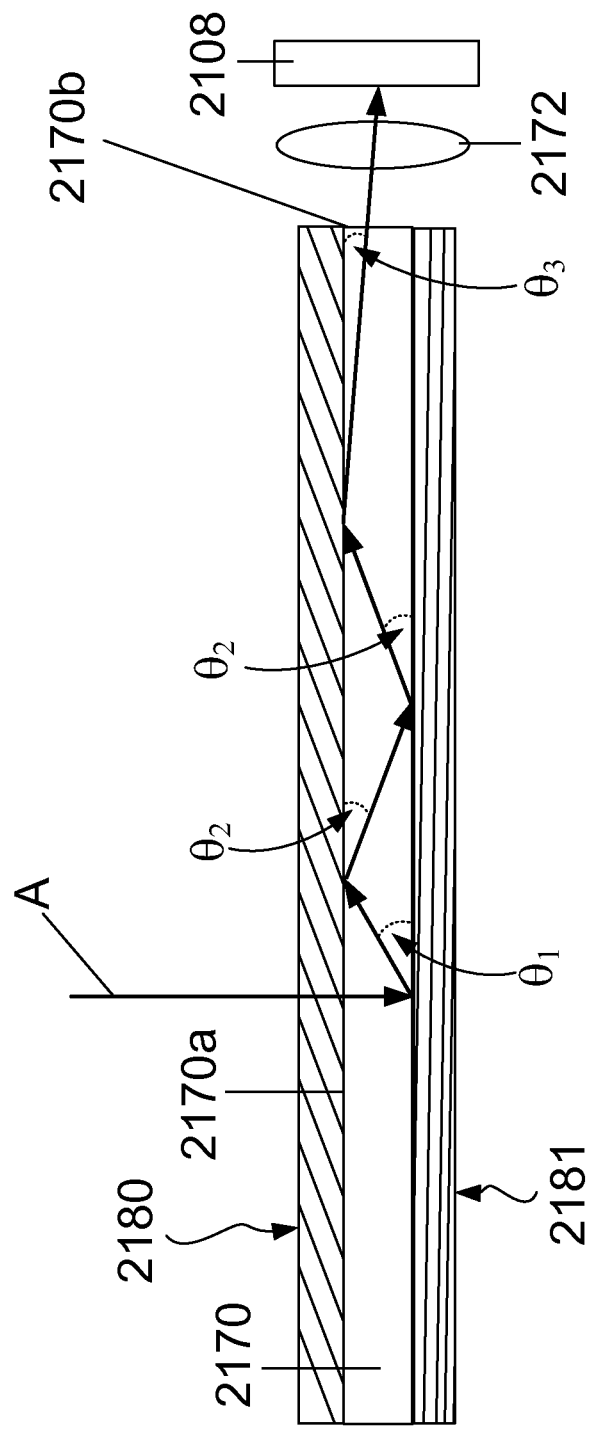

FIG. 21 is a schematic cross-sectional diagram of an example imaging apparatus for use in a touch-sensitive device in which a first DOE structure 2180 is formed on the top surface of imaging waveguide 2170 and a second DOE structure 2181 is formed on the bottom surface of waveguide 2170. In the present implementation, the DOE structures 2180, 2181 are thick hologram structures. However, other thin hologram structures can be used instead. In some cases, the DOE structures may be formed on only the top or bottom surface instead of both surfaces of the imaging waveguide 2170. Thick hologram structures 2180, 2181 can extend uniformly across the surface of waveguide 2170 (i.e., into and out of the page).

In the present implementation, thick hologram structure 2180 is configured to be transparent (or at least transmissive) to radiation that is generally perpendicular to the waveguide surface 2170a. Accordingly, a portion of incident radiation (indicated by arrow "A") can pass through hologram structure 2180 into waveguide 2170 and impinge on second hologram structure 2181. Second hologram structure 2181 is configured to reflect radiation over a range of incident angles, in which the angle of reflection depends on the angle of incident. As in the example of FIG. 20, the fringe planes associated with the refractive index variation in the second hologram structure 2181 are chirped. Once the radiation impinges on the second hologram structure 2181, the radiation then is reflected back into the waveguide 2170 at a first angle $\theta_1$. In contrast to the structure shown in FIG. 20, however, the radiation does not totally internally reflect at the interface between waveguide 2170 and hologram structure 2180. Instead, hologram structure 2180 reflects the incident radiation back into the waveguide 2170 at a second angle $\theta_2$ that is different from and less than the first angle $\theta_1$. The radiation then propagates towards second hologram structure 2181 and is reflected back again towards first hologram structure 2180 where it is reflected again at a third angle of reflection $\theta_2$ which is smaller than $\theta_1$ and $\theta_2$. The propagating beam then passes from waveguide 2170 through lens 2172 which converts the angle of incidence on edge 2170b into a position along an imaging surface of sensor 2108.

Accordingly, the position at which the radiation is incident on imaging sensor 2108 correlates with the position along waveguide 2170 at which the radiation was initially transmitted by thick hologram structure 2180. By continuously altering the angle of propagation, the imaging waveguide 2170 and hologram structures 2180, 2181 effectively mimic the function of a wedge-shaped waveguide.

As illustrated in several of the previous examples, an imaging waveguide may be used to capture radiation that escapes from a separate waveguide due to FTIR and to transmit the captured radiation to an imaging sensor. As an alternative to that approach, in some implementations, a single waveguide may be used to both carry radiation into a touch-sensitive device and to recapture and transmit radiation that escapes from the waveguide to an in imaging sensor.

In such implementations, a DOE structure (either a thin or thick hologram structure) may be formed on or within the frustrating layer and configured to reflect radiation that escapes from the waveguide back into the waveguide at an angle such that the reflected radiation again experiences TIR upon returning to the waveguide and is transmitted through the waveguide to an imaging sensor. Accordingly, the hologram structure may be said to function as a retro-reflector in that the hologram structure reflects the escaped radiation back along a vector that is generally parallel to but opposite in direction from the radiation's incident vector. Alternatively, in some cases, the hologram structure reflects the escaped radiation back along a different vector, in which the reflected radiation experiences TIR upon entering the waveguide. In other implementations, the hologram directs the light in a substantially different path within the same waveguide to a camera which is placed separately from the illumination means—for example, along a different edge of the waveguide. Eliminating the need for two separate waveguides in this fashion may enable the construction of touch sensitive devices having reduced thicknesses related to touch sensitive devices that rely on two separate waveguides, such as, for example, the touch sensitive device illustrated in FIGS. 3 and 4.

Figure 22:
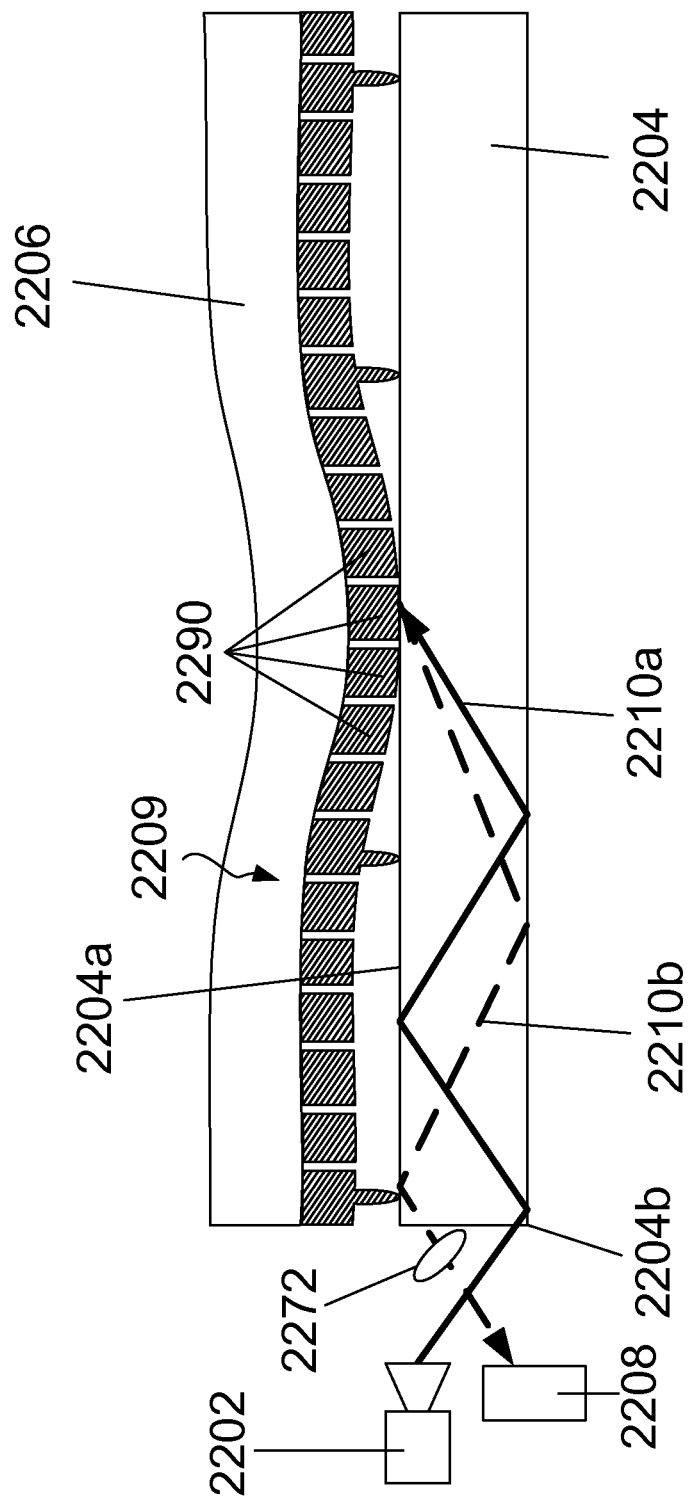

FIG. 22 is a cross-sectional schematic diagram of a touch sensitive device that includes a pliable frustrating layer 2206 having a thick hologram structure 2209 formed on its bottom surface that operates as a retro-reflector. Thick hologram structure 2209 can be divided into a number of sub-holograms 2290 in which each sub-hologram 2290 extends uniformly across the frustrating layer 2206 (i.e., into and out of the page). Radiation 2210a is coupled into waveguide 2204 from source 2202. Upon deformation of pliable frustrating layer 2206 (e.g., by a user's finger), thick hologram structure 2209 comes into contact with waveguide 2204. As a result, a portion of the incident radiation 2210a traveling within waveguide 2204 by means of TIR escapes from waveguide 2204 at the contact point due to FTIR. After this radiation escapes from waveguide 2204, it encounters at least one of the sub-holograms 2290 which reflects at least some of the escaped radiation back into waveguide 2204. The reflected radiation then propagates by TIR back towards imaging sensor 2208. In some cases, a lens 2272 may be positioned between the waveguide 2204 and the imaging sensor 2208 to convert the angle at which the reflected radiation exits the edge 2204b of waveguide 2204 into a position along an imaging surface of the imaging sensor 2208.

Each sub-hologram 2290 can be configured to steer incident radiation along a different angle of total internal reflection within waveguide 2204. Depending on where FTIR occurs, the radiation may be retro-reflected at different angles within the waveguide 2204. Thus, the position along the imaging sensor 2208 also depends on the particular sub-hologram 2290 at which retro-reflection occurs. Retro-reflection is not limited to the use of thick hologram structures. Thin hologram structures such as gratings having a square-wave, sinusoid or blazed profile may be used as well.

Figure 23:
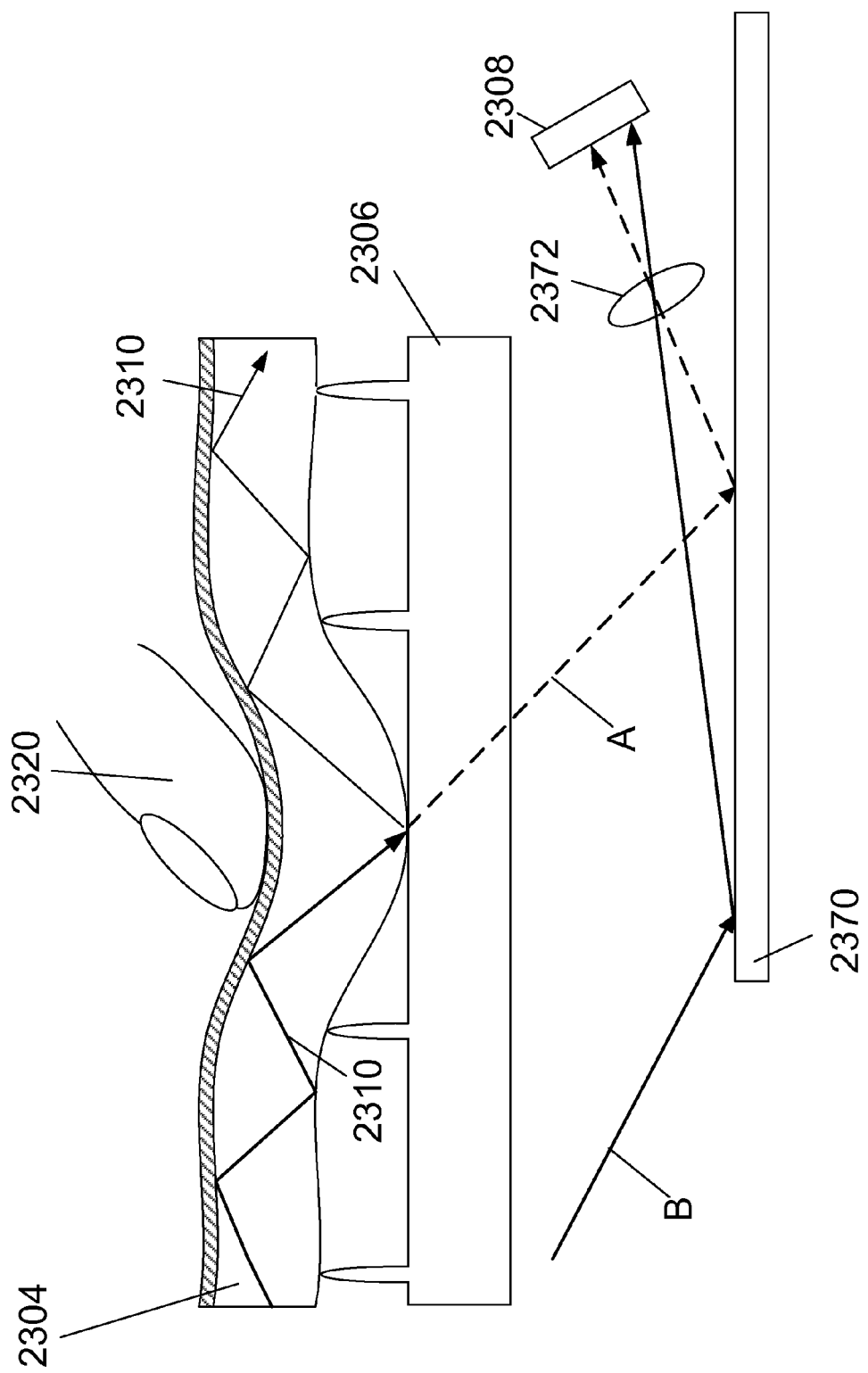

The imaging apparatus is not limited to employing DOE structures and ROE structures to position-encode incident radiation. In some implementations, the imaging apparatus can rely on reflective structures such as mirrors. FIG. 23 is a cross-sectional schematic diagram of an example touch sensitive device, in which a point of contact with the touch sensitive device is detected based on a pliable waveguide layer contacting a frustrating layer.

As shown in the example, the imaging apparatus of the touch-sensitive device employs a single mirror 2370, a lens 2372 and an imaging sensor 2308. Radiation (indicated by arrows "A" and "B") escaping the pliable waveguide 2304 (due to FTIR that occurs when waveguide 2304 contacts frustrating layer 2306) propagates towards the mirror 2370. Radiation B escapes from waveguide 2304 at a position (not shown) of the touch-sensitive device located to the left of where radiation A escapes waveguide 2304. In some cases, a DOE structure or ROE structure can be employed adjacent to or on the frustrating layer to steer the escaped radiation in a particular direction towards the mirror 2370. For example, a thick hologram structure may be employed to direct the ray of radiation indicated by arrow "A" toward the mirror at a steeper angle than the ray of radiation indicated by arrow "B." The radiation then reflects off mirror 2370 and passes through lens 2372 which focuses the radiation onto a surface of imaging sensor 2308. Accordingly, the position at which the radiation is incident on imaging sensor 2308 correlates with the position along the touch sensitive device where input contact is made and where radiation escapes the waveguide due to FTIR.

Figure 24:
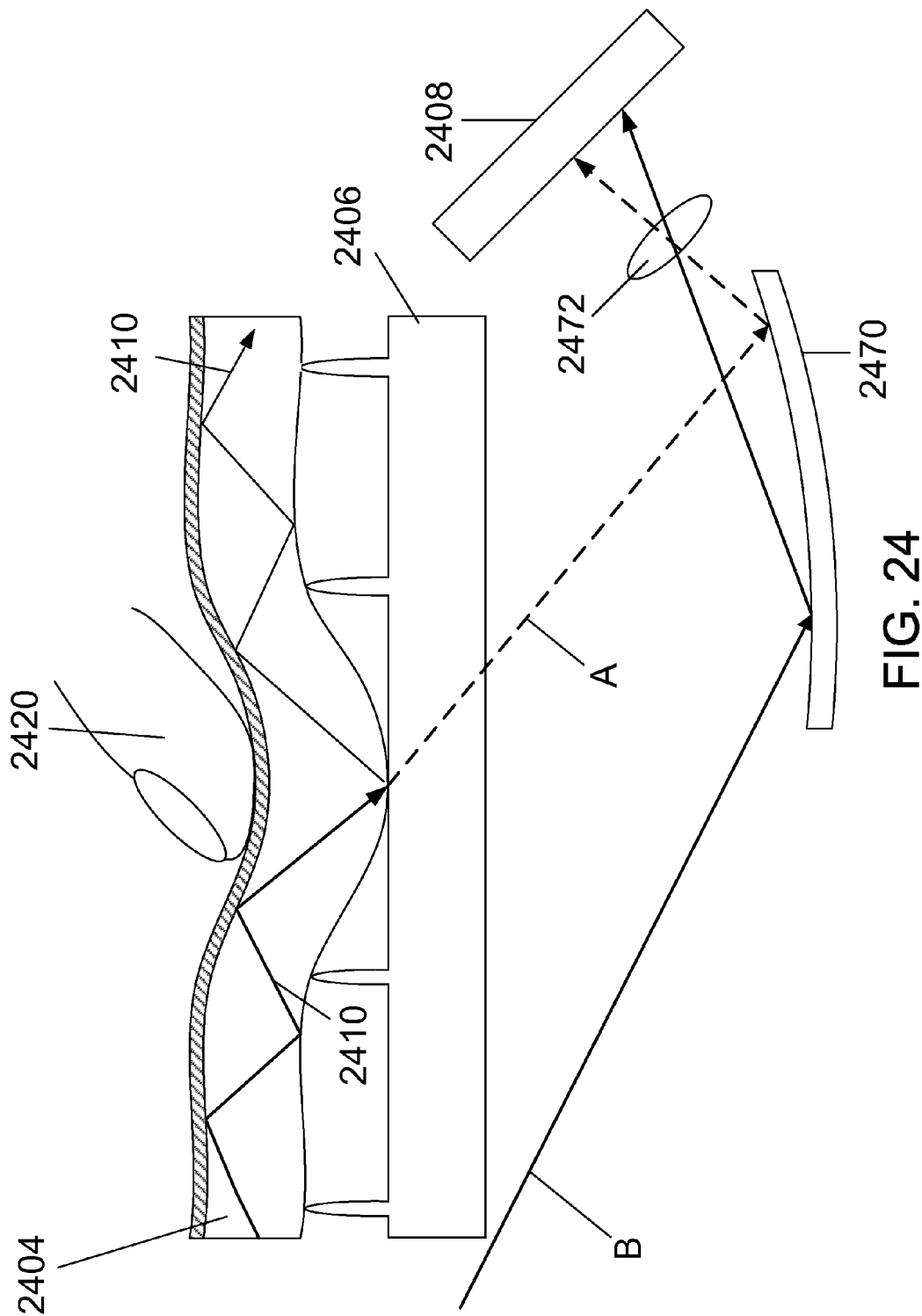

The mirror used to reflect the incident radiation does not have to be flat. In some implementations, the mirror can have a different shape including, for example, a parabolic shape or a conical shape. For example, FIG. 24 illustrates a touch-sensitive device in which a parabolic mirror 2470 is used in place of a flat mirror. As in FIG. 24, the incident radiation reflects off mirror 2470 and passes through lens 2472 which focuses the radiation onto a surface of imaging sensor 2408.

Figure 25:
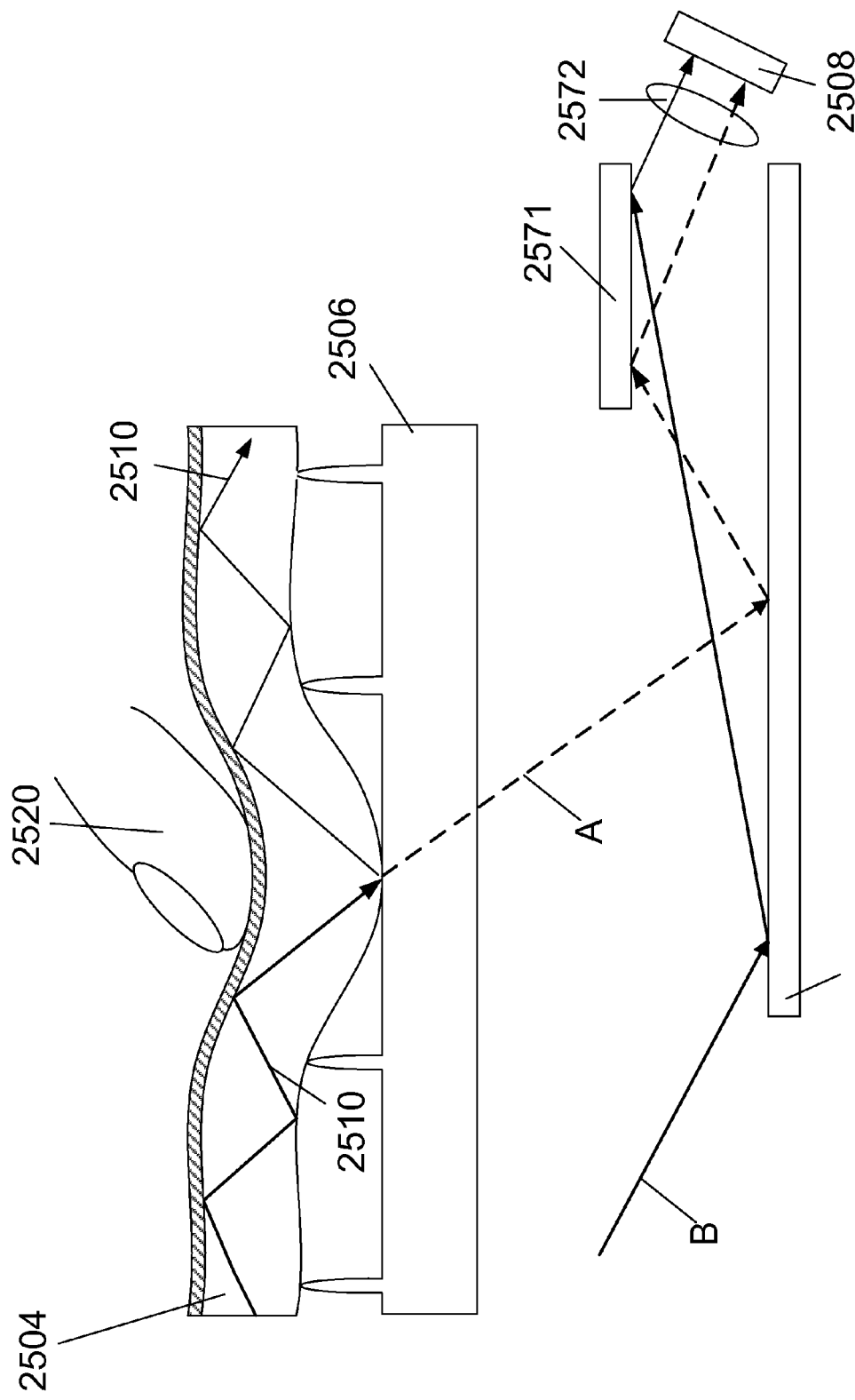

In some implementations, multiple mirrors may be used to re-direct the radiation that escapes from a waveguide due to FTIR. FIG. 25 is a cross-sectional schematic of an example touch sensitive device, in which a point of contact with the touch-sensitive device is detected based on a pliable waveguide layer contacting a frustrating layer. As shown in the example, the imaging apparatus of the touch-sensitive device employs two mirrors 2570, 2571, a lens 2572 and an imaging sensor 2508. Second mirror 2571 is located at a position that is vertically offset from the position of first mirror 2570. Radiation (indicated by arrows "A" and "B") escaping the pliable waveguide 2504 (due to FTIR that occurs when waveguide 2504 contacts frustrating layer 2506) propagates towards the first mirror 2570. A DOE structure or ROE structure can be employed adjacent to or on the frustrating layer to steer the escaped radiation in a particular direction towards the first mirror 2570. The rays of radiation then reflect off first mirror 2570 towards second mirror 2571. The rays of radiation then reflect off second mirror 2571 through lens 2572 which focuses the incident radiation onto a surface of imaging sensor 2508. Accordingly, the position at which the radiation is incident on imaging sensor 2508 correlates with the position along the touch sensitive device where input contact is made and where radiation escapes the waveguide due to FTIR. The mirrors used to reflect the incident radiation do not have to be flat. In some implementations, the mirrors can have other shapes including, but not limited to, parabolic shapes and conical shapes.

Although FIGS. 23-25 show a pliable waveguide layer contacting a frustrating layer, a similar arrangement can be used in which a pliable frustrating layer is configured to contact a waveguide layer.

A number of implementations have been described. Nevertheless, various modifications may be made. For example, as explained above, both the imaging waveguide and the imaging sensor can have a depth that extends into and out of the page, such that it is possible to determine two dimensional points of contact with a surface of the touch-sensitive device. That is, a point of contact with a surface of the touch-sensitive device can be based on the position of the radiation exiting the imaging waveguide in a depth direction as well as in a vertical direction (and/or an angle in the vertical direction). To reduce a size of the imaging device in the depth direction, it may be useful, in some implementations, to steer radiation traveling in the imaging waveguide towards a particular region or regions along the depth direction.

For example, in some cases, the depth of an imaging sensor is less than the depth of the imaging waveguide. To avoid scenarios where the radiation exiting the imaging waveguide propagates past the imaging sensor (e.g., misses the imaging sensor), due to the imaging sensor's shorter depth, the imaging waveguide can be constructed so that radiation is steered along a depth direction so that, upon exiting the imaging waveguide, the radiation impinges on the imaging sensor. That is, the radiation can be steered so that it converges toward a position where the imaging sensor is located. Such depth control of the radiation within the imaging waveguide can be implemented by modifying physical parameters, including, but not limited to, shape, periodicity, and curvature, that are associated with the ROE, DOE or mirror structures used to guide the escaped radiation towards the imaging sensor. These types of modifications may be applied to any of the ROE, DOE or mirror structures described throughout this disclosure.

Alternatively, or in addition, one or more lenses may be used to steer the escaped radiation along a depth direction. For example, in some cases, a cylindrical lens may be placed at the output of an imaging waveguide in order to force radiation exiting the waveguide to converge towards a light detection region of an imaging device. These types of lenses (or other combinations of one or more types of lenses) may be applied to steer light exiting a waveguide toward an imaging device in any of the implementations described throughout this disclosure.

Other implementations are within the scope of the following claims.

What is claimed is:

1. A device comprising:
   a contact receiving structure having a surface for receiving contact by an input mechanism, the contact receiving structure configured to emit radiation as a consequence of contact with the surface by the input mechanism at a contact point, the contact receiving structure comprising:
   a waveguide layer;
   a cladding layer positioned on top of a pliable frustrating layer and formed of a material that has a refractive index lower than or equal to the waveguide layer, the cladding layer having films including an anti-glare layer, an infrared filter, and a non-wetting layer, the films bonded together using an optical adhesive, the
   pliable frustrating layer spaced by a gap from the waveguide layer by a plurality of protrusions of the pliable frustrating layer or waveguide layer and flexible so as to enable the pliable frustrating layer to contact the waveguide layer when the pliable frustrating layer is physically deformed by the input mechanism at the contact point, the pliable frustrating layer being configured to:

cause frustration of radiation propagating within the waveguide by total internal reflection when the pliable frustrating layer is physically deformed to contact the waveguide layer such that some of the radiation escapes from the contact receiving structure;

an imaging waveguide having a radiation receiving surface and an imaging surface different from the radiation receiving surface, wherein the radiation receiving surface comprises an anti-reflection layer, wherein the anti-reflection layer comprises a plurality of alternating high refractive index and low refractive index layers and an array of protrusions, each protrusion having a height and width smaller than a wavelength associated with the radiation emitted by the contact receiving surface, the imaging waveguide being configured to:

receive, at the radiation receiving surface, radiation emitted by the contact receiving structure, and transmit received radiation from a position on the radiation receiving surface to a position and with an angle of incidence onto the imaging surface that are each a function of the position on the radiation receiving surface at which the transmitted radiation was received;

a display device;

an imaging sensor that is optically coupled to the imaging surface of the imaging optical waveguide; and a processing device configured to determine contact points on the surface of the contact receiving structure based on radiation detected by the imaging sensor.

2. The device of claim 1 wherein the imaging waveguide is configured to transmit the received radiation by total internal reflection.

3. The device of claim 2 wherein the imaging waveguide comprises a first side and a second side, the second side having a length that extends in a direction substantially orthogonal to a direction extended by a length of the first side, the length of the second side being shorter than the length of the first side, wherein the first side comprises the radiation receiving surface and the second side comprises the imaging surface.

4. The device of claim 1 wherein the imaging waveguide is formed to have a tapered shape.

5. The device of claim 4 wherein the imaging waveguide is configured to transmit the received radiation by total internal reflection, and wherein the emitted radiation is emitted by a region of the contact receiving structure that corresponds to the contact point.

6. The device of claim 1 wherein the imaging waveguide comprises a diffractive optical element.

7. The device of claim 6 wherein the diffractive optical element comprises a thin hologram structure.

8. The device of claim 7 wherein the thin hologram structure comprises a blazed grating.

9. The device of claim 6 wherein the diffractive optical element comprises a thick hologram structure.

10. The device of claim 6 wherein the diffractive optical element is located adjacent to the radiation receiving surface.

11. The device of claim 6 wherein the diffractive optical element is located adjacent to a surface of the imaging waveguide opposite to the radiation receiving surface.

12. The device of claim 1 wherein the imaging waveguide comprises a refractive optical element.

13. The device of claim 12 wherein the refractive optical element comprises Fresnel prisms.

14. The device of claim 12 wherein the refractive optical element comprises Fresnel lenses.

15. The device of claim 12 wherein the refractive optical element is located adjacent to the radiation receiving surface.

16. The device of claim 12 wherein the refractive optical element is located adjacent to a surface of the imaging waveguide opposite to the radiation receiving surface.

17. The device of claim 1 wherein the imaging waveguide comprises a reflective layer opposite the radiation receiving surface.

18. The device of claim 1 further comprising a lens between the imaging sensor and the imaging surface of the imaging waveguide.

19. The device of claim 1 wherein the display device comprises a liquid crystal device.

20. The device of claim 1 wherein the display device comprises a light emitting diode device.

21. The device of claim 20 wherein the light emitting diode device comprises an organic light emitting diode device.

22. A device comprising:

a contact receiving structure having a surface for receiving contact by an input mechanism, the contact receiving structure configured to emit radiation as a consequence of contact with the surface by the input mechanism at a contact point, the contact receiving structure comprising:

a waveguide layer;

a cladding layer positioned on top of a pliable frustrating layer and formed of a material that has a refractive index lower than or equal to the waveguide layer, the cladding layer having films including an anti-glare layer, an infrared filter, and a non-wetting layer, the films bonded together using an optical adhesive, the pliable frustrating layer spaced by a gap from the waveguide layer by a plurality of protrusions of the pliable frustrating layer or waveguide layer and flexible so as to enable the pliable frustrating layer to contact the waveguide layer when the pliable frustrating layer is physically deformed by the input mechanism at the contact point, the pliable frustrating layer being configured to:

cause frustration of radiation propagating within the waveguide by total internal reflection when the pliable frustrating layer is physically deformed to contact the waveguide layer such that some of the radiation escapes from the contact receiving structure;

a radiation steering structure, having a radiation receiving surface, wherein the radiation receiving surface comprises an anti-reflection layer, wherein the anti-reflection layer comprises a plurality of alternating high refractive index and low refractive index layers and an array of protrusions each protrusion having a height and width smaller than a wavelength associated with the radiation emitted by the contact receiving surface, the imaging waveguide being configured to:

receive the emitted radiation from the contact receiving structure at a first position and re-direct the received radiation at an angle that is a function of the first re-direct the received radiation at an angle that is a function of the first position, and a display device.

23. The device of claim 22 further comprising:
an imaging sensor configured to detect the re-directed radiation; and
a processing device configured to determine contact points on the surface of the contact receiving structure based on the re-directed radiation detected by the imaging sensor.

24. The device of claim 23, wherein the radiation steering structure is further configured to re-direct the received radiation to a position on a detection surface of the imaging sensor, the position on the detection surface being a function of the first position.

25. The device of claim 22, wherein the radiation steering structure comprises a diffractive optical element.

26. The device of claim 25, wherein the diffractive optical element comprises a thin hologram structure.

27. The device of claim 25, wherein the diffractive optical element comprises a thick hologram structure.

28. The device of claim 22, wherein the radiation steering structure comprises a refractive optical element, and
wherein the radiation receiving surface comprises an anti-reflection layer, the anti-reflection layer having a plurality of alternating high refractive index and low refractive index layers and an array of protrusions formed, together with the pliable frustrating layer, from a single contiguous material, each protrusion having a height and width smaller than a wavelength associated with radiation emitted by the contact receiving surface.

29. The device of claim 22, wherein the radiation steering structure is further configured to transmit the received radiation through the radiation steering structure.

30. The device of claim 22, wherein the radiation steering structure is further configured to reflect the received radiation from the radiation steering structure.

31. The device of claim 22, wherein the radiation steering structure comprises a reflective structure.

32. The device of claim 29, wherein the reflective structure comprises a single mirror.

33. The device of claim 29, wherein the reflective structure comprises a plurality of mirrors.

34. The device of claim 22, wherein the display device comprises a liquid crystal device.

35. The device of claim 22, wherein the display device comprises a light emitting diode device.

36. The device of claim 35, wherein the light emitting diode device comprises an organic light emitting diode device.

37. A device comprising:
a contact receiving structure having a surface for receiving contact by an input mechanism, the contact receiving structure configured to emit radiation as a consequence of contact with the surface by the input mechanism at a contact point, the contact receiving structure comprising:
a pliable waveguide layer;
a cladding layer positioned on top of the pliable waveguide layer and formed of a material that has a refractive index lower than or equal to the pliable waveguide layer, the cladding layer having films including an anti-glare layer, an infrared filter, and a non-wetting layer, the films bonded together using an optical adhesive;
a frustrating layer spaced by a gap from the waveguide layer by a plurality of protrusions of the pliable frustrating layer or waveguide layer and flexible so as to enable the frustrating layer to contact the pliable waveguide layer when the pliable waveguide layer is physically deformed by the input mechanism at the contact point, the frustrating layer being configured to:
cause frustration of radiation propagating within the pliable waveguide by total internal reflection when the pliable frustrating layer is physically deformed to contact the waveguide layer, such that some of the radiation escapes from the contact receiving structure;
a radiation steering structure, having a radiation receiving surface, wherein the radiation receiving surface comprises an anti-reflection layer, wherein the anti-reflection layer comprises a plurality of alternating high refractive index and low refractive index layers and an array of protrusions, each protrusion having a height and width smaller than a wavelength associated with the radiation emitted by the contact receiving surface, and being configured to:
receive the emitted radiation from the contact receiving structure at a first position and
re-direct the received radiation at an angle that is a function of the first position, and
a display device.

* * * * *